(12) United States Patent
Lee et al.

(10) Patent No.: US 12,164,753 B2
(45) Date of Patent: *Dec. 10, 2024

(54) AUTOMATION TOOL FOR GENERATING WEB PAGES AND LINKS

(71) Applicant: Constellation Software Inc., New York, NY (US)

(72) Inventors: Diana Lee, New York, NY (US); Matt Woodruff, New York City, NY (US); Mohammed Nauman Hafiz, Brooklyn, NY (US)

(73) Assignee: Constellation Software Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,319

(22) Filed: Aug. 18, 2022

(65) Prior Publication Data

US 2023/0059606 A1     Feb. 23, 2023

Related U.S. Application Data

(63) Continuation-in-part of application No. 17/544,350, filed on Dec. 7, 2021, now Pat. No. 11,720,234, (Continued)

(51) Int. Cl.
*G06F 3/0482*     (2013.01)
*G06F 3/0483*     (2013.01)
(Continued)

(52) U.S. Cl.
CPC ......... *G06F 3/0483* (2013.01); *G06F 3/0482* (2013.01); *G06F 16/954* (2019.01); *G06F 16/9566* (2019.01); *G06Q 30/0277* (2013.01)

(58) Field of Classification Search
CPC .... G06F 3/0483; G06F 3/0482; G06F 16/954; G06F 16/955; G06F 16/958; G06Q 30/0241
See application file for complete search history.

(56) References Cited

U.S. PATENT DOCUMENTS

| | | |
|---|---|---|
| 6,928,412 B2 | 8/2005 | DeBiasse |
| 7,892,827 B2 | 2/2011 | Matschiner et al. |
| (Continued) | | |

OTHER PUBLICATIONS

Office Action dated Feb. 29, 2024 received in U.S. Appl. No. 18/332,952.

*Primary Examiner* — Phenuel S Salomon

(57) ABSTRACT

A method for a user interface for creating a preview content page is provided. Client identification, time period and campaign information are received via a user interface input field. An application programming interface is invoked to access a third party site's data content associated with the campaign information available during the time period. From the third party site, the data content associated with the campaign information available during the time period and metadata associated with the data content are received. The data content has advertisements. The advertisements are presented in the data content on the user interface's display window. A uniform resource locator (URL) link to the plurality of advertisements is generated, for allowing users to share the link on a public web site page. A computer readable storage medium and a user interface system are also provided.

20 Claims, 64 Drawing Sheets

Related U.S. Application Data which is a continuation of application No. 16/384,250, filed on Apr. 15, 2019, now Pat. No. 11,199,949.

(60) Provisional application No. 62/657,131, filed on Apr. 13, 2018.

(51) Int. Cl.
  G06F 16/954 (2019.01)
  G06F 16/955 (2019.01)
  G06Q 30/0241 (2023.01)

(56) References Cited

U.S. PATENT DOCUMENTS

| | | | |
|---|---|---|---|
| 10,262,509 B1* | 4/2019 | Eidam | G06Q 10/10 |
| 11,468,470 B1 | 10/2022 | Fitzpatrick et al. | |
| 2005/0216342 A1* | 9/2005 | Ashbaugh | G06Q 30/0277 |
| | | | 705/14.72 |
| 2009/0100505 A1* | 4/2009 | Shaty | G06F 21/64 |
| | | | 726/3 |
| 2009/0112854 A1* | 4/2009 | White | G06F 16/958 |
| | | | 707/999.005 |
| 2009/0300511 A1* | 12/2009 | Behar | G06F 1/162 |
| | | | 715/745 |
| 2009/0313116 A1* | 12/2009 | Ashbaugh | G06Q 30/0255 |
| | | | 705/14.47 |
| 2010/0332330 A1 | 12/2010 | Goel et al. | |
| 2011/0154215 A1* | 6/2011 | Raley | H04L 67/62 |
| | | | 715/744 |
| 2011/0231240 A1* | 9/2011 | Schoen | H04L 51/52 |
| | | | 705/14.49 |
| 2011/0252117 A1* | 10/2011 | Sng | H04L 63/029 |
| | | | 709/219 |
| 2011/0276720 A1* | 11/2011 | Ickman | G06F 9/541 |
| | | | 709/245 |
| 2012/0010956 A1* | 1/2012 | Ramer | G06Q 30/0247 |
| | | | 705/14.66 |
| 2013/0226699 A1 | 8/2013 | Long | |
| 2013/0346199 A1* | 12/2013 | Brook | G06Q 30/0255 |
| | | | 705/14.53 |
| 2014/0180834 A1* | 6/2014 | Baum | G06Q 30/0276 |
| | | | 705/14.72 |
| 2014/0222581 A1 | 8/2014 | Mathur | |
| 2016/0140635 A1 | 5/2016 | Devageorge et al. | |
| 2016/0283451 A1* | 9/2016 | Young | G06F 16/954 |
| 2017/0075670 A1 | 3/2017 | Lazar | |
| 2018/0276226 A1 | 9/2018 | Knight et al. | |
| 2019/0172103 A1* | 6/2019 | Swinson | G06Q 30/02 |

* cited by examiner

| ☐ | ⊖ | 2018_Sep_YY zzzzzzz_Traffic_Social Work_Social Network | Click | $15.00 Lifetime | $0.00 of $15.00 | 09/06/2018 | Sep 2, 2018 - Sep 6, 2018 5 days |
|---|---|---|---|---|---|---|---|
| ☑ | ⊖ | 2018_Sep_YY zzzzzzz_Traffic_Administration_Social Network ✎ View Charts ✎ Edit ⇔ Duplicate | Click | $15.00 Lifetime ✎ | $0.00 of $15.00 | 10/01/2018 | Sep 26, 2018 - Oct 1, 2018 6 days ✎ |
| ☐ | ⊖ | 2018_Sep_YY zzzzzzz_Traffic_Healthcare_Social Network | Click | $100.00 Lifetime | $0.00 of $100.00 | 09/30/2018 | Sep 1, 2018 - Sep 30, 2018 30 days |

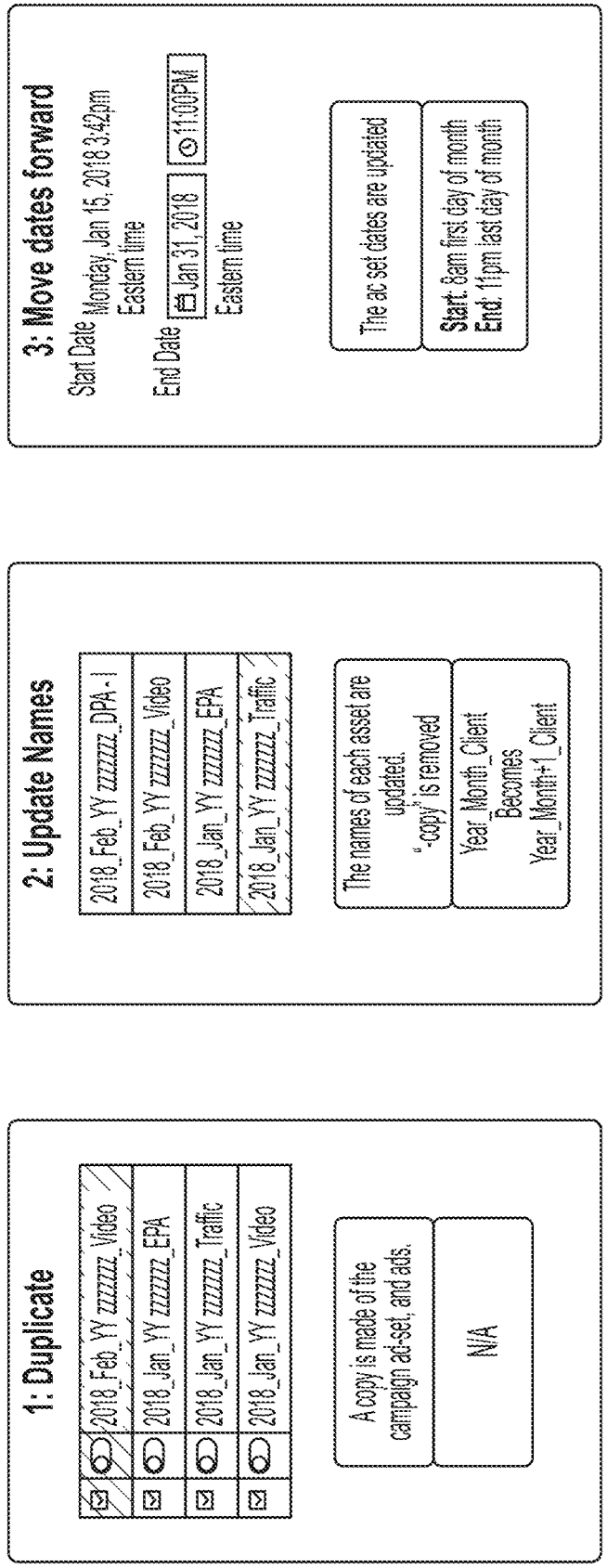

| Store Name (DBA) | Store Name | State | Store OEM(s) | Store URL | FB Account ID | FB Page ID | Catalog ID | FB Pixel ID |
|---|---|---|---|---|---|---|---|---|
| Brand 1 Chicago | ABCDEF | IL | Brand 1 | https://store.com | 123456789 12345 | | | 123456789 12345 |
| Williams Brand 2 | ABCDEF | MI | Brand 2 | https://store.com | | | | |
| Low Country Brand 2 | ABCDEF | SC | Brand 2 | https://store.com | | | | |
| Brand 3 of the Hudson Valley | ABCDEF | NY | Brand 3 | https://store.com | 123456789 12345 | 123456789 12345 | 123456789 12345 | 123456789 12345 |
| Rallye Brand 3 | ABCDEF | NY | Brand 3 | https://store.com | 123456789 12345 | 123456789 12345 | 123456789 12345 | 123456789 12345 |
| Frema Brand 4 | ABCDEF | NC | Brand 4 | https://store.com | | | | |
| Carbone Brand 5 | ABCDEF | NY | Brand 5 | https://store.com | 123456789 12345 | | 123456789 12345 | 123456789 12345 |
| Brand 1 World of Newton | ABCDEF | NJ | Brand 4 | https://store.com | | | | |

Sidebar:
- XXXXX
- Admin
  - User Management
  - Store Management
  - OEM Management
  - Dashboard Management
- Legal Lingo
- Asset Builder
- Asset Explorer
- Design Studio
- Ad Library
- Pictor
- Campaign Manageme
- Metrics

Fig. 16C

| ☐ Load Status ⇕ | Session Name ⇕ | Last Updated At ⇕ | Last Updated By ⇕ |
|---|---|---|---|
| ☐ ○ Not Loaded | Test 2 - 2 Ads - Oct 28 | 10/28/2021 02:33:47 pm | name@email.com |
| ☐ ○ Unknown | 3 Ads - Nov 16 | 11/16/2021 10:25:36 am | name@email.com |
| ☐ ○ Not Loaded | Test 2 - 1 Ads - Oct 18 | 10/18/2021 12:42:06 pm | name@email.com |
| ☐ ○ Not Loaded | Test 2 - 1 Ads - Dec 14 | 12/14/2021 03:59:26 pm | name@email.com |
| ☐ ● Failed | Test 2 - 1 Ads - Feb 10 | 02/10/2022 10:55:35 am | name@email.com |
| ☐ ○ Not Loaded | Test 2 - 1 Ads - Oct 26 | 10/26/2021 04:23:20 pm | name@email.com |
| ☐ ○ Unknown | Brand of Roseville- Brand of Orange County - 8 Ads - Sep 14 | 09/14/2021 04:01:38 pm | name@email.com |

| Name of ad | QC Status | Start Date | End Date | Ad Formats | Destination URL | Preview Link |
|---|---|---|---|---|---|---|
| WebConv Collection NY21 Edge MO1 | ✓ | text | text | text | https://www.latham... | text |
| Brand of Morgantown WebConv Lookalike Placements Collection NY21 Edge MO1 | ✓ | text | text | text | https://www.latham... | text |
| Brand of Morgantown WebConv In-Market Placements Collection NY21 Edge MO1 | ✓ | text | text | text | https://www.latham... | text |
| Brand of Morgantown WebConv In-Market Used Placements Collection NY21 Edge MO | ✗ | text | text | text | Multiple (5) | text |
| WebConv Motion New Dealer 2022 CR | — | text | text | text | text | text |
| Collection Used Inventory MO1 | ✓ | text | text | text | text | text |
| Brand of Morgantown Used In-Market Used All Placements Collection Used Inventory | ✗ | text | text | text | text | text |
| Brand of Morgantown WebConv In-Market All Placements Cinemagraph 2021 F-150 CR | ✗ | text | text | text | Multiple (4) | text |
| WebConv Carousel NY21 Edge | ✗ | text | text | text | Multiple (4) | text |
| WebConv Motion New Dealer 2022 CR | — | text | text | text | text | text |
| Collection Used Inventory MO1 | ✓ | text | text | text | text | text |
| Brand of Morgantown WebConv In-Market Used All Placements Collection Used Inventory | ✓ | text | text | text | text | text |
| Brand of Morgantown WebConv In-Market All Placements Cinemagraph 2021 F-150 CR | ✓ | text | text | text | text | text |

Add New Dashboard

*Dashboard Name

*Looker Dashboard ID

*Models

*Access Filter

OEM ⓘ

Special Campaigns ⓘ

Accounts ⓘ

Default Date
2021-12-09

Enabled
True

Cancel | Add

Edit Dashboard

*Dashboard Name
Name

*Looker Dashboard ID
12

*Models
[Model 1] [Model 2]

*Access Filter

OEM ⓘ

Special Campaigns ⓘ

Accounts ⓘ

Default Date
2021-12-09

Enabled
True

Cancel | Save

Fig. 24D

AUTOMATION TOOL FOR GENERATING WEB PAGES AND LINKS

CROSS-REFERENCE TO RELATED APPLICATIONS

This application is a continuation in part of U.S. patent application Ser. No. 17/544,350 filed on Dec. 7, 2021, which is a continuation application of U.S. patent application Ser. No. 16/384,250 filed on Apr. 15, 2019, which claims the benefit of U.S. Provisional Application No. 62/657,131 filed on Apr. 13, 2018, the entire contents of each of which are incorporated herein by reference.

BACKGROUND

The present application relates generally to computers, and computer applications, and more particularly to generating of online and/or web pages and links to content stored on a network of computers.

SUMMARY

According to an aspect of the disclosure, a method for a user interface for creating a preview content page is provided. The method includes receiving client identification, time period and campaign information via a user interface input field. The method further includes invoking an application programming interface to access a third party site's data content associated with the campaign information available during the time period. The method further includes receiving from the third party site, the data content associated with the campaign information available during the time period and metadata associated with the data content, the data content has a plurality of advertisements. The method further includes presenting the plurality of advertisements in the data content on the user interface's display window. The method also includes generating a uniform resource locator (URL) link to the plurality of advertisements, for allowing users to share the link on a public web site page.

According to another aspect of the disclosure, a computer readable storage medium is provided. The computer readable storage medium stores a program of instructions executable by a machine to perform a method of for a user interface for creating a preview content page. The method includes receiving client identification, time period and campaign information via a user interface input field. The method further includes invoking an application programming interface to access a third party site's data content associated with the campaign information available during the time period. The method further includes receiving from the third party site, the data content associated with the campaign information available during the time period and metadata associated with the data content, the data content has a plurality of advertisements. The method further includes presenting the plurality of advertisements in the data content on the user interface's display window. The method also includes generating a uniform resource locator (URL) link to the plurality of advertisements, for allowing users to share the link on a public web site page.

According to yet another aspect of the disclosure, a user interface system is provided. The user interface system includes at least one hardware processor coupled with a network interface. The at least one hardware processor operable to perform at least: receiving client identification, time period and campaign information via a user interface input field; invoking an application programming interface to access a third party site's data content associated with the campaign information available during the time period; receiving from the third party site, the data content associated with the campaign information available during the time period and metadata associated with the data content, the data content has a plurality of advertisements; presenting the plurality of advertisements in the data content on the user interface's display window; and generating a uniform resource locator (URL) link to the plurality of advertisements, for allowing users to share the link on a public web site page.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE SEVERAL VIEWS OF THE DRAWINGS

Features as well as the structure and operation of various embodiments are described below with reference to the accompanying drawings. In the drawings, like reference numbers indicate identical or functionally similar elements.

FIG. 5 is a diagram illustrating a user interface that displays the content pulled from a third party social network profile page in one embodiment.

FIG. 7 shows content page of an example share link in one embodiment.

FIG. 8 illustrates an example user interface display showing a batch of advertisements (content) with metadata in a single view in one embodiment.

FIG. 10 illustrates an example user interface that shows previews of advertisement and associated metadata in one embodiment.

FIG. 12 illustrates example user interfaces in one embodiment, which show progresses of duplicating updating names, moving dates forward, changing link description and changing marketing title.

FIG. 15B is a diagram illustrating an example of the user interface of FIG. 15A in one embodiment.

FIG. 15C is a diagram illustrating another example of the user interface of FIG. 15A in one embodiment.

FIG. 16C is a diagram illustrating another example of the content library of FIG. 16A in one embodiment.

FIG. 16E is a diagram illustrating another example of the content library of FIG. 16A in one embodiment.

FIG. 18A is a diagram illustrating a user interface associated with an asset module in one embodiment.

FIG. 18D is a diagram illustrating another user interface associated with an asset module in one embodiment.

FIG. 20A is a diagram illustrating a user interface associated with a review module in one embodiment.

FIG. 20B is a diagram illustrating another user interface associated with the review module in one embodiment.

FIG. 21A is a diagram illustrating a user interface associated with implementation of a review module in one embodiment.

FIG. 21B is a diagram illustrating another user interface associated with implementation of a review module in one embodiment.

FIG. 21C is a diagram illustrating another user interface associated with implementation of a review module in one embodiment.

FIG. 21D is a diagram illustrating another user interface associated with implementation of a review module in one embodiment.

FIG. 21E is a diagram illustrating a mobile user interface associated with implementation of a review module in one embodiment.

FIG. 21F is a diagram illustrating another mobile user interface associated with implementation of a review module in one embodiment.

FIG. 24C is a diagram illustrating another example implementation of a dashboard module in one embodiment.

FIG. 24D is a diagram illustrating another example implementation of a dashboard module in one embodiment.

DETAILED DESCRIPTION

An automation tool may create web pages, for example, for campaign management, and allow users to automatically run campaigns with a variety of creative and granularity at scale. Interactive preview links may be generated and provided to users, to be able to preview content such as advertisements on their web site's web pages, on a network-based such as Internet-based photo-sharing application and service, and/or other messaging platforms, for instance, quickly and efficiently.

For example, in an example use case scenario, an entity such as a car dealership may desire to publish new content (e.g., such as a new offer or advertisement) associated with a vehicle, for instance, derived from information obtained from the vehicle's manufacturer. Traditionally, such information usually is manually obtained and built into a new content. An automation tool of the present disclosure in some aspects allows for automatically and seamlessly creating the new content and an associated link, for example, for a preview.

In some aspects, detailed question/answer capabilities may be provided for creating error-free creative items (e.g., displayed on online content pages) at scale, e.g., by placing or locating campaign details next to each creative item within the preview window, more easily viewable than existing content creation interfaces would allow.

The automation tool may in some aspects include scaling features, which allow users to duplicate and customize content such as campaigns across many different websites (e.g., different product dealers, e.g., automobile dealerships) with industry-leading speed and effectiveness. The automation tool, for example, may provide a feature that allows users to reuse the content (e.g., campaign) from period to period (e.g., one month to the next), which may include performing batch renaming and date editing functions across numerous (e.g., thousands of) content items such as advertisements, for instance, on a periodic basis (e.g., monthly).

Figure 1:
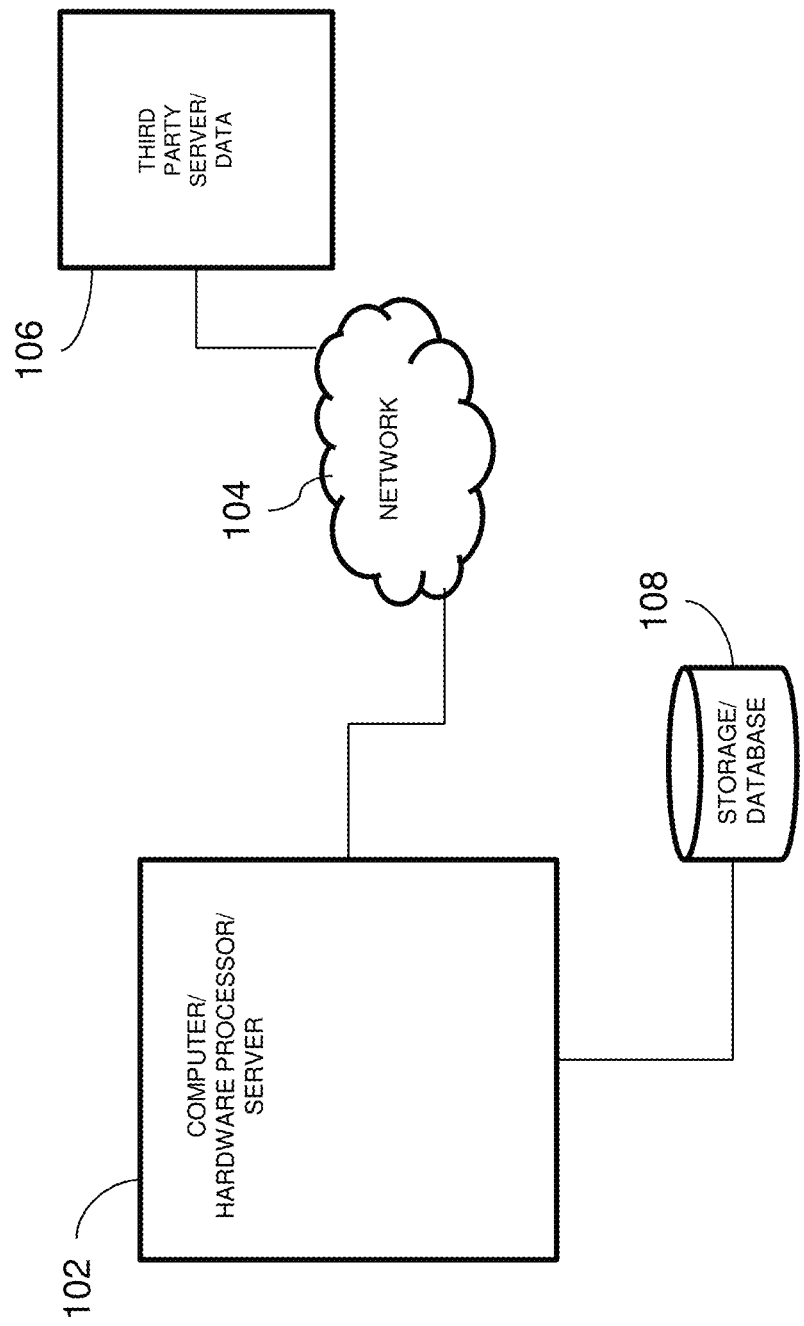
FIG. 1 is a diagram illustrating components of a system that provides an automation tool for generating online pages and links in one embodiment.

In one aspect, the functionalities and modules of the system and methods of the present disclosure may be implemented or carried out by one or more hardware processors, for example, distributedly on different processing systems or on any single platform, for instance, accessing data stored locally or distributedly on the network. FIG. 1 illustrates components of a system, which may perform one or more methodologies and/or functions described herein. A processing system, for example, may include a computer or computing device such as hardware processors or microprocessors 102, which may be coupled with a memory device, a network interface, input/output interface, and any other devices or interfaces found in a computer device. At least one hardware processor at 102 may communicate with a third party server or computing device 106, for example, via a network such as a communication network 104, to perform one or more functions described here. The network 104 may include a wireless and/or wired network, a data network such as the Internet, and/or others. One or more hardware processors 102 may be also coupled with a storage device, for example, which may be accessible directly or via a communication network 104.

Various aspects of the present disclosure may be embodied as a program, software, or computer instructions embodied or stored in a computer or machine usable, readable or executable medium, which causes the computer or machine to perform the steps of the method when executed on the computer, processor, and/or machine. For instance, a program storage device readable by a machine, tangibly embodying a program of instructions executable by the machine to perform various functionalities and methods described in the present disclosure may be provided.

The system and method of the present disclosure may be implemented and run on a general-purpose computer or special-purpose computer system. The computer system may be any type of known or will be known systems and may include a hardware processor, memory device, a storage device, input/output devices, internal buses, and/or a communications interface for communicating with other computer systems in conjunction with communication hardware and software, etc.

Figure 2:
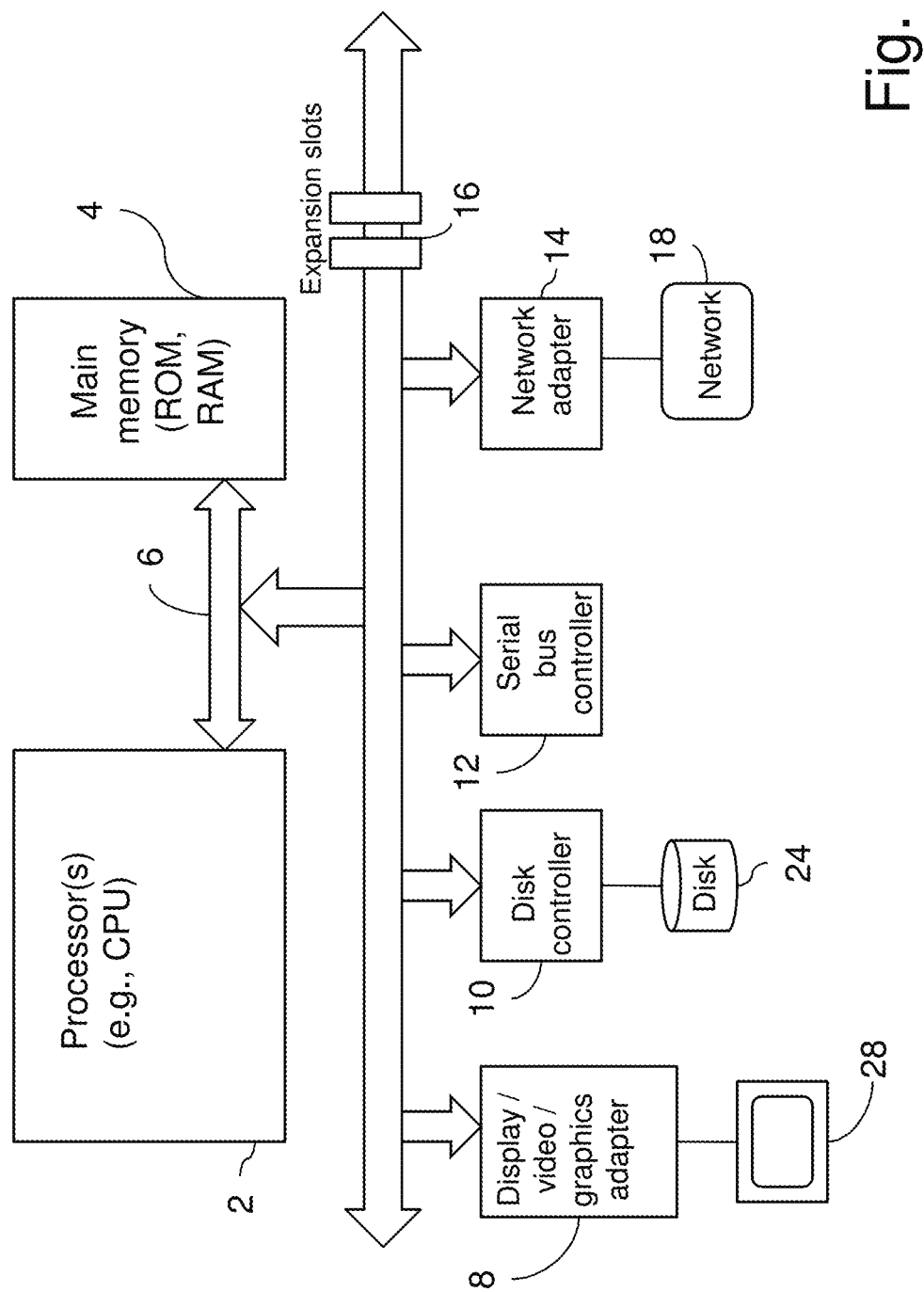
FIG. 2 illustrates an example processing device that may implement the system and/or method of the present disclosure.

FIG. 2 illustrates an example processing device that may implement the system and/or method of the present disclosure. For instance, a user device or a backend system may include components shown in FIG. 2. One or more central processing units (e.g., CPUs) 2 may include one or more arithmetic/logic unit (ALU), fast cache memory and registers and/or register file, and/or another type of processors or processing hardware. Registers are small storage devices; register file may be a set of multiple registers. Caches are fast storage memory devices, for example, comprising static random access (SRAM) chips. Caches serve as temporary staging area to hold data that the CPU 2 uses. Shown is a simplified hardware configuration. CPU 2 may include other combination circuits and storage devices. One or more central processing units (CPUs) 2 execute instructions stored in memory 4, for example, transferred to registers in the CPU 2. Buses 6, for example, are electrical wires that carry bits of data between the components. Memory 4 may include an array of dynamic random access memory (DRAM) chips, and store program and data that CPU 2 uses in execution. The system components may also include input/output (I/O) controllers and adapters connected to the CPU 2 and memory 4 via a bus, e.g., I/O bus and connect to I/O devices. For example, display/graphic adapter connects 8 a monitor 28 or another display device/terminal; disk controller 10 may connect hard disks 24, for example, for permanent storage; serial controller 12 such as universal serial bus (USB) controller may connect input devices such as keyboard and mouse, output devices such as printers; network adapter 14 connects the system to another network, for example, to other machines. The system may also include expansion slots to accommodate other devices to connect to the system. For example, a hard disk 24 may store the program of instructions and data that implement the above described methods and systems, which may be loaded into the memory 4, then into the CPU's storage (e.g., caches and registers) for execution by the CPU (e.g., ALU and/or other combination circuit or logic). In another aspect, all or some of the program of instructions and data implementing the above described methods and systems may be accessed, and or executed over the network 18 at another computer system or device. FIG. 2 is only one example of a computer system. The computer system that may implement the methodologies or system of the present disclosure is not limited to the configuration shown in FIG. 2. Rather, another computer system may implement the methodologies of the present disclosure, for example, including but not limited to special processors such as field programmable gate array (FPGA) and accelerators.

In one embodiment, the present invention may be embodied as a computer program product that may include a computer readable storage medium (or media) and/or a computer readable storage medium. Such computer readable storage medium may store computer readable program instructions for causing a processor to carry out one or more methodologies described here. In one embodiment, the computer readable storage medium includes a tangible device that can retain and store instructions for use by an instruction execution device. Examples of the computer readable storage medium may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples.

The terms "computer system" and "computer network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more stand-alone components. The hardware and software components of the computer system of the present application may include and may be included within fixed and portable devices such as mobile phone, tablet, smartphone, desktop, laptop, and/or server. A module may be a component of a device, software, program, or system that implements some "functionality", which can be embodied as software, hardware, firmware, electronic circuitry, or etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 3:
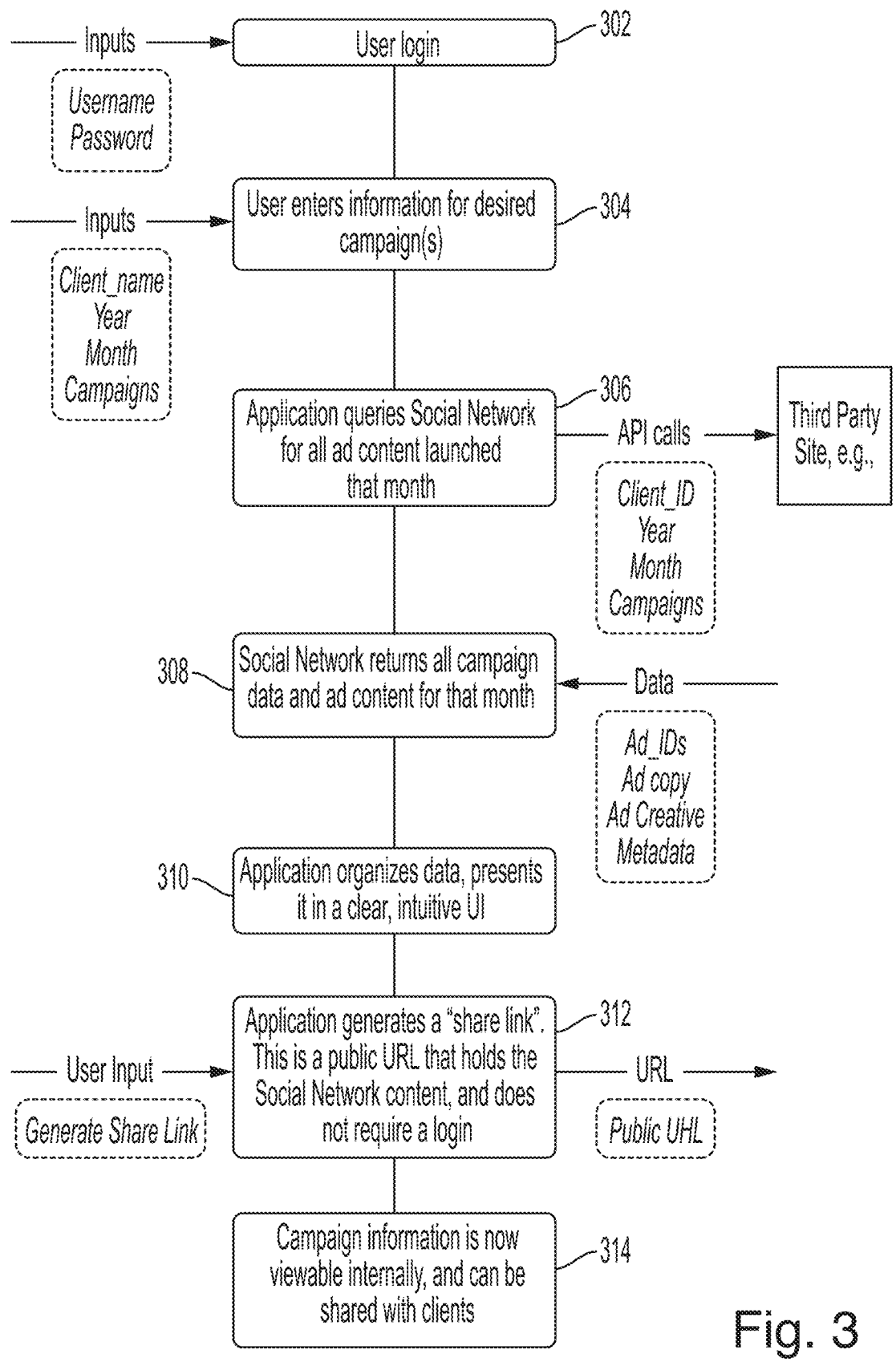
FIG. 3 is a flow diagram illustrating a method of generating an online content page and/or a link to an online content in one embodiment.

FIG. 3 is a flow diagram illustrating a method of generating an online content page and/or a link to an online content in one embodiment. The method may be implemented as a web or another server application, and/or a smartphone app, and/or another application, and may be executed by one or more hardware processors, e.g., running the web server, a smartphone app, or another. The application may include a user interface for interacting with a user, for example, displaying content and receiving user input or command. At 302, the user login information (e.g., user name and password) may be received for authenticating a user to run the application or the functionalities of the automated tool that allows users to be able to create content and associated link. For instance, a user may input the information via the user interface. At 304, once authenticated, the application, for example, via the user interface, may prompt for and/or receive user input associated with information for a desired campaign or advertisement. Such input may include, but is not limited to, the client name, year, month and campaign.

At 306, the application may query or search a third party server or database, such as Facebook® for the content launched for the period of interest (e.g., month and year input by the user). For instance, the application may invoke or call an application programming interface (API) provided by the third party server or site, for example, for accessing the third party site's data. At 308, the third party server or site may return all campaign data and advertisement data for the requested period of time. For example, the application may receive advertisement identifiers, advertisement copies or content, and metadata associated with the advertisements. Examples of metadata may include, but not limited to, metrics that indicate how the advertisement performed during the time it was run, spending that indicates how much budget was allocated to, and used by, the advertisement over its active lifecycle, date range that indicates when the advertisement was launched and when it concluded, Uniform Resource Locator (URL) where the advertisement leads to when clicked or selected, and Urchin Tracking Module (UTM) that indicates tracking information. In some aspects, the application may present pieces of this metadata to the user, in order to facilitate fast quality control (QC) of multiple advertisements quickly.

At 310, based on the data received from the third party site, the application creates a user interface content, e.g., an online page, which displays the advertisement content and metadata information.

Figure 7:
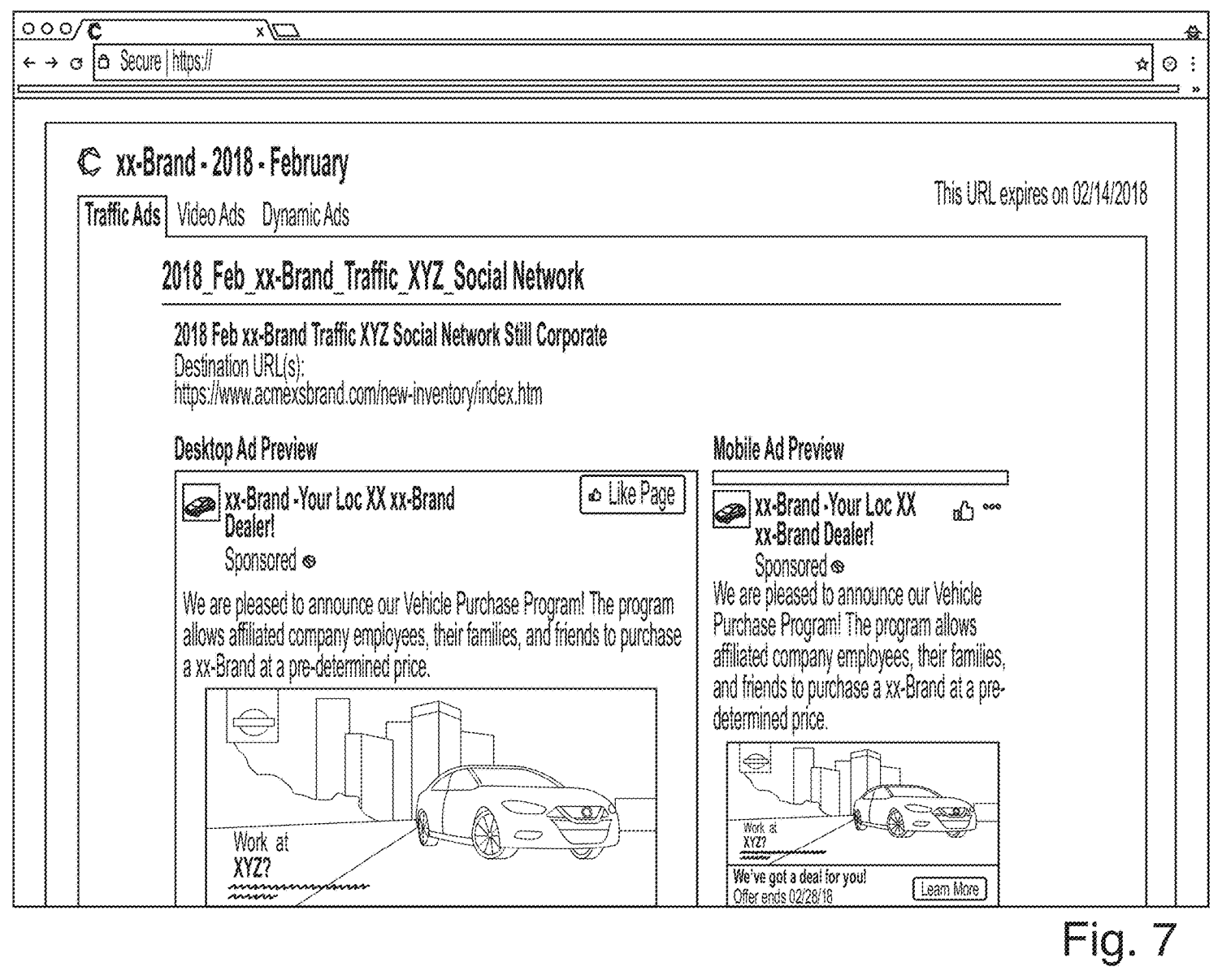

At 312, for example, responsive to receiving user activated request to create a link, the application generates a link that can be shared, referred to as a "share link". The generated link, for example, is a public Uniform Resource Locator (URL) that holds the third party site's content, which in some embodiments, do not require a login. The link is provided to a user, for example, via the user interface, allowing the user to navigate to the location via the URL. The URL, for example, points to the location where data content received from the third party sites can be found or shown. At 314, the campaign information is made viewable internally, and can be shared with a client, for example, an automobile or vehicle dealer. FIG. 7 as an example illustrates the content shown in the URL link. In some aspects, this URL shows the same data as the initial "ad preview". In some aspects, this URL shows data taken from the external application programming interface (API) (for example, FACEBOOK) and presents it to the user in a clear, intuitive manner. In the URL's content, the advertisements are emphasized, and other related data may be displayed as well.

Generally, an advertisement agent or the like creating online or web advertisement content for a client such as an automobile dealership, send monthly or periodic reports so that the client can review the advertisements and grant approval to launch the advertisements. While the content for advertisement is made available in some form, on a manufacturer's profile page of a social network application such as Facebook®, a client such as an automobile dealership do not have direct access to such a page. Moreover, accessing such a page is not made user-friendly, often requiring a professional campaign manager to be able to navigate the page. Hence, previously, screenshots and manually written copies were prepared in a spreadsheet, and for example, assets were compiled to be transferred via a file sharing application to the client. Programmatically, such procedure or process requires a significant amount of data begin sent to a client, requiring large amount of data transfer between the agent and the client on a computer network. Moreover, the data that is transferred in such manner is static, and is a non-interactive content attempting to portray videos and other dynamic creative items.

The automation tool (also referred to above as an application) of the present disclosure in some aspects provides a user friendly, dynamic methodology that allows users to be able to preview content, and which also improves on the functioning of a computer, by reducing the amount of data transfer between computer devices, and therefore also reducing any computer network data traffic.

Figure 4:
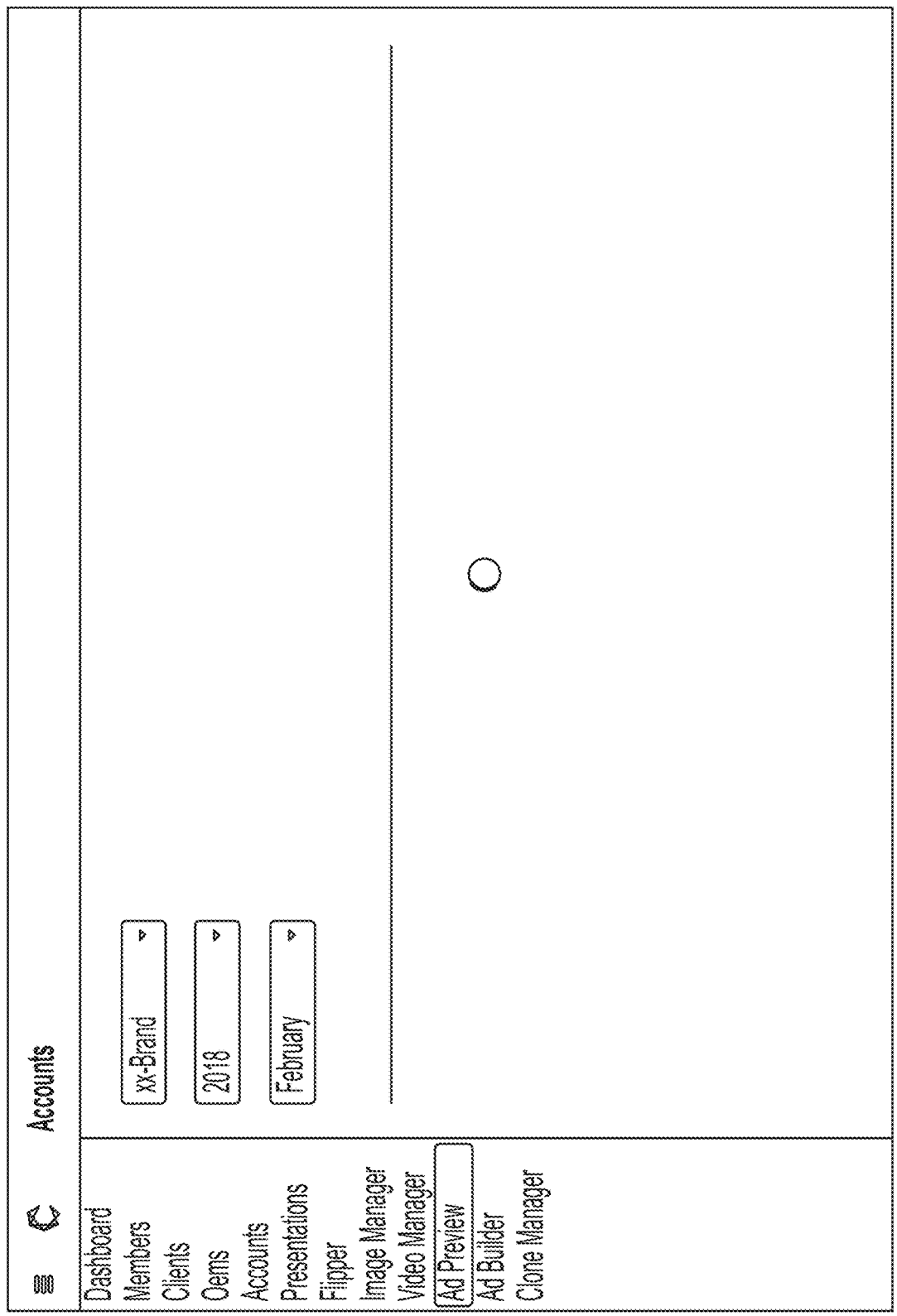
FIG. 4 is a diagram illustrating a user interface dropdown menu that allows user to preview content, in one embodiment.

FIG. 4 is a diagram illustrating a user interface dropdown menu that allows user to input information for previewing content, in on embodiment. A dropdown menu, for instance, allows a user to select client advertisement accounts, campaign year and campaign month. Using this information the application may query a third party site via the third party site's API.

Figure 5:
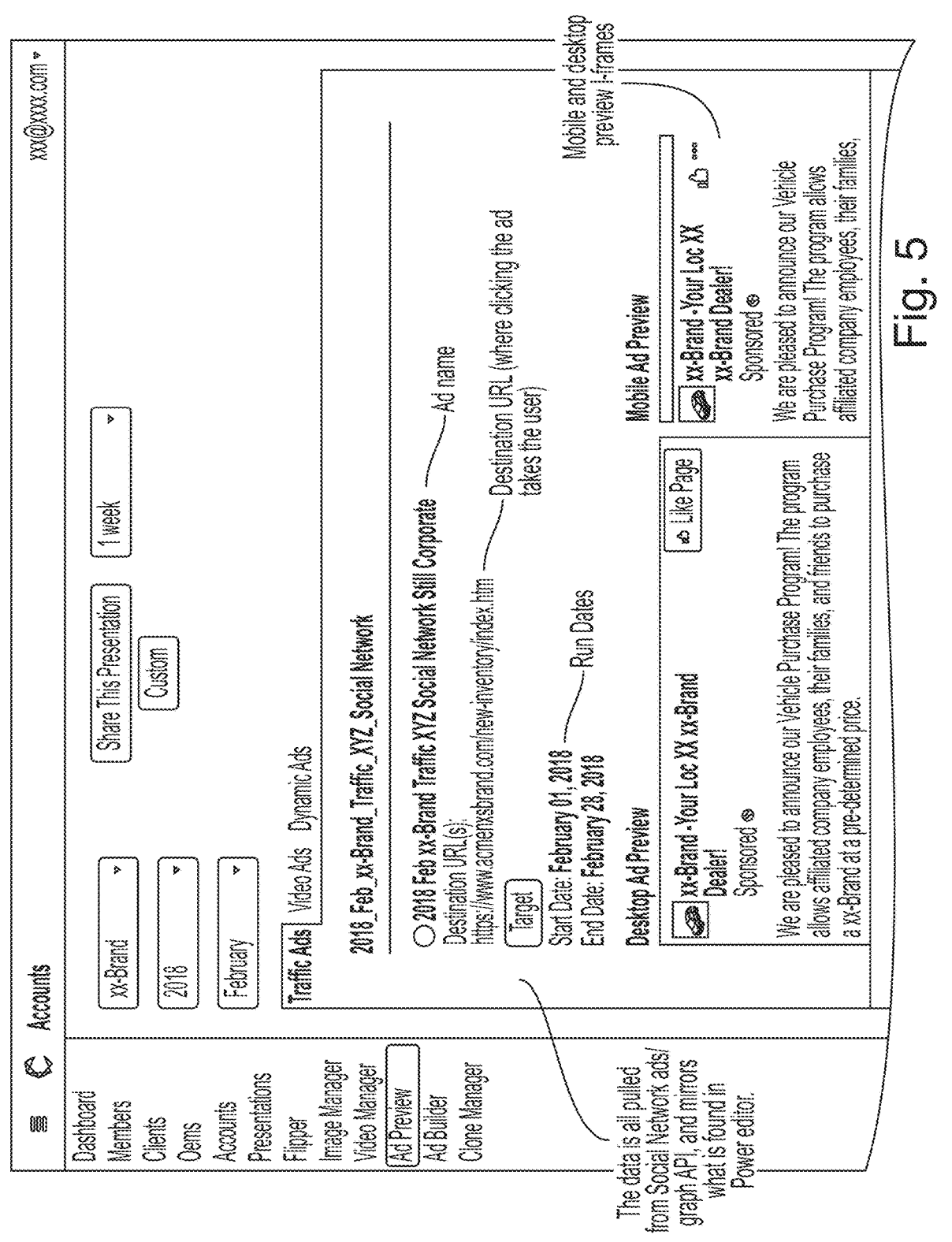
Figure 5:
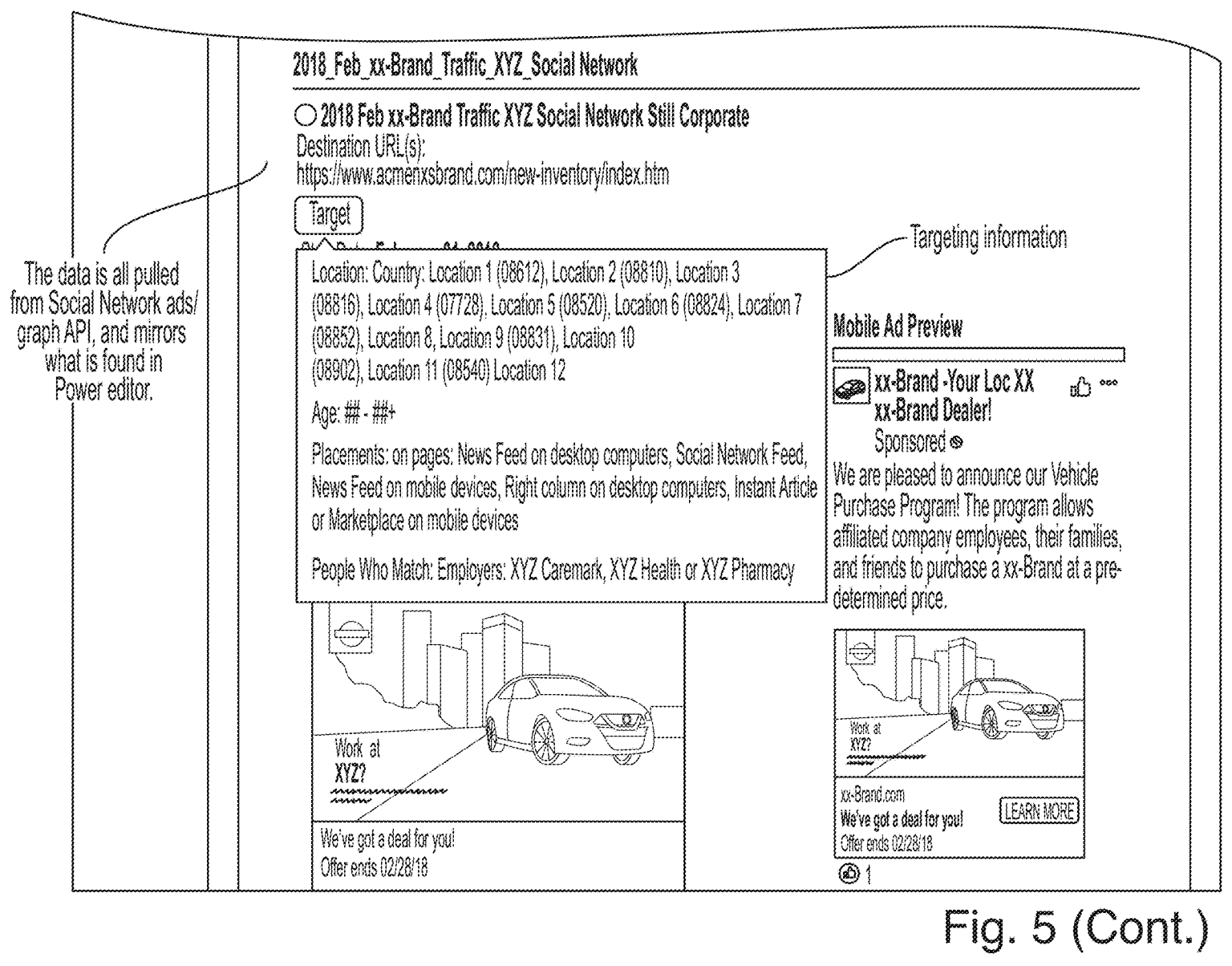

FIG. 5 is a diagram illustrating a user interface that displays the content pulled from a third party social network profile page in one embodiment. For example, based on the user input such as the client advertisement accounts, campaign year and campaign month, data may be extracted or pulled from a social network application or platform's advertisements/graphs API. The content displayed may mirror what is found in the social network platform's advertisement manager or the like. For instance, a user interface provides buttons or like user interface activation elements or features on the user interface, which may be activated by a user and in response to activation, may display preview views of the advertisements.

Figure 6:
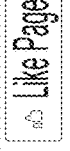
FIG. 6 is a diagram illustrating a user interface that generated a URL in one embodiment.

The user interface may also include a share button or like user interface element. For example, a user may press or select the share button or the like to activate or trigger a generation of a share link. For instance, responsive to the pressing of the share button, a URL is generated to send to one or more clients. FIG. 6 is a diagram illustrating a user interface that generated a URL in one embodiment.

Clicking or selecting the URL or the shared link (e.g., shown in FIG. 6) navigates the user to a location that displays the same content. For example, FIG. 7 shows content page of an example share link in one embodiment. The share link shows identical information to the initial advertisement preview window. The share link page in one aspect is not password protected, so that clients can easily view their content in one convenient place. Computer functionality in this respect is improved in that the total time to send share link is considerably reduced, for example, 20 seconds versus 45 minutes or more that takes to send the same data to the client.

Figure 8:
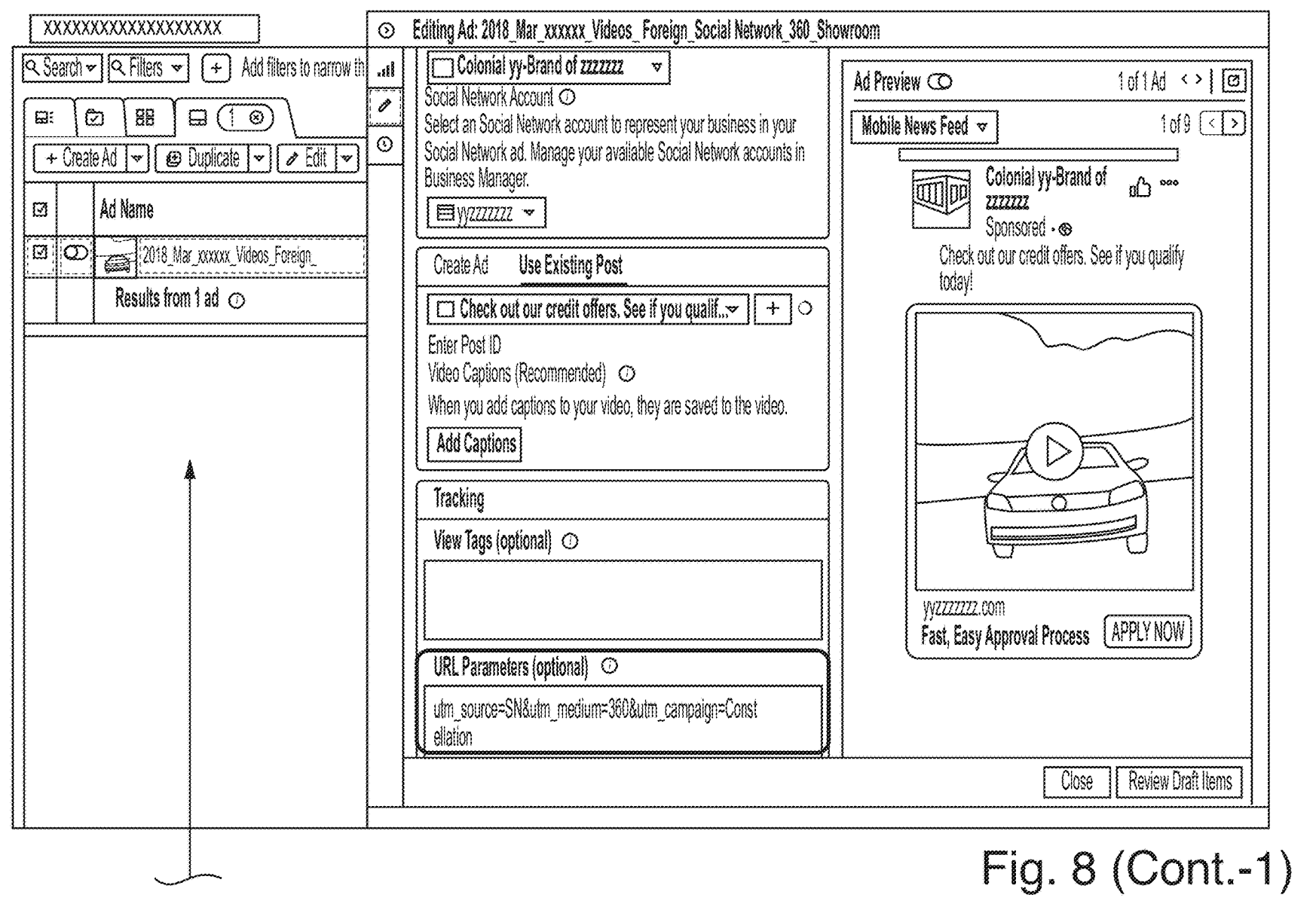
Figure 8:
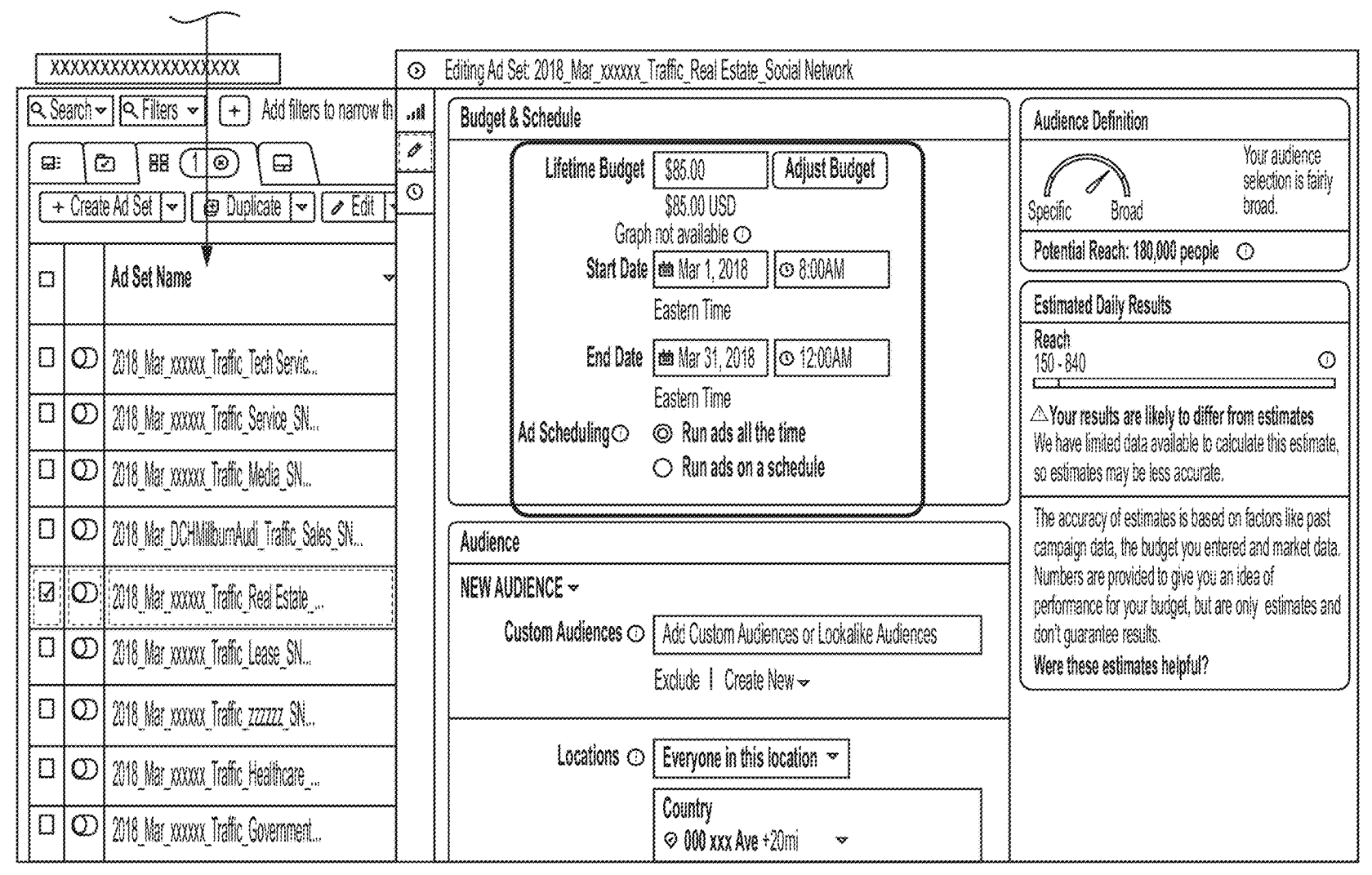

In some aspects, the automation tool of the present disclosure presents key advertisement metadata alongside each advertisement creative item for a quick and easy way to review a large batch of advertisements in a single view, for example, for quality assurance purposes. FIG. 8 illustrates an example user interface display showing a batch of advertisements (content) with metadata in a single view in one embodiment.

To ensure the correct spend, targets, and creative (item) are in each advertisement, meticulous testing is needed by an internal advertising team. This advertising is time consuming. Social network such as Facebook® internal platform requires that users open each creative in a new preview window. Additionally, spend and duration are in a separate page entirely. This requires users to perform dozens of clicks and load content to review each advertisement.

Figure 9:
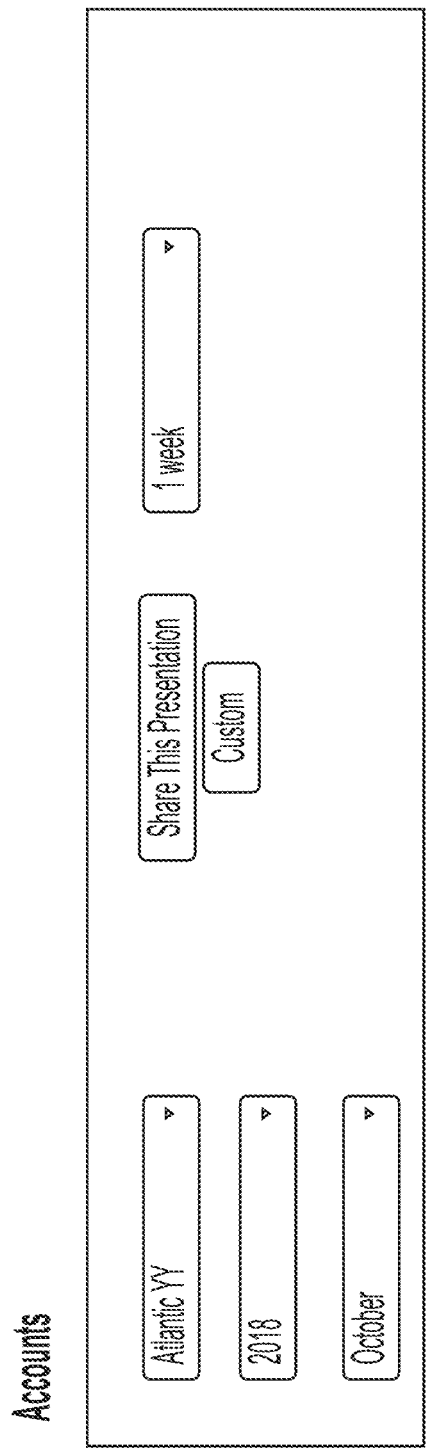
FIG. 9 illustrates an example user interface that allows the user to select or input information such as client advertisement accounts and time of the advertisement, in one embodiment.
Figure 10:
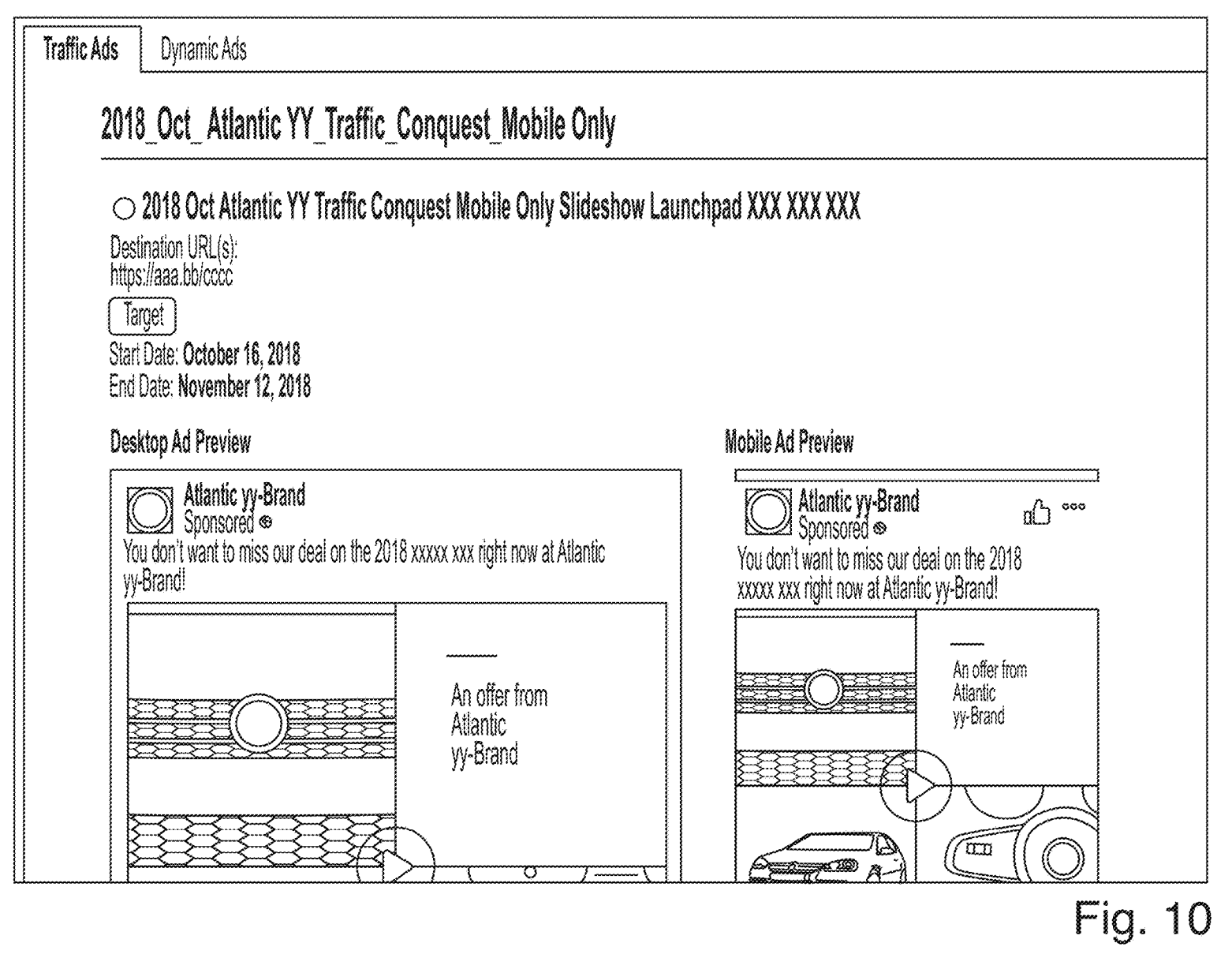
Figure 11:
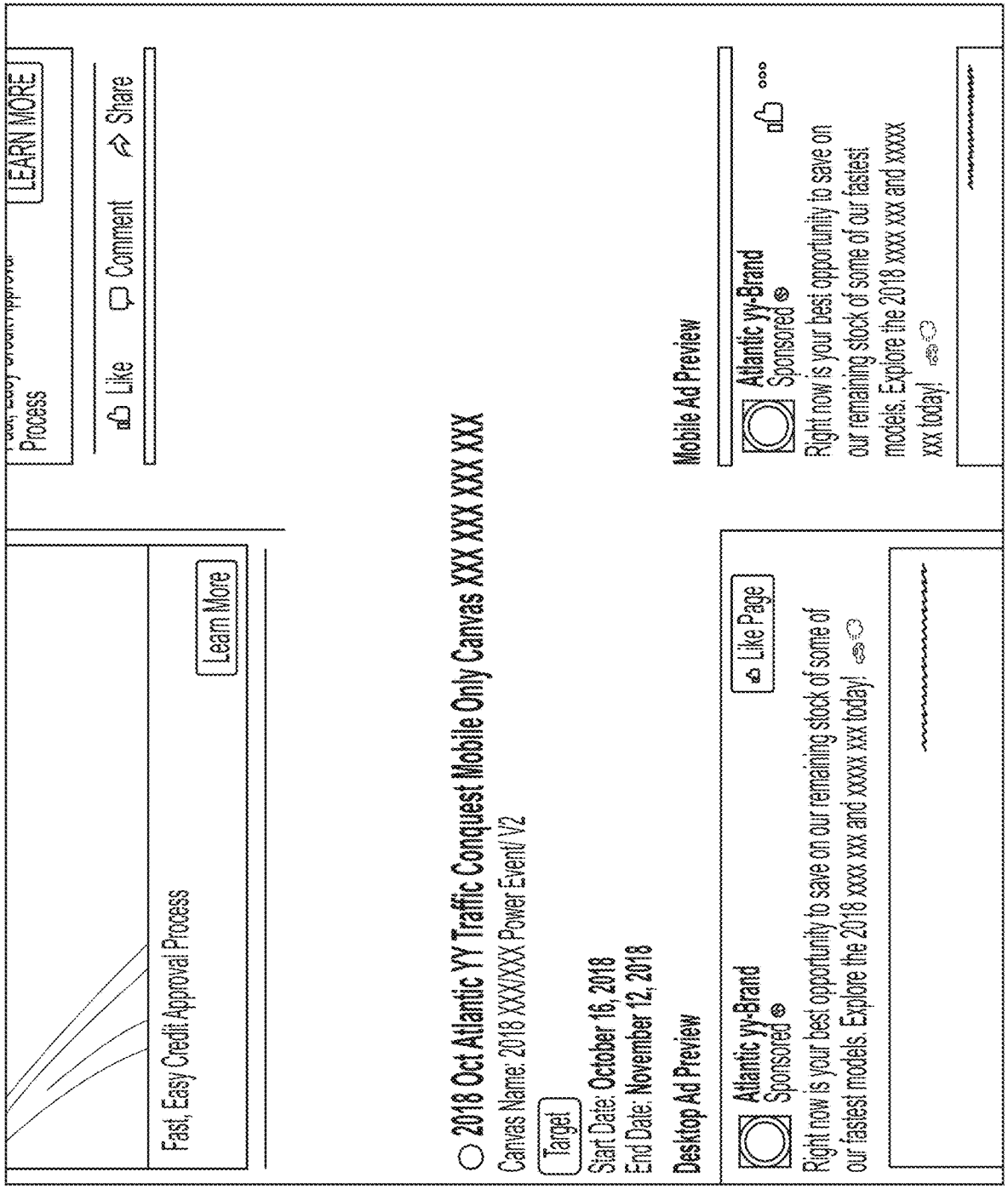
FIG. 11 illustrates another example user interface that shows previews of advertisement in one embodiment.

With the automation tool of the present disclosure, in some aspects, a user can select client advertisement accounts, and time of the advertisement, e.g., campaign year, and campaign month. FIG. 9 illustrates an example user interface that allows the user to select or input information such as client advertisement accounts and time of the advertisement, in one embodiment. The automation tool may then present all the advertisement previews for the selected time (e.g., month) and their associated metadata. FIG. 10 illustrates an example user interface that shows previews of advertisement and associated metadata in one embodiment. This unified view expedites a quality control process and allows users to bulk-review advertisements quickly with minimal page clicks. FIG. 11 illustrates another example user interface that shows previews of advertisement in one embodiment.

Figure 12:
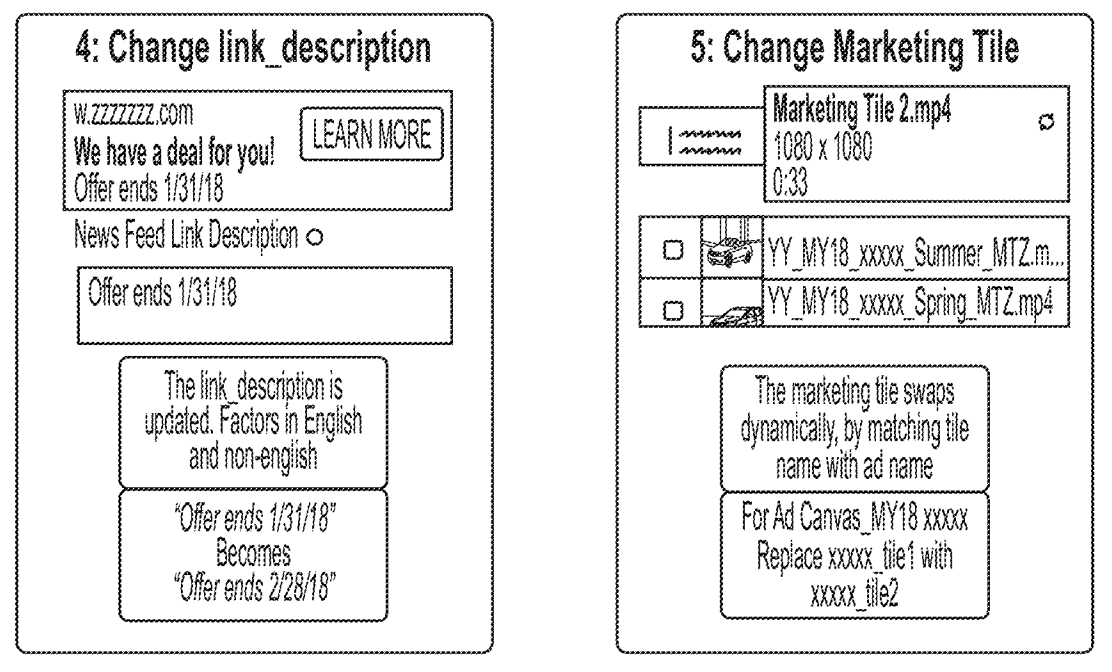

The automation tool of the present disclosure, in some aspects, may also allow for expediting workflow and quality control improvements. For example, with a single button press, the automation tool may allow users to be able to perform duplication, update names, move dates forward, change link description and change marketing title. FIG. 12 illustrates example user interfaces in one embodiment, which show progresses of duplicating updating names, moving dates forward, changing link description and changing marketing title. A single press on a user interface performs all such functions, for example, within approximately 5 seconds. In some aspects, the preview tool is used after the automation processes are invoked. The following illustrates a use case example. A client has a set of advertisements (or content) that were run in the month of April. Copying, re-naming, and altering these advertisements to prepare them for being run in March ("Flipping Months") may be a tedious, manual process. The automation tool expedites and improves this process, for example, turning a 20 minute process into a single button click. In some aspects, after the automation is complete, the preview tool may be used to visualize all the changes made to the advertisements by the automation program. Human error may be removed, with the operator overseeing the machine, rather than directly making changes to the client advertisements.

To be described in more detail below, the application and/or automation tool described herein (e.g., also described with respect to FIG. 1-12) can be implemented by at least one of the components shown in FIG. 2. For instance CPU 2 of FIG. 2 can be configured to execute the application and/or automation tool described herein by executing one or more program modules (e.g., see FIG. 13 below). Execution of each program module described herein, by processing elements such as CPU 2, can lead to specific outcomes that improve a functionality of a computing system. For example, the automation of content preview generation (see FIG. 3) using a third party's API can reduce a number of user input being received by processing elements via a network, hence reducing network traffic. Further, to be described below, existing campaign information stored in memory devices and/or databases can be managed with minimal amount of user input as well, hence reducing I/O processing time.

Figure 13:
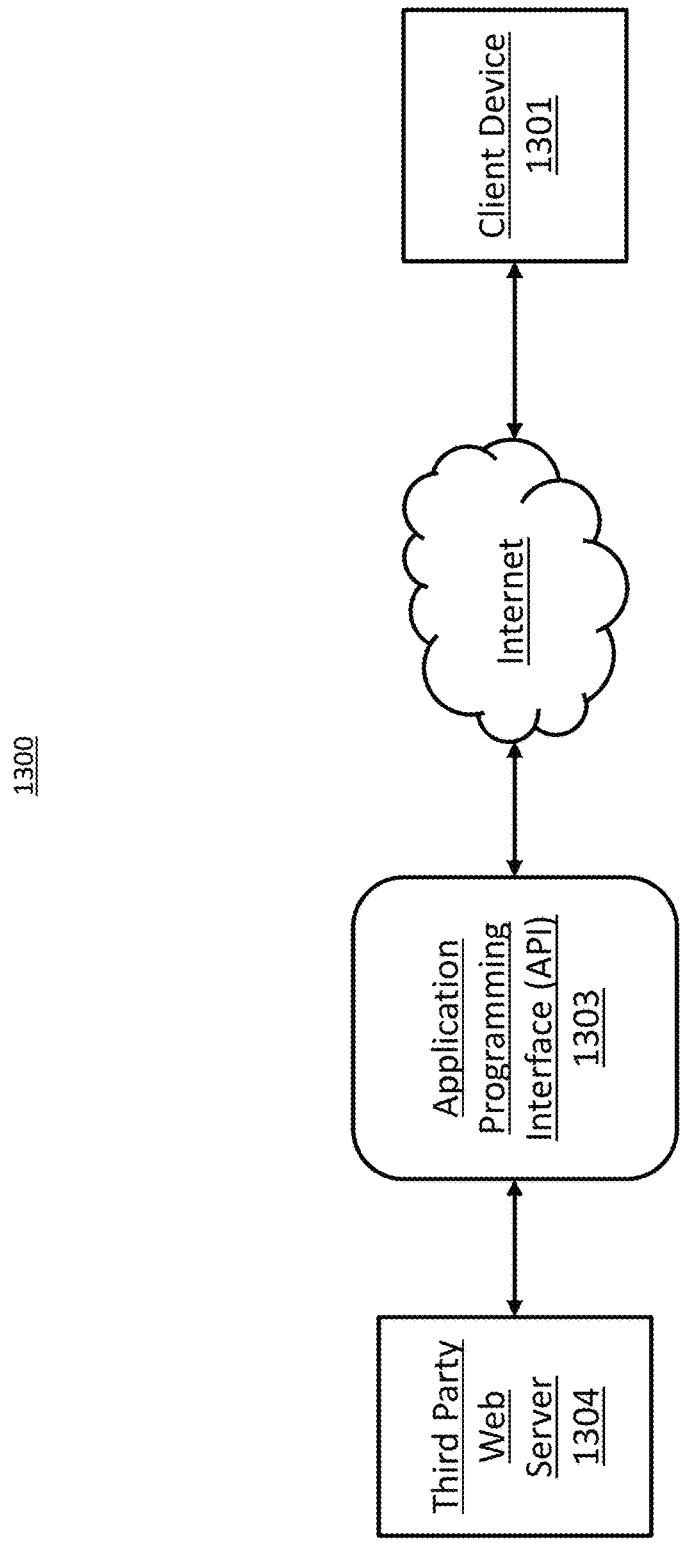
FIG. 13 is a diagram illustrating components of another system that provides an automation tool for generating online pages and links in one embodiment.

FIG. 13 is a diagram illustrating components of another system that provides an automation tool for generating online pages and links in one embodiment. The automation tool or application described herein can be implemented with a system 1300 shown in FIG. 13. System 1300 can include a client device 1301, an application programming interface (API) 1303, and a third party web server. Client device 1301 can be configured to be in communication with API 1303 via the Internet. In one embodiment, API 1303 can be a web API, of a third party (e.g., social media) associated with third party web server 1304. API 1303 can facilitate access by client device 1301 to specific components, such as data, algorithms, applications, and/or software of third party web server 1304, and the specific components can be defined by the third party. Client device 1301 can be, for example, a user device such as a desktop computer, a laptop computer, a tablet device, a mobile phone, and/or other types of computing devices. Client device 1301 can generate a request based on user inputs and/or data generated by the automation tool or application described herein. The request generated by client device 1301 can be, for example, a Hypertext Transfer Protocol (HTTP) request. Client device 1301 can send the request to third party 1304 via API 1303. In one embodiment, the request can include a query to query for a specific set of data from third party web server 1304 and/or a third party database 1305. Third party web server 1304 can respond to the request in a specific format, such as JavaScript Object Notation (JSON) or Extensible Markup Language (XML) format. from that server.

To be described in more detail below, the automation tool or application described herein can be implemented by client device 1301. Client device 1301 can receive user inputs and based on the user inputs and the automation tool, generate one or more requests to manage contents (e.g., campaigns, promotions, advertisements) that can be published on the third party's website. In one embodiment, the data being provided by third party web server 1304, in response to the requests, via API 1303 can allow client device 1301 to generate previews of contents on the client device 1301 prior to publishing the contents on the third party website. The automation tool can implement content management platform that allows the user to create new content, edit and manage existing content, generate linked content that output cookie-less content (described below), without logging into the third party website and without knowledge of now to operate the third party's application. For example, a user can use a personal computer to execute the automation tool to simulate how an advertisement may look like on Facebook® without a need to log in to his/her Facebook® account and without knowledge of how to create an advertisement using the Facebook® application.

Figure 14:
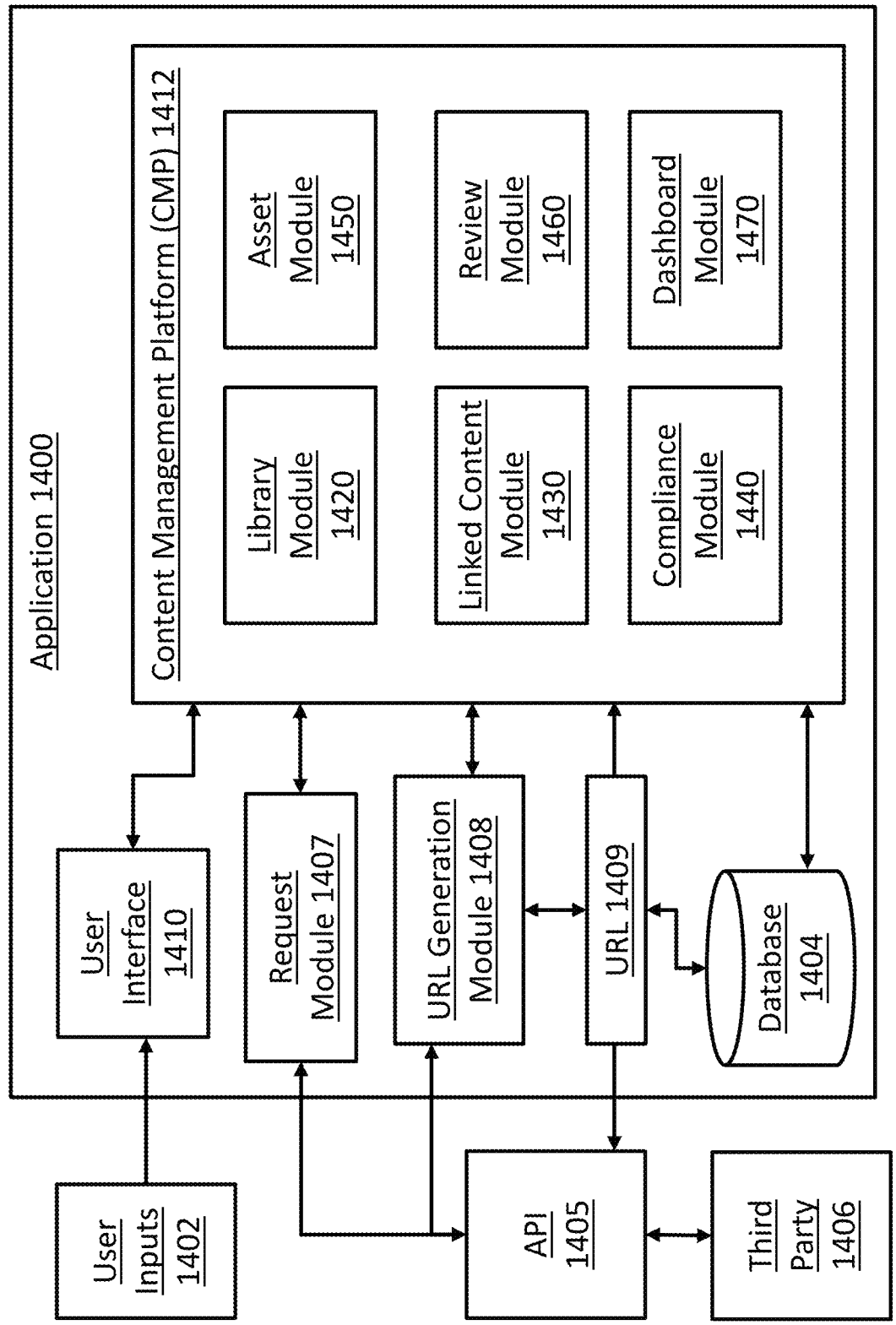
FIG. 14 is a diagram illustrating components of an application that provides an automation tool for generating online pages and links in one embodiment.

FIG. 14 is a diagram illustrating components of an application that provides an automation tool for generating online pages and links in one embodiment. The automation tool of the present disclosure, in some aspects, can be implemented as an application 1400. In one or more embodiments, application 1400 can be implemented as a web application, a server application, a smartphone app, and/or another applications, and may be executed by one or more hardware processors of a client device (e.g., client device 1301 in FIG. 13). Application 1400 can be a program module including executable code, and a processor (e.g., client device 1301 in FIG. 13) can run the executable code to execute application 1400. The program module of application 1400 can be formed by different sub-modules that are individual sets of program code or program modules. In one embodiment, application 1400 can include a user interface 1410, a request module 1407, a URL generation module 1408, and a content management platform (CMP) 1412. Each one of user interface 1410, request module 1407, URL generation module 1408, and CMP 1412 can be an individual program module including individual set of program code. Application 1400 can receive user inputs 1402, via user interface 1410, that can call or invoke the program modules of application 1400. For example, if user inputs 1402 include a command or signal to select a button in user interface 1410 representing CMP 1412, then the processor can execute the codes in the program module CMP 1412 and render CMP 1412 in user interface. Application 1400 can communicate with a web server of third party 1406 via an API 1405 (or API 1303 in FIG. 13).

URL generation module 1408 can be executed by the processor to generate a URL 1409 (see FIG. 3). URL 1409 can include, for example, a website link, and the website link can be provided to CMP 1412 to generate content that can include campaign information, such as ads, that can be rendered and/or displayed in user interface 1410 in order for a user to preview the content. In one embodiment, the rendering of content using the URL can simulate a display of the content on website or application of third party 1406. Data of third party 1406 obtained by application 1400 via API 1405 can include, for example, layouts associated with third party 1406 that can be used for ads or promotional campaigns. For example, APIs associated with a specific social media platform can include data that can be rendered by application 1400 to output a layout that can host an ad using dimensions and resolutions tailored for the specific social media platform. Each URL generated by URL generation module 1408, including URL 1409, can be stored in a memory device or database 1414. Application 1400 and its sub-modules, including CMP 1412, can be configured to access URLs stored in database 1414.

In one embodiment, CMP 1412 can be a program module formed by different sub-modules that are individual sets of program code or program modules. In the example shown in FIG. 14, CMP 1412 can include a library module 1420, a content link module 1430, a compliance module 1440, an asset module 1450, a review module 1460, and a dashboard module 1470. Functionalities of each one of these modules forming CP 1412 will be described in more detail below. In one embodiment, CMP 1412 can be displayed in user interface 1410. CMP 1412, when displayed, can allow users to manage (e.g., create, edit, configure, combine, and/or the like) URLs stored in database 1414. Users can provide user inputs 1402 to select different program modules among CMP 1412 to perform different management operations. For example, a user input selecting library module 1420 can cause the processor to execute program code of library module 1420 to output, in user interface 1410, a display of an ad library corresponding to URLs stored in database 1414. In one or more embodiments, CMP 1412 and user interface 1410 can correspond to the platforms and/or user interfaces shown in FIG. 4 to FIG. 12.

Program modules among application 1400 can generate and/or change contents, including its metadata, based on user inputs 1402 and other predetermined or predefined metadata that can be stored in database 1414. Data relating to the generation and/or changes to the contents can be provided to request module 1407. Request module 1407 can compile the data to generate requests, such as HTTP requests, and can provide the generated requests to an API 1405. API 1405, based on the requests from request module 1407, can provide data that can be read or interpreted by URL generation module 1408 to URL generation module 1408, and URL generation module 1408 can generate or update URLs based on the data received from API 1405.

For example, program modules of application 1400 can generate different metadata based on user inputs 1402 for creating a new piece of content. The generated metadata can be provided to request module 1407, and request module 1407 can compile the generated metadata to generate a HTTP request. Request module 1407 can provide the HTTP request to API 1405, and API 1405 can return content data in a specific format (e.g., JSON or XML) to URL generation module 1408. URL generation module 1408 can generate a URL 1409, based on the content data returned from API 1405, and URL 1409 can be used by application 1400 to render a preview of the content. In one embodiment, user inputs 1402 can include inputs that changes content that is already generated and stored in database 1414. For example, user inputs 1402 can include changes to content 1409 that is being stored in database 1414. Program modules of application 1400 can edit or modify metadata of URL 1409 and the modified metadata can be provided to request module 1407. Request module 1407 can generate a HTTP request to API 1405, an API 1405 can return data that can be used by URL generation module 1408 to update URL 1409. The updated URL 1409 can be used by application 1400 to render a preview of the update content.

Hence, a user can use application 1400 on a client device to generate, edit, preview content without a need to log in to third party 1406 and without knowledge of how to operate functions in a website of third party 1406. Further, application 1400 can be implemented for a user to manage contents in more than one third party sites by communicating with APIs of the more than one third party sites. For example, a user who wish to promote a product can use application 1400 to generate an advertisement for the same product on different social media. Application 1400 can be configured to generate different types of metadata based on the social media and communicate with APIs of the different social media platforms. In one embodiment, user accounts across different social media platforms can be stored as part of the users' profiles in database 1414, such that users can perform a single login to application 1400 to generate contents for same products across the different social media platforms.

FIG. 15A, FIG. 15B, FIG. 15C, FIG. 15D are diagrams illustrating a user interface associated with a content management platform in one embodiment. User interface 1410 can be displayed using, for example, an internet browser and/or applications running on a computing device (e.g., desktop computer, laptop computer, tablet devices, cellular phone including smart phones). In one embodiment, user interface 1410 can include a menu 1411, a dashboard 1413, and a display region 1414. Dashboard 1413 can include N tabs, ranging from tab 1415-1 to 1415-N. The number of tabs (e.g., N) in dashboard 1413 can be configurable and can depend on user permissions (described below). Each tab in dashboard 1413, when selected by user inputs 1402, can invoke a corresponding program module in application 1400 (see FIG. 14). Each program module in application 1400, when invoked by selection of a tab in dashboard 1413, can cause the processor executing application 1400 to output a selected user interface 1416 associated with the invoked program module in display region 1414.

Menu 1411 can include components such as indicators showing which tab in dashboard 1413 is selected by a user, a search box to search for specific text, numbers, symbols, navigation buttons such as an address input bar, refresh button, forward button, back button, bookmark button, and the like. In one embodiment, some of the components in menu 1411 can remain unchanged in response to selection change in dashboard 1413 and/or changes to selected user interface 1416 in display region 1414.

Figure 15A:
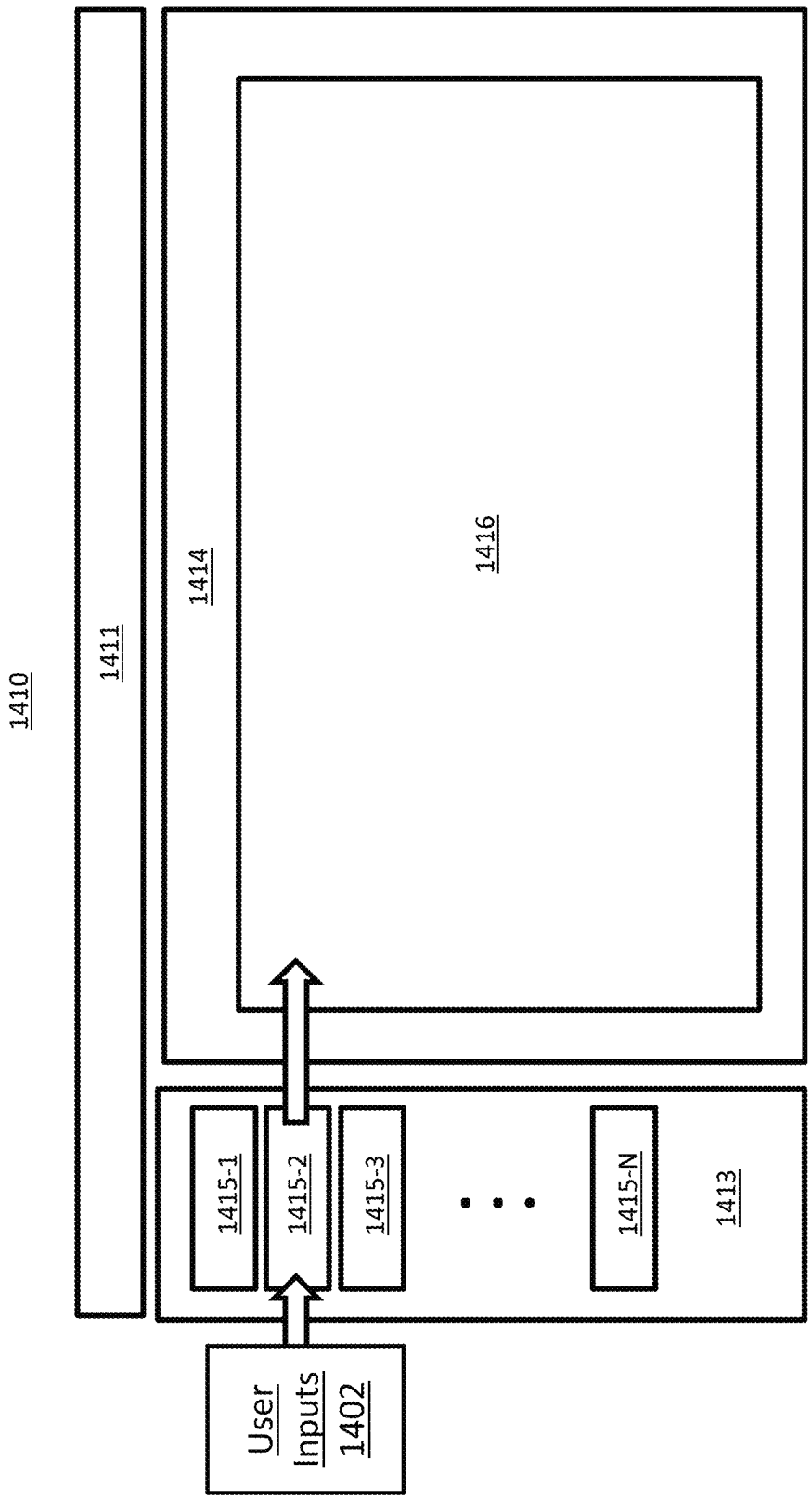
FIG. 15A is a diagram illustrating a user interface associated with a content management platform in one embodiment.
Figure 15B:
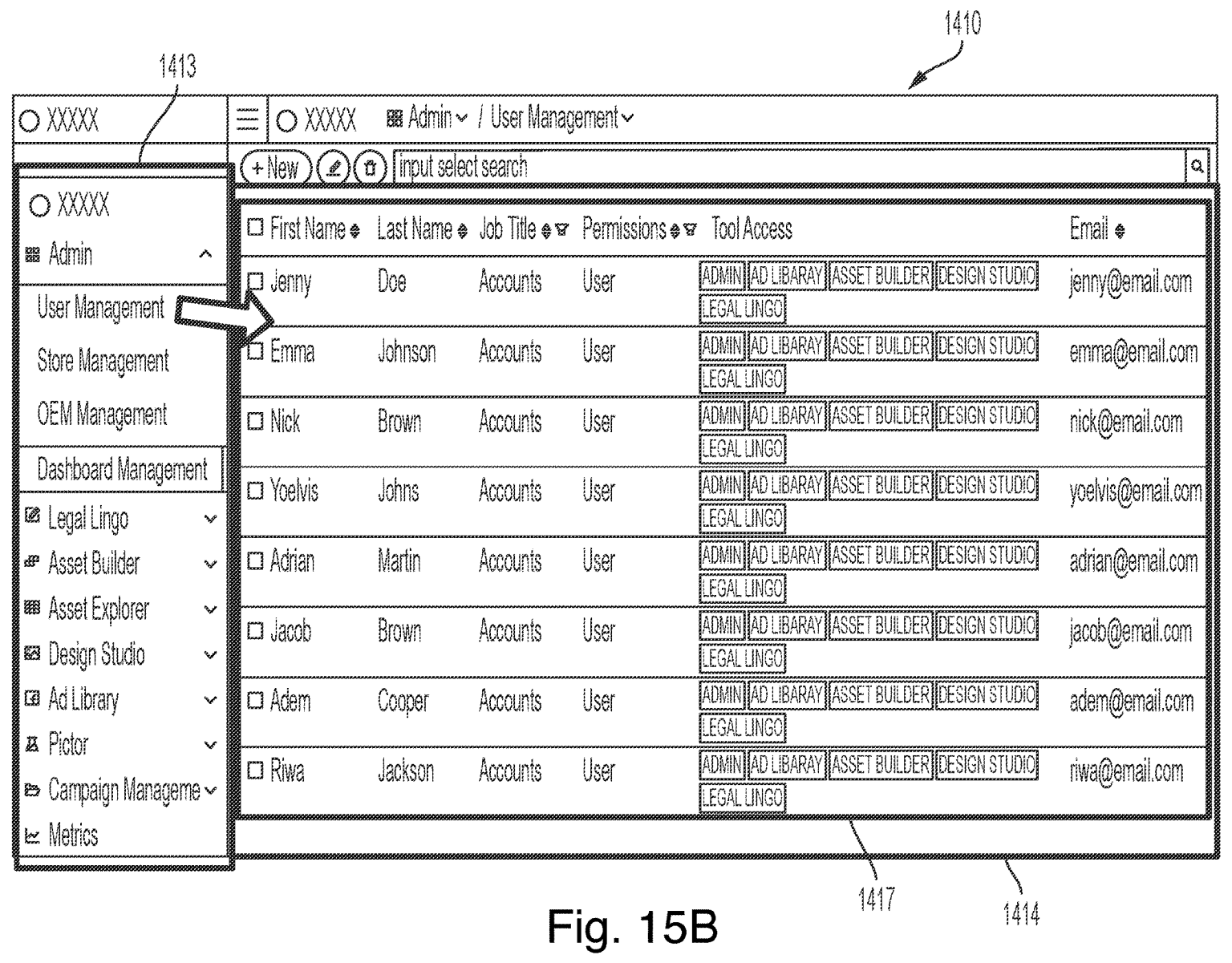

In an example shown in FIG. 15B, in response to a selection of a user management tab in dashboard 1413, a selected user interface 1417 can be outputted in display region 1414. Selected user interface 1417 can include and display a number of items that can be arranged as a list. Other arrangements of the items, such as tiles, icons, or the like, in selected user interface 1417 can be specified by a user. In one embodiment, the items in selected user interface 1417 can be information indicating user settings, such as user names (e.g., first, last, middle names), job titles, permissions, tool access, email addresses, and other types of information of a plurality of users. Further, users can enter one or more keywords (e.g., text, numbers, symbols) in a search box among menu 1411 (see FIG. 15A) to search for an item among the items displayed in selected user interface 1417.

In one embodiment, the permissions in selected user interface 1417 can be a user permission to use different tools of CMP 1412. The tool access in selected user interface 1417 can be tools that can are accessible and/or inaccessible to the users based on the permission shown in selected user interface 1417. The tools under tool access can be categorized, such being color coded, to distinguish between being accessible or inaccessible to a corresponding user. For example, a user with the "User" permission may not have access to the "ADMIN" tool, but a user with "Super Admin" permission can have access to the "ADMIN" tool. For users that do not have access to the "ADMIN" tool, the "ADMIN" tool under tool access can be displayed as a first color or shade to that it is inaccessible to the user. For users that do have access to the "ADMIN" tool, the "ADMIN" tool under tool access can be displayed as a second color or shade to that it is accessible to the user. Further, dashboard 1413 can include different tabs for different user permissions. For example, a "Dashboard Management" tab (further escribed below) can be displayed for a user with "Super Admin" permission, but may be invisible to a user with "User" permission.

In an example shown in FIG. 15C, in response to a selection of a store management tab, a selected user interface 1418 can be outputted in display region 1414. Selected user interface 1418 can include and display information relating to a number of URLs corresponding to one or more stores arranged as a list. For example, when application 1400 is implemented for car dealerships, each car dealership location or branch can include one or more distinct URLs that promote different campaigns. Other arrangements of the items, such as tiles, icons, or the like, in selected user interface 1418 can be specified by a user. In one embodiment, the items in selected user interface 1418 can be arranged based on entities (e.g., businesses and/or organizations), such as car dealerships, retail, stores, and other various brand and brand partner sites, etc. For example, FIG. 15C shows a list of URLs for contents (e.g., ads) associated with different stores or branches of car dealerships that are posted on different accounts of a specific third party site, such as Facebook®.

The items in selected user interface 1418 can be managerial information relating to stores or branches, such as localized advertising and marketing activities, ad information, accounts information such as store names, store original equipment manufacturers (OEMs), store locations, store URL (e.g., URL including contents such as ads generated by the automation tool), site-specific access information such as account IDs, page IDs, catalog IDs, and other types of information relating to the URLs. Selected user interface 1418 can allow users to have an overall view of URLs generated by the automation tool described herein for performing managerial decisions. Further, users can enter one or more keywords (e.g., text, numbers, symbols) in a search box among menu 1411 (see FIG. 15A) to search for an item among the items displayed in selected user interface 1418.

Figure 15D:
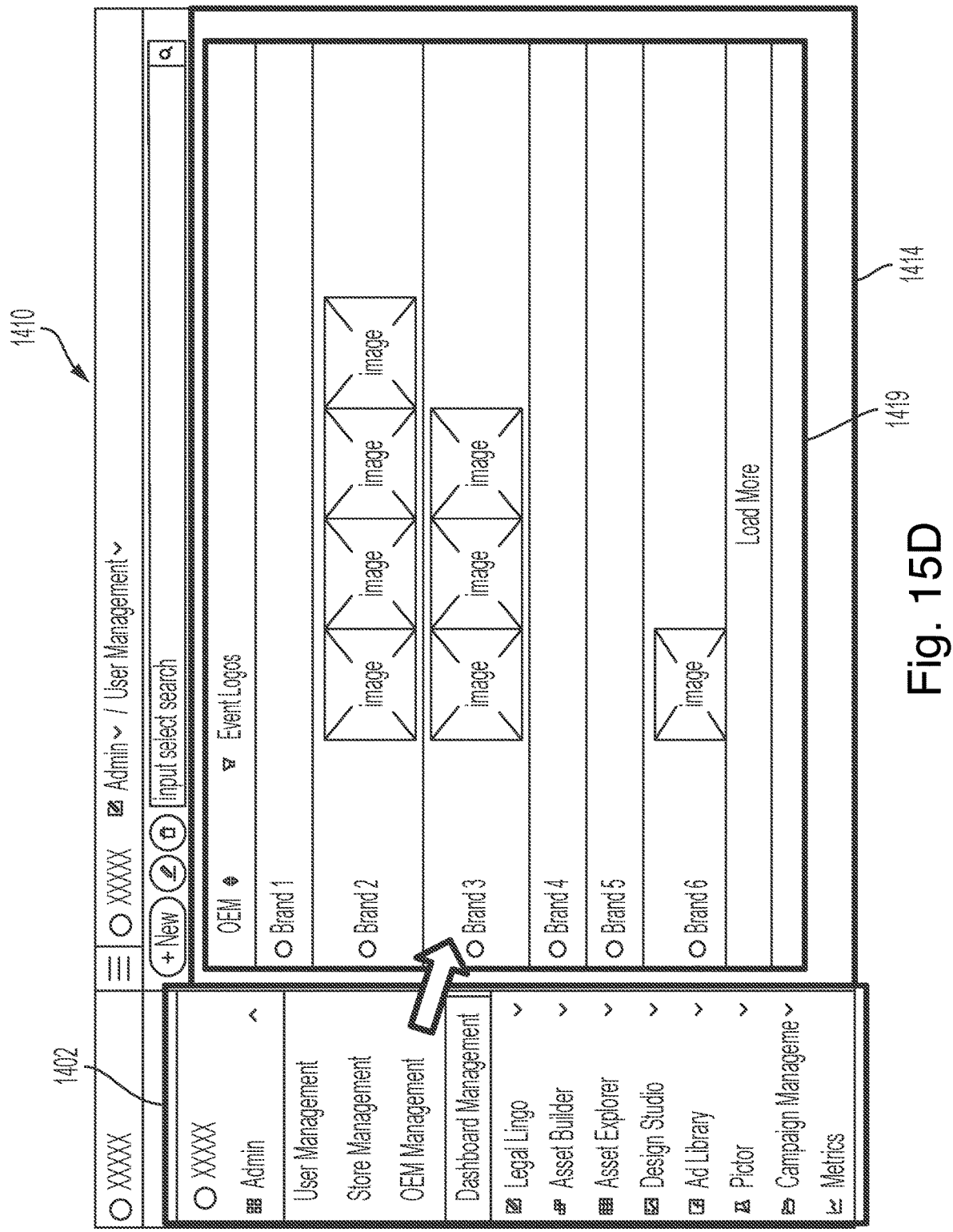
FIG. 15D is a diagram illustrating another example of the user interface of FIG. 15A in one embodiment.

In an example shown in FIG. 15D, in response to a selection of an OEM management tab, a selected user interface 1419 can be outputted in display region 1414. Selected user interface 1419 can include and display information relating to specific brands, such as brand assets (e.g., logos, slogans, symbols, and/or promotional images and videos that are premade). In one embodiment, the brand assets in selected user interface 1419 can be displayed as images. Selected user interface 1419 can allow users to view a layout showing brand assets of specific brands that can are being used in generated URLs, or can be used for generating new URLs. Further, users can enter one or more keywords (e.g., text, numbers, symbols) in a search box among menu 1411 (see FIG. 15A) to search for an item among the items displayed in selected user interface 1419.

FIG. 16A, FIG. 16B, FIG. 16C, FIG. 16E are diagrams illustrating a user interface associated with a content library in one embodiment. In one embodiment, in response to a selection of an "Ad Library" tab in dashboard 1413, a selected user interface 1600 can be outputted in display region 1414 (see FIG. 15A). Selected user interface 1600 can be a content library including one or more pieces of contents (e.g., campaigns, promotions, ads), such as content 1610, corresponding to URLs generated by URL generation module 1408 and stored in database 1414.

Figure 16A:
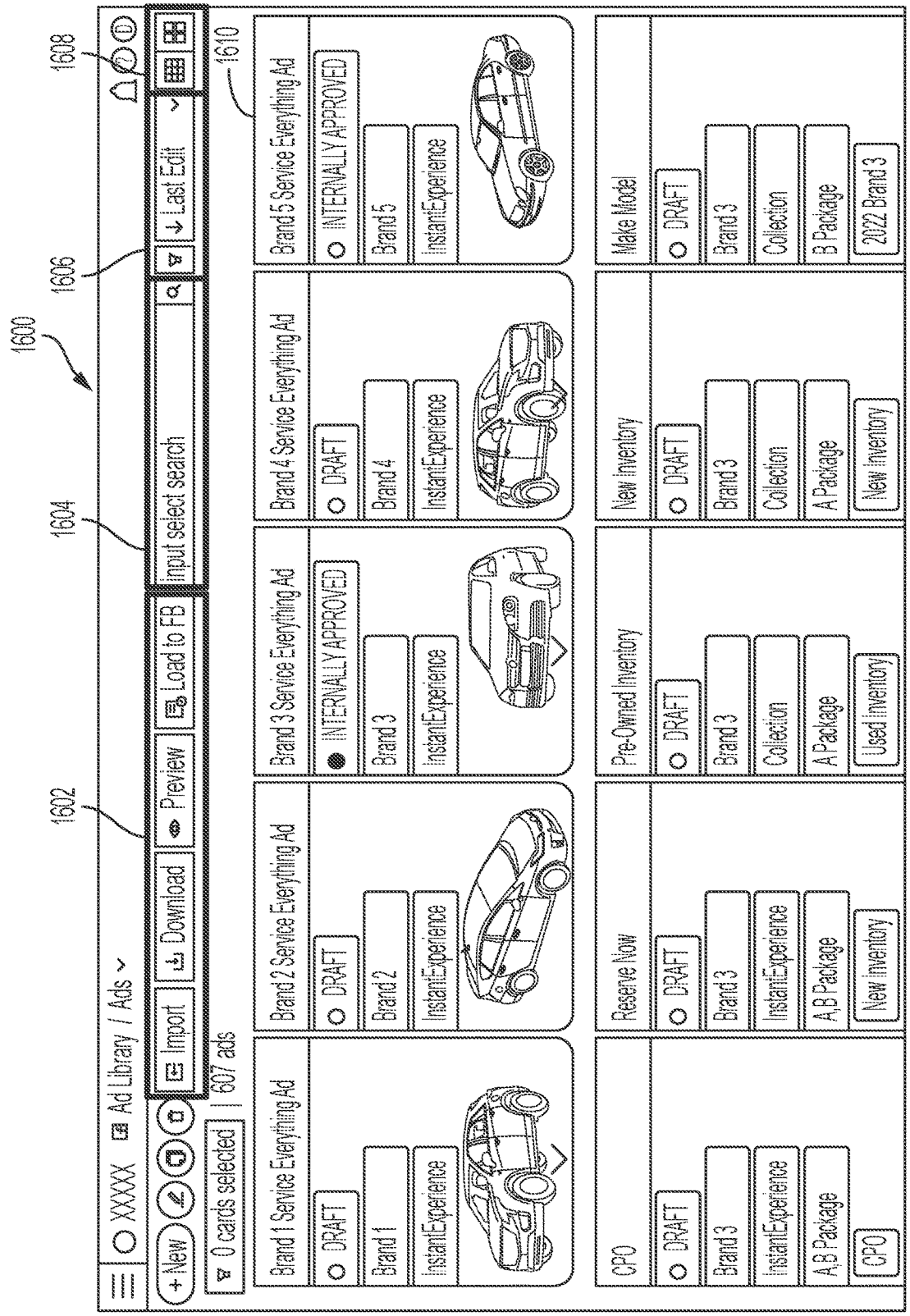
FIG. 16A is a diagram illustrating a user interface associated with a content library in one embodiment.

Selected user interface 1600 can further include an action region 1602, a filter 1606, and a view toggle 1608. Action region 1602 can include prompts or buttons for a user to, for example, download contents from the ad library, import contents, preview contents, and load contents to third party site (e.g., load to FB, where FB denotes Facebook®). Filter 1606 can allow users to filter and/or sort the contents being displayed in selected user interface 1600. View toggle 1608 can allow users to toggle between different views of contents in selected user interface 1600, such as a tile view (as shown in FIG. 16A), icon view, list view, and other types of views. A search box 1604 is also displayed in selected user interface 1600, where search box 1604 can be a part of menu 1411 shown in FIG. 15A. In one embodiment, in response to the selection of the "Ad Library" tab in dashboard 1413, the processor executing application 1400 can resize the search box in menu 1411 and output the resized search box as search box 1604. The resizing can be performed to accommodate different number of buttons in action region 1602, filter 1606, and view toggle 1608.

Figure 16B:
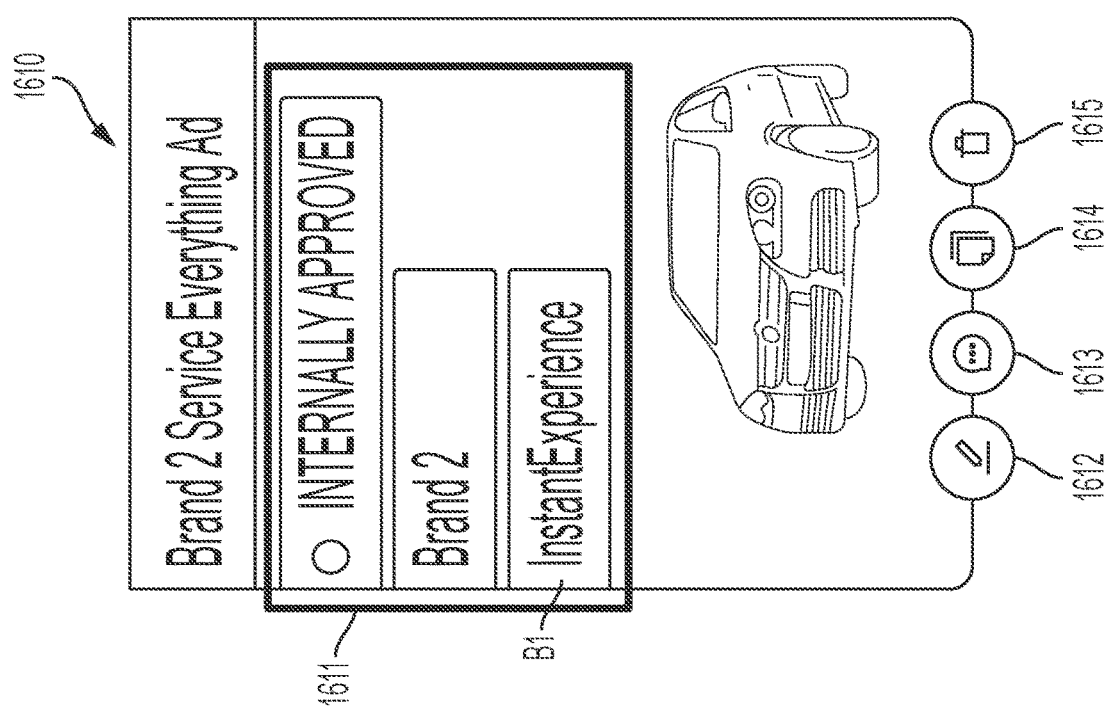
FIG. 16B is a diagram illustrating an example of the content library of FIG. 16A in one embodiment.

In one embodiment, a selection of a piece of content displayed in selected user interface 1600 can cause the processor to output a detailed view of the selected content. For example, FIG. 16B shows a detailed view of content 1610. In the detailed view of content 1610, a region 1611 can show a plurality of metadata of content 1610. Region 1611 can indicate "INTERNALLY APPROVED", which means content 1610 is approved by, for example, an administrator. Some contents in selected user interface 1600 can indicate "DRAFT" instead of "INTERNALLY APPROVED", meaning the content is still in a drafting stage and not yet approved. Region 1611 can include other metadata such as a brand name, a campaign type, an inventory status (e.g., for car dealership, used car or new car), and other types of metadata. Further, region 1611 can include a button B1 associated with linked contents generated by content link module 1430. In response to selecting button B1, a preview of a linked content (described below) that includes content 1610 can be displayed on user interface 1410. In one embodiment, a size of region 1611 can be automatically adjusted by the processor depending on a number of metadata to be displayed in region 1611.

The detailed view of content 1610 can further include a plurality of buttons 1612, 1613, 1614, 1615 that can allow users to apply different operations on content 1610. For example, button 1612 can allow users to edit content 1610, button 1613 can allow users to preview content 1613, button 1614 can allow users to duplicate content 1610, button 1615 allows users to delete content 1610 from the ad library (and the database 1414).

Figure 16C:
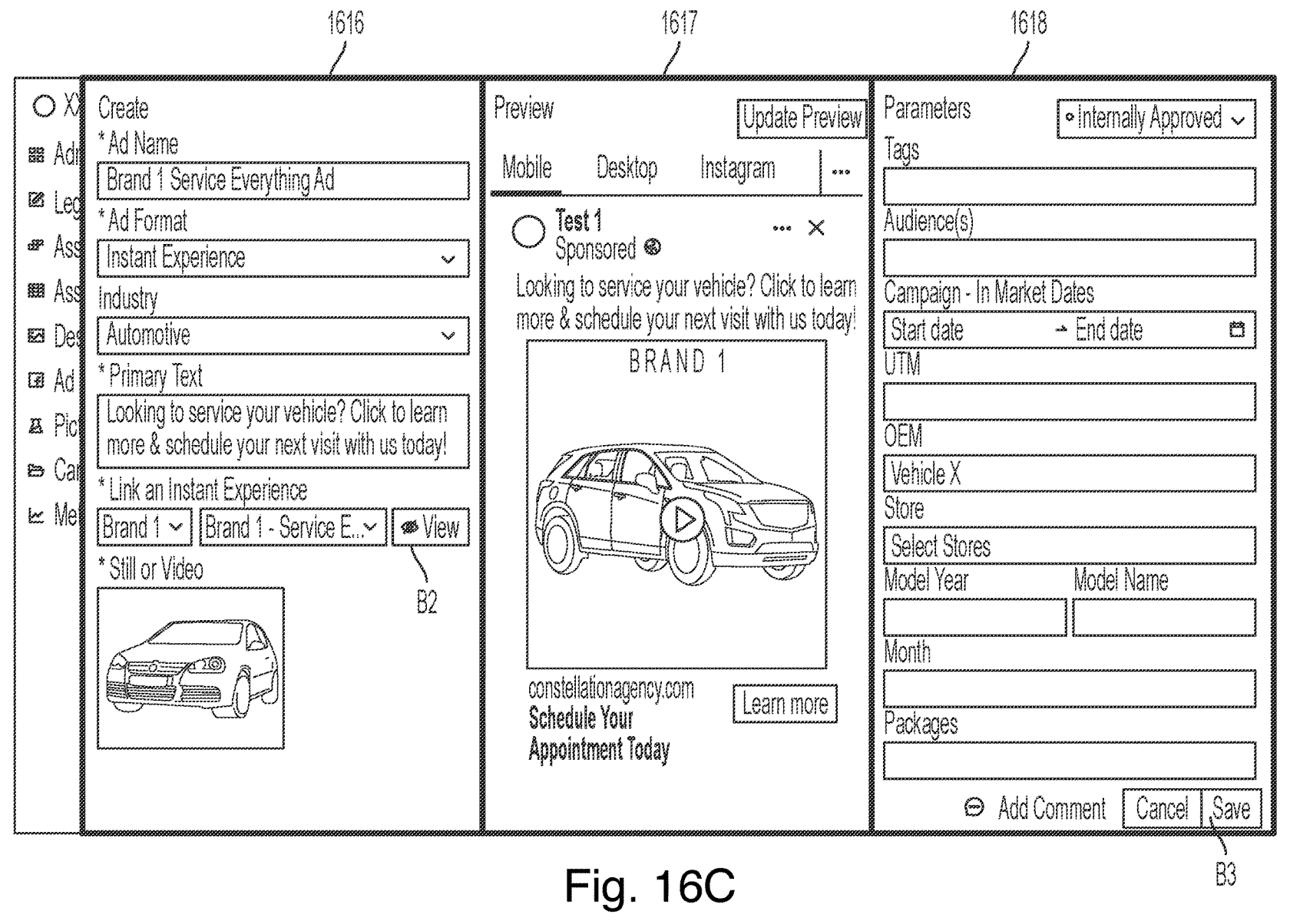

In one embodiment, in response to a selection of button 1612, a plurality of user interfaces 1616, 1617, 1618, as shown in FIG. 16C, can be outputted and overlay at least a portion of selected user interface 1600. User interface 1616 can include one or more input fields for users to enter various information such as Ad Name, Ad Format, industry, etc. In one embodiment, user interface 1616 can be associated with linked content generated by composer module 1430 (described below). User interface 1616 can include a View button labeled as button B2. In response to selecting button B2, user can preview linked content that includes content 1610. To be described in more detail below, a linked content generated by content link module 1430 can be content is linked to additional websites or URLs, where the linking can be specified by users of application 1400 and the linked websites can be accessed within applications of third party platforms without a need to use an Internet browser (e.g., cookie-less content).

User interface 1617 can allow users to preview content under different platforms, such as mobile internet browser, desktop internet browser, Instagram®, etc. User interface 1618 can allow users to enter other metadata such as OEM, store, tags that can appear on social media pages, etc. Information entered by users in user interfaces 1616, 1618 can be saved by selecting a save button denoted as B2. In response to saving the entered information using button B2, application 1400 can send the entered information to request module 1407. Request module 1407 can generate HTTP requests to API 1405 and API 1405 can return data that can be processed by URL generation module 1408 to update the URL of content 1610.

Figure 16D:
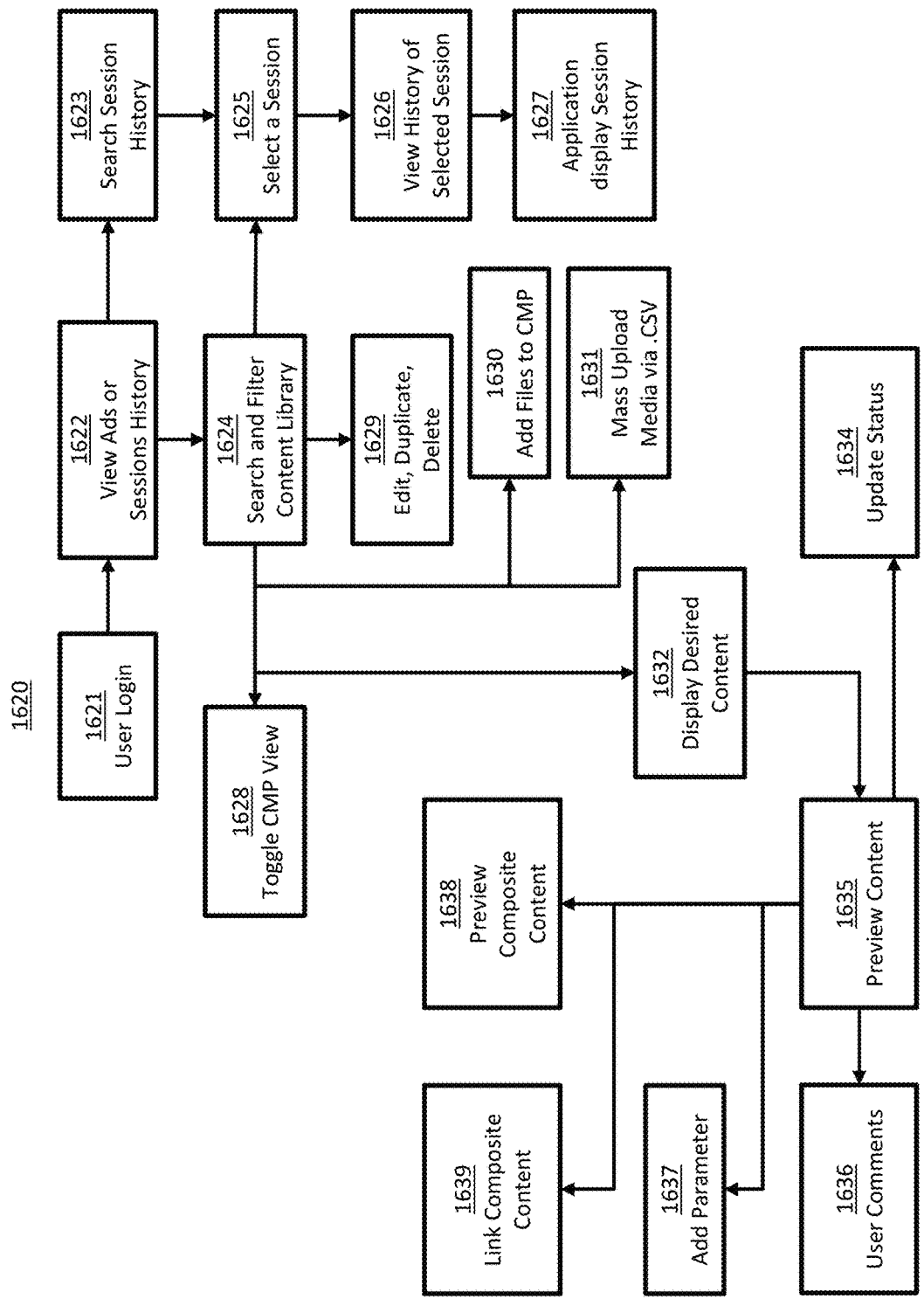
FIG. 16D is a flowchart showing an example process relating to the content library of FIG. 16A in one embodiment.

FIG. 16D is a flowchart showing an example process relating to the user interface associated with a content library in one embodiment. A process 1620 can be performed by a processor executing one or more program modules among application 1400. Process 1620 can begin at block 1621, where a user can login to application 1400. Upon logging in at block 1621, at block 1622, the user can select one of "View Ads" and "Session History". Selection of "View Ads" may cause the processor to output selected user interface 1600 shown in FIG. 16A, and process 1620 can proceed to block 1624. Selection of "Session History" may cause the processor to output another selected user interface 1650, shown in FIG. 16E, and process 1620 can proceed to block 1623. The interface outputted in response to selecting "Session History" can allow the user to view users who has recently logged in and whether the logged in users modify the contents of URLs stored in database 1414.

At block 1623, the logged in user can search session history by inputting search terms to application 1400 using user interface outputted in response to the selection made at block 1620. Search terms that can be received by application 1400 can include, but limited to, ad information, load state, session name, last updated at, last updated by, created at, created by, campaign name, ad set name, ad name, format, client name, and/or other types of information. Application 1400, in response to receiving one or more search terms, can generate a query to database 1414. Database 1414 can return a result based on the query and application 1400 can output one or more sessions that matches the search terms, and process 1620 can proceed to block 1625.

At block 1625, the logged in user can select a session among the sessions outputted by application 1400 at block 1623. Process 1620 can proceed to block 1626. At block 1626, the user can select to view a history of the session selected at block 1625. In response to the selection at block 1626, process 1620 can proceed to block 1627, where application 1400 can display the history of the selected session on the user interface 1650 in FIG. 16E. For example, application 1400 can output ad information, load state, session name, last updated at, last updated by, created at, created by, campaign name, ad set name, ad name, format, client name, and/or other types of information of the selected session.

At block 1624, application 1400 can display user interface 1600 shown in FIG. 16A. The logged in user can search and filter contents being displayed in user interface 1600. Based on the search and filter actions by the user, process 1620 can proceed to blocks 1628, 1629, 1630, 1631, 1632. At block 1628, the user can toggle views (e.g., tile or list view) of CMP 1412. In one embodiment, the user can toggle the views based on client, industry sector, etc. At block 1629, the user can perform additional actions such as edit, duplicate, delete contents. At block 1630, the user can add files, such as images, videos, audio files, to CMP 1412. At block 1631, the user can mass upload media files such as multiple images, videos, audio files, etc., using comma-separated values (CSV) files. At block 1632, application 1400 can display a desired content (e.g., the searched and filtered content at block 1624).

In response to desired content being displayed at block 1632, process 1620 can proceed to block 1635. At block 1635, the user can preview the desired content being displayed. Process 1620 can proceed from block 1635 to blocks 1634, 1636, 1637, 1638, 1639. At block 1634, the user can update status of the desired content such as whether the content is a draft, disapproved, awaiting approval, internally approved, co-op approved (e.g., when approval from more than one person is needed). At block 1636, the user can view user comments, that may be inputted by users of third party 1406, on the desired content. At block 1637, the user can add parameters such as tags (e.g., social media hashtags), audience details, dates (e.g., flight dates for when a campaign goes live), urchin tracking modules, OEM, store details, promotion packages, etc. . . . At block 1638, the user may preview linked content (described below with respect to FIGS. 17A-17D) and at block 1639, the user may link various websites or URLs to content generated by application 1400 (described below with respect to FIG. 17A-17D).

Figure 17A:
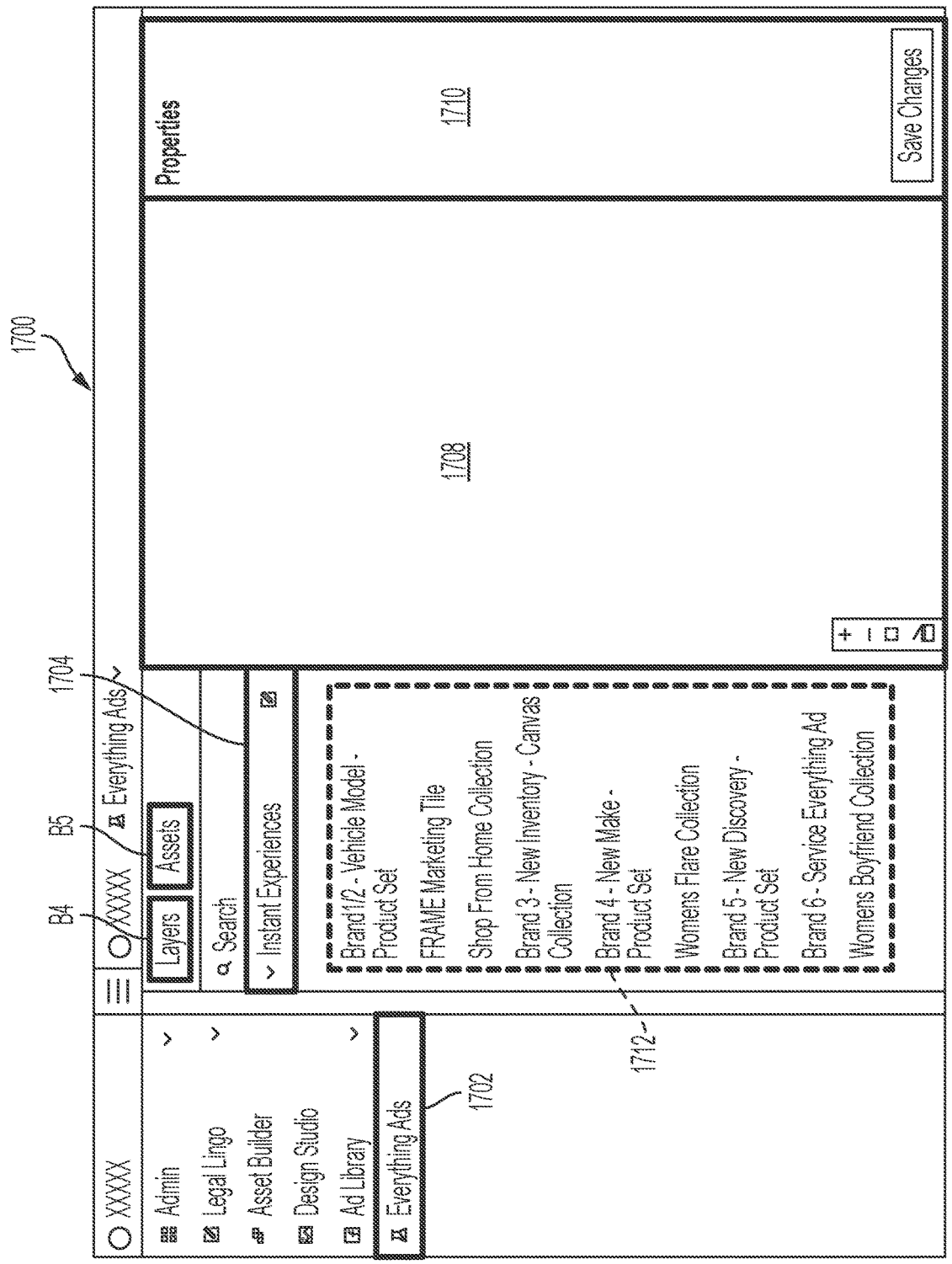
FIG. 17A is a diagram illustrating a user interface associated with a content composer in one embodiment.

FIG. 17A is a diagram illustrating a user interface associated with a content composer in one embodiment. In one embodiment, in response to a selection of an "Everything Ad" tab 1702 in dashboard 1413 (see FIG. 15A), a selected user interface 1700 can be outputted in display region 1414 (see FIG. 15A). Selected user interface 1700 can allow users to link websites or URLs to content generated by application 1400, to generate linked content. The linked content can allow users to access websites within applications of third party platforms without a need to use an Internet browser (e.g., cookie-less content). In one embodiment, the linked content can be published to third party 1406, can be displayed on an application of third party 1406 as a still image, a banner, video, or the like. Selected user interface 1700 can include a region 1708 and a region 1710. Region 1708 can be reserved for a canvas to generate a linked content and region 1710 can be reserved for input fields for users to set properties of the linked content being generated in region 1708. In the example shown in FIG. 17A, in response to a selection of "Assets" using a button B5, an "Instant Experience" tab 1704 can be displayed. In response to tab 1704 being selected by a user, a list 1712 of contents that can be used for generating a linked content can be listed.

Figure 17B:
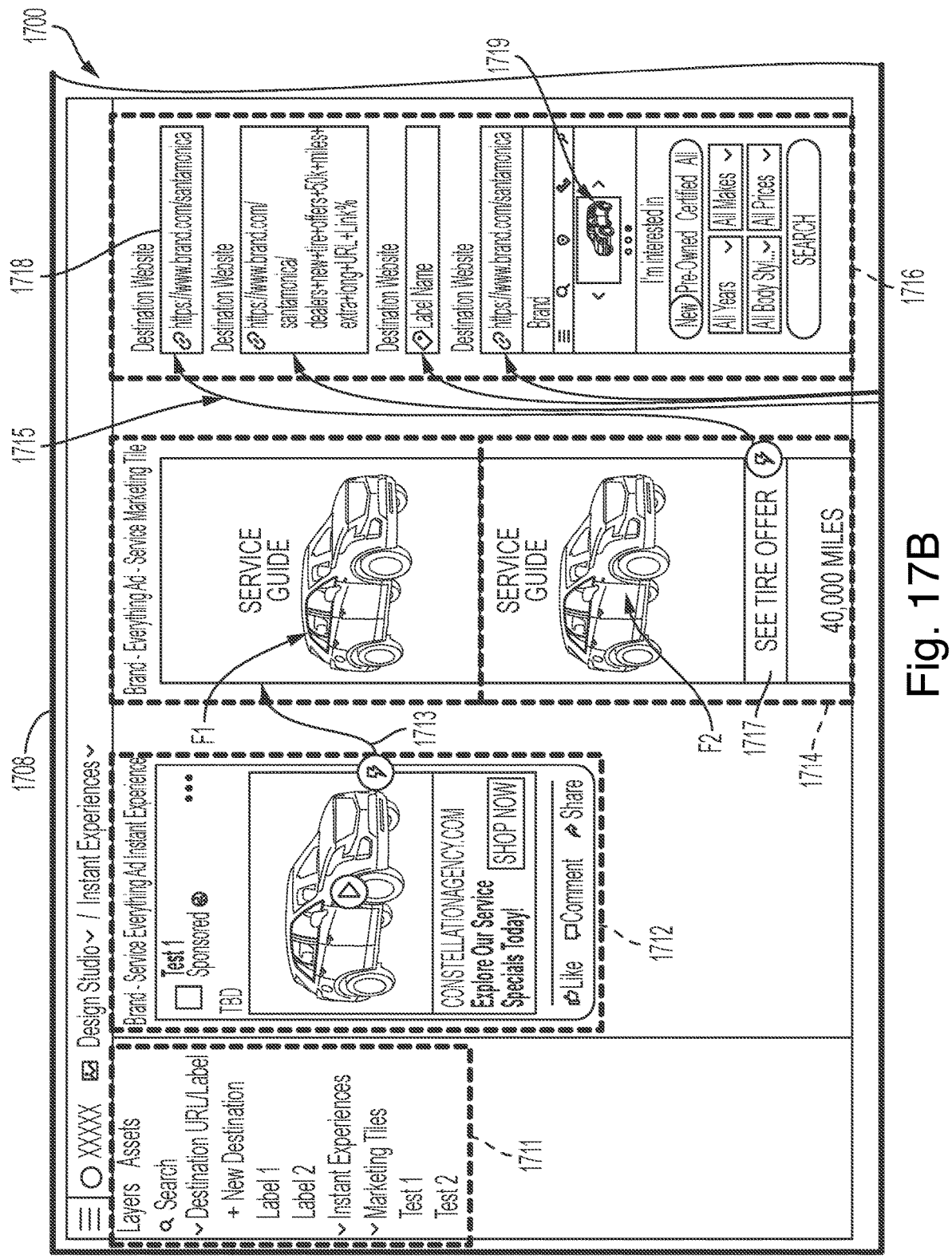
FIG. 17B is a diagram illustrating an example of the content composer of FIG. 17A in one embodiment.
Figure 17B:
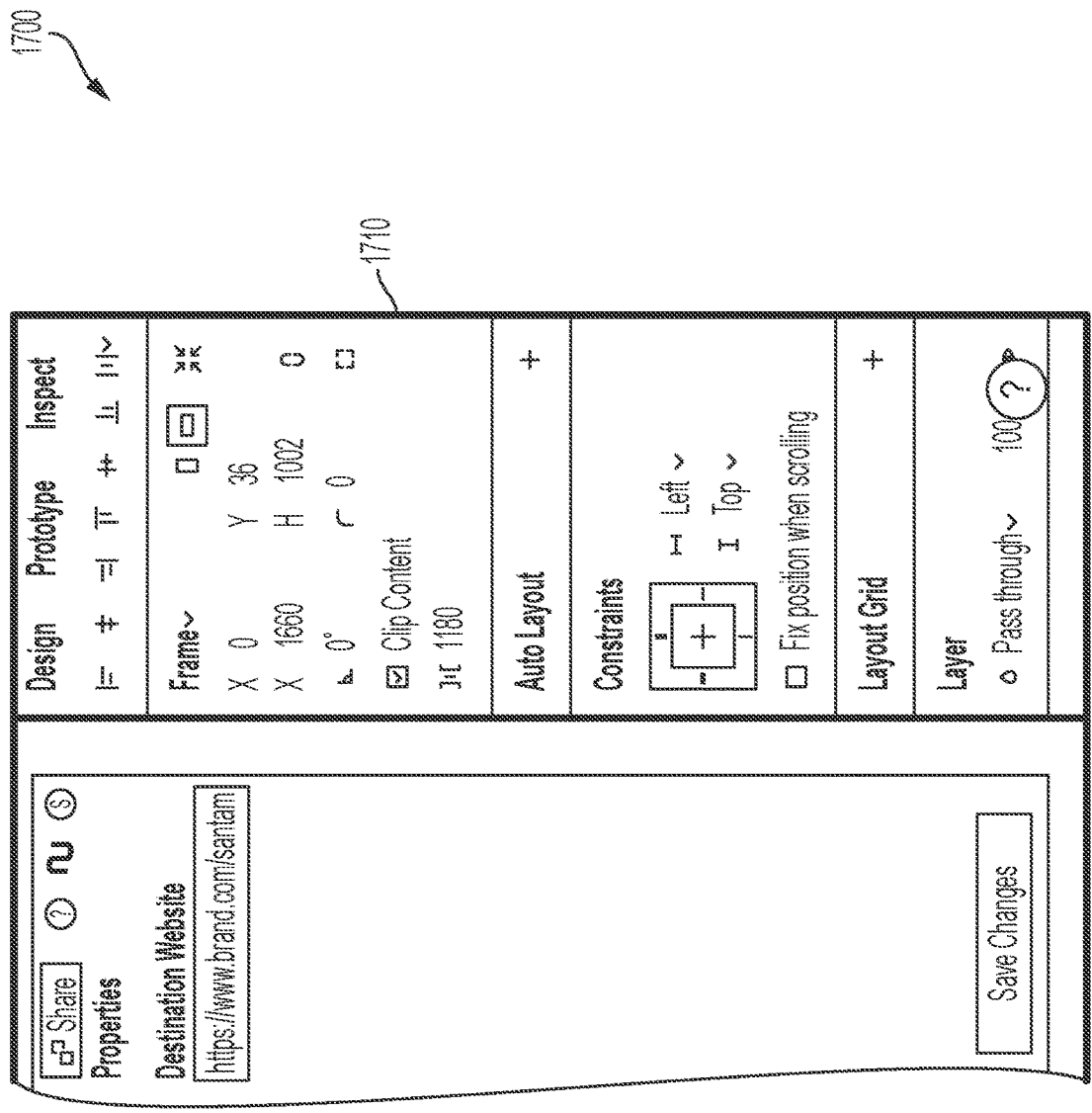

Referring to FIG. 17B, in response to a selection of "Layers" in FIG. 17A using a button B5, application 1400 can output a list 1711 of components that can be used for building or creating a linked content. The components can include, but not limited to, linked contents that are already generated and stored in database 1414 (e.g., shown as "Instant Experiences" in FIG. 17B), marketing tiles, and destination URL or labels. In the example of FIG. 17B, a marketing tile 1712, a linked content 1714, and a plurality of destinations or extensions 1716, can be placed in region 1708. Marketing tile 1712 can be a preview or simulation of a marketing tile of linked content 1714 that can be displayed (e.g., as a marketing tile) on a social media platform. Linked content 1714 shown in region 1708 can be a preview or simulation of linked content 1714 being displayed on a social media platform. Destinations 1716 can be one or more URLs or links, webpages, advertisements (e.g., other content generated by URL generation module 1408) that are linked to linked content 1714.

A user can use selected user interface 1700 to edit linked content 1714 and can change the destinations being linked to linked content 1714. For example, a user can assign a marketing tile to a linked content by setting a link path, as shown by a link path 1713 linking marketing tile 1712 to linked content 1714. In one embodiment, a user can use input devices such as computer mouse, computer keyboard, pressure (e.g., touch screen), or the like, to generate the link paths to connect components to generate linked contents. The signals resulting from these input devices (e.g., user inputs 1402) can be received by linked content module 1430, and linked content module 1430 can linked two components based on locations of the components placed in region 1708 and a location, size, starting and ending points of the link path. For example, based on locations of marketing tile 1712, linked content 1714, link path 1713, and in region 1708, linked content module 1430 can determine that the starting point of link path 1713 overlaps with a portion of marketing tile 1712 and the ending point of link path 1713 overlaps with a portion of linked content 1714, hence determine that link path 1713 links marketing tile 1712 to linked content 1714.

In one embodiment, the link paths connecting or linking components can also define a hierarchy of the components of the linked content. For example, marketing tiles can be categorized by application 1400 as the highest layer, components such as images, videos, animated images, or other media can be categorized by application 1400 as intermediate layers, and extensions or destinations such as web addresses or URLs to other websites can be categorized by application 1400 as the lowest layer. The categories of the layers can prevent users from linking incorrect components when building linked content. For example, if a user links marketing tile 1712 to destination 1716, application 1400 can output a notification to indicate that incorrect layers are being linked.

In one embodiment, linked content 1714 being simulated in region 1708 can include one or more frames (e.g., if the advertisement is a video), such as frames F1 and F2 shown in FIG. 17B. Users can link different portions of the frames to different destinations. For example, frame F1 is not linked to any destination. A portion 1717 in frame F2 can be linked to a destination 1718, which can be a URL of a website, via a link path 1715. Another frame (not shown) can be linked to a destination 1719, which can be a website, via another link path. Users can link different parts and/or frames of a piece of content to different destinations. Further, a plurality of adjustable settings can be displayed in region 1710 for the user to design different aspects of linked content 1711. Users can also share linked contents with other users that are registered to use application 1400.

In one embodiment, the linked contents being generated by linked content module 1430 can be referred to as "Everything Ads" since the users can link different destinations relating to a piece of content. By using application 1400 to link destinations to a piece of content, the linked destinations can be opened or invoked within an application of third party 1406 instead of another application (e.g., internet browser) outside of third party 1406. For example, if a user views linked content 1714 in the Facebook® application, a selection of portion 1717 can open a website hosted by destination 1718 within the Facebook® application instead of an internet browser. Further, third party 1406 can continue to track usage data (e.g., user preference, network traffic, network footwork, dwell time, and/or other types of usage data) of the user, instead of losing track of the usage data to other applications (e.g., internet browsers). Furthermore, by maintaining, navigating, and/or opening destination websites in the same application where the linked content was viewed (e.g., in the social media platform), retargeting of data through cookies can be avoided. Still further, users can create, modify, and preview the linked contents described herein using application 1400 without a need to login to social media applications.

Figure 17C:
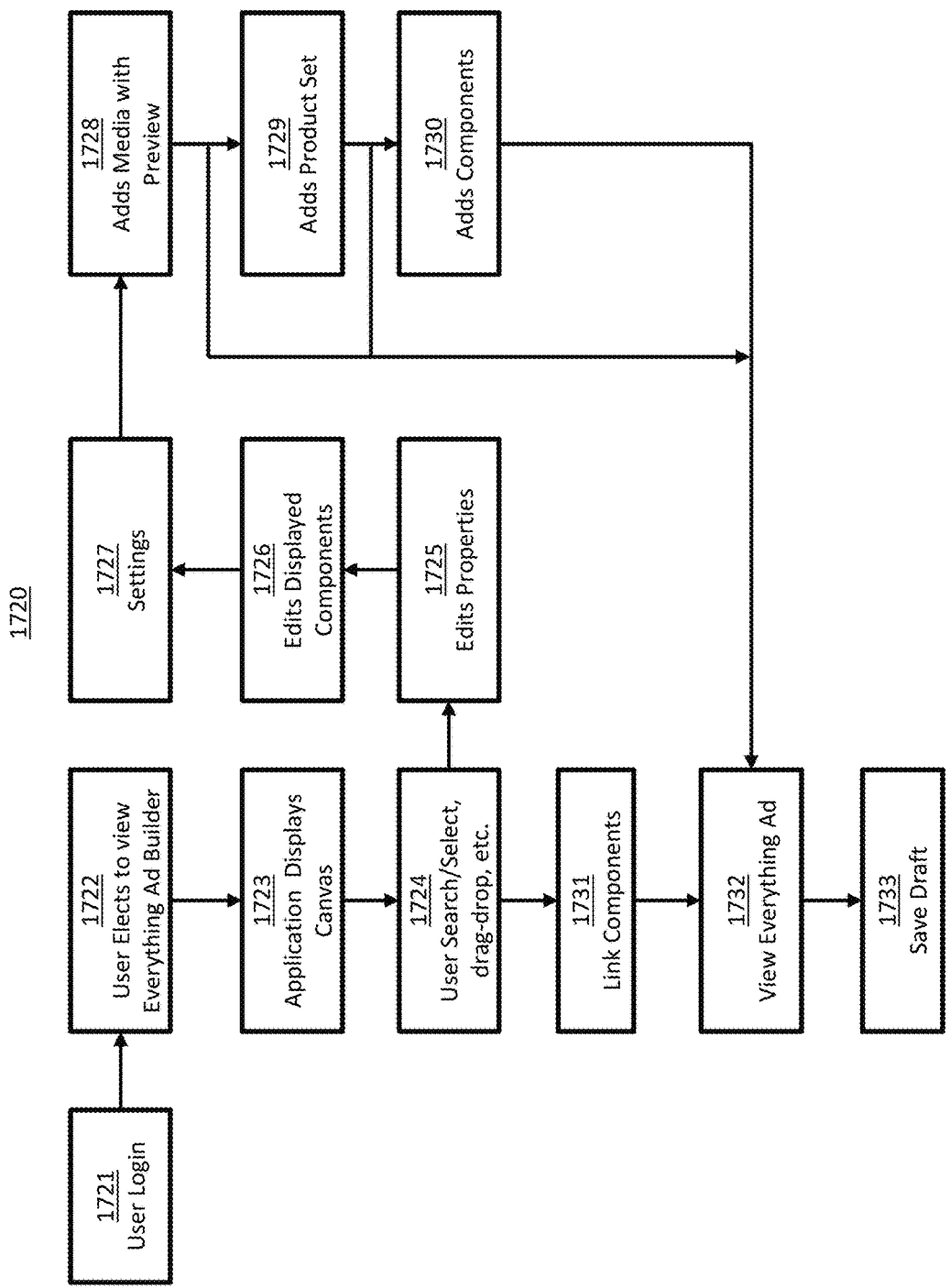
FIG. 17C is a flowchart showing an example process relating to the content composer of FIG. 17A in one embodiment.

FIG. 17C is a flowchart showing an example process relating to the content composer of FIG. 17A in one embodiment. A process 1720 can be performed by a processor executing one or more program modules among application 1400. Process 1720 can begin at block 1721, where a user can login to application 1400. Upon logging in at block 1721, at block 1722, the user can elect to view an everything ad builder, which can be the selected user interface 1700 shown in FIG. 17A. Process 1720 can proceed to block 1723, where application 1400 display a canvas in region 1708. Process 1720 can proceed to block 1724, where the logged in user can perform various actions such as search for contents, linked contents, assets, images, videos, and/or other components that can be used for generating linked content. The user can add components identified from the search into the canvas of region 1708. Also, at block 1724, application 1400 can receive user inputs 1402 that includes one or more search terms for search and filtering. For example, user inputs 1402 can include text, numbers, and/or symbol representing data relating to ad information, load status, session name, last updated at, last update by, created at, created by, campaign name, ad set name, ad name, format, client name, destination URL, and/or other search terms. The logged in user can also select components for generating linked content based on the search result. The logged in user can also drag and drop the selected components into the canvas in region 1708. Process 1720 can proceed from block 1724 to block 1725 and/or block 1731.

At block 1725, the logged in user can edit properties of the selected component, such as URLs of destination websites, size and display color of the components, text being displayed in the components, and/or other properties. From block 1725, process 1720 can proceed to block 1726, where the logged in user edit and/or arrange the components that are dragged to the canvas in region 1708. For example, users can link components being displayed in the canvas in region 1708 with one another to generate linked content. From block 1726, process 1720 can proceed to block 1727, where the user can configure various settings of the linked content generated at block 1726. Process 1720 can proceed to block 1728, where the user can add media and preview the added media. The types of media that can be added can include images, audio files, video files, and/or other types of media that can be included in contents such as advertisements. Process 1720 can proceed to block 1729, where the user can add information relating to product set such as product category in a catalog. For example, if a user uses application 1400 to generate URLs to promote pharmaceutical products, the user can set Process 1720 can proceed to block 1730, where the user can continue to add components to linked content.

At block 1731, the user can link components that are displayed in the canvas of region 1708 by adding link paths. The user can continuously perform blocks 1724, 1725, 1726, 1727, 1728, 1729, 1730 to add and/or remove components, and to adjust various properties of the components. Process 1720 can proceed to block 1732, where the user can view the linked content (e.g., Everything Ad) that is generated based on the linking at block 1731. Note that based on API 1405, application 1400 can simulate how linked contents may look like, the user does not need to login to third part 1406 to preview linked content in applications of third party 1406. Process 1720 can proceed to block 1733, there the user can save the linked content as a draft. In one embodiment, the user can save the linked content as a draft such that the saved draft can be shared to other users and/or the draft can be provided to a user with higher level of permission for approval. In one embodiment, the linked content generated in process 1720 can be saved to database 1414 and can be accessed via an ad library (e.g., selected user interface 1600).

Figure 18A:
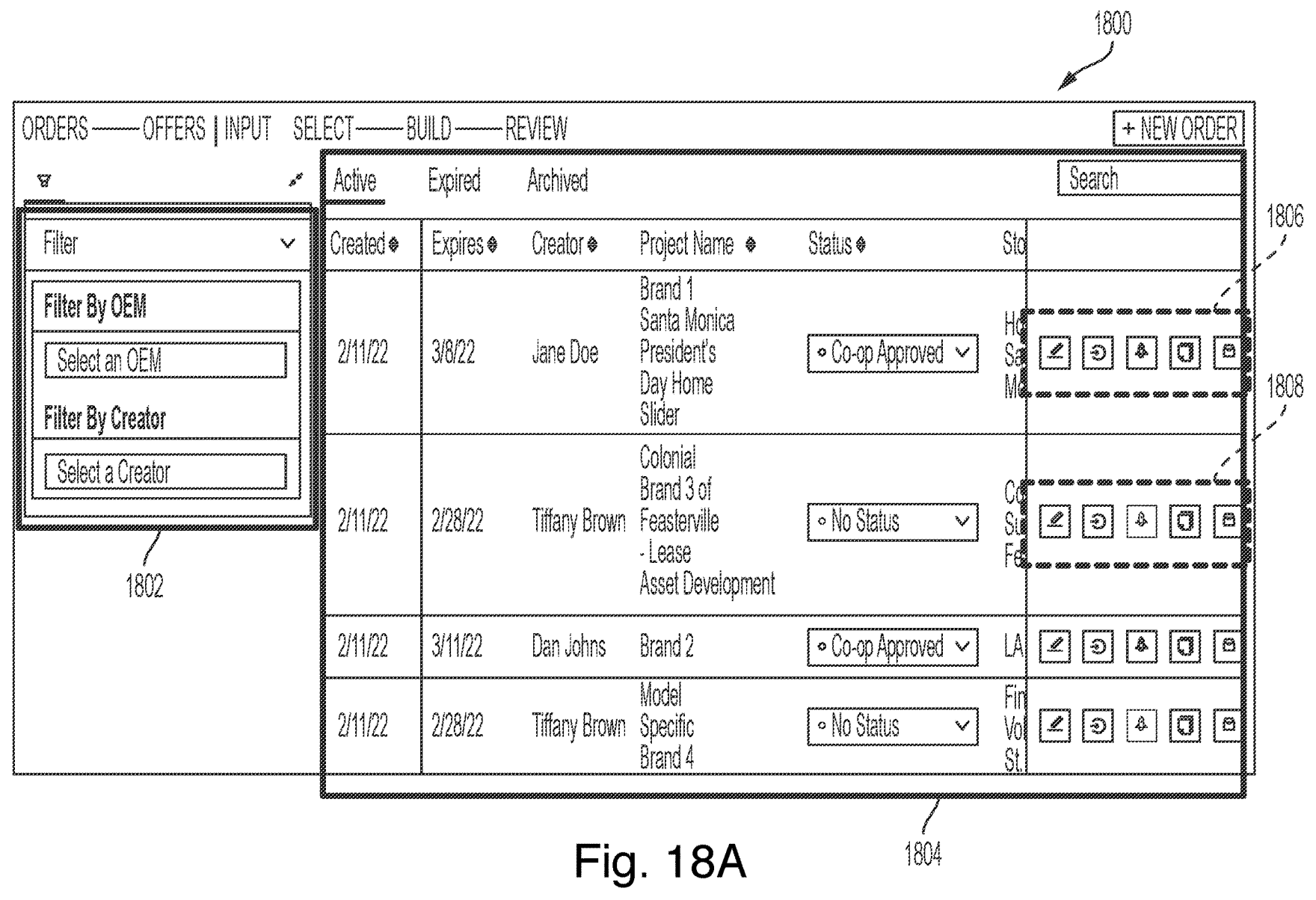

FIG. 18A is a diagram illustrating a user interface associated with an asset module in one embodiment. In one embodiment, in response to a selection of an "Asset Builder" tab in dashboard 1413 (see FIG. 15B), a selected user interface 1800 can be outputted in display region 1414 (see FIG. 15A). The "Asset Builder" tab being selected for outputting selected user interface 1800 can be controlled by asset module 1450 in FIG. 14. Users can use selected user interface 1800 to organize and manage the production of assets and contents that may be ordered or in production. Selected user interface 1800 can include a region 1804 that displays a list of projects, where each project can be a piece of content (e.g., campaign or ad) that are under production and/or pending approval. Each project listed can include information such as creation date, expiration date, name of creator, project name, status indicating approval, or the like. Further, each project can have an associated set of action buttons that can be based on a status of the projects. For example, action buttons 1806 associated with a first project can include five action buttons that are selectable by the users because the first project has a status of "Co-op Approved", but action buttons 1808 associated with a second project can include four action buttons, instead of five, where a publish button is missing because the second project has a status of "No Status". Selected user interface 1800 can further include a filtering region 1802 that include input fields for users to filter the list of projects displayed in region 1804.

Figure 18B:
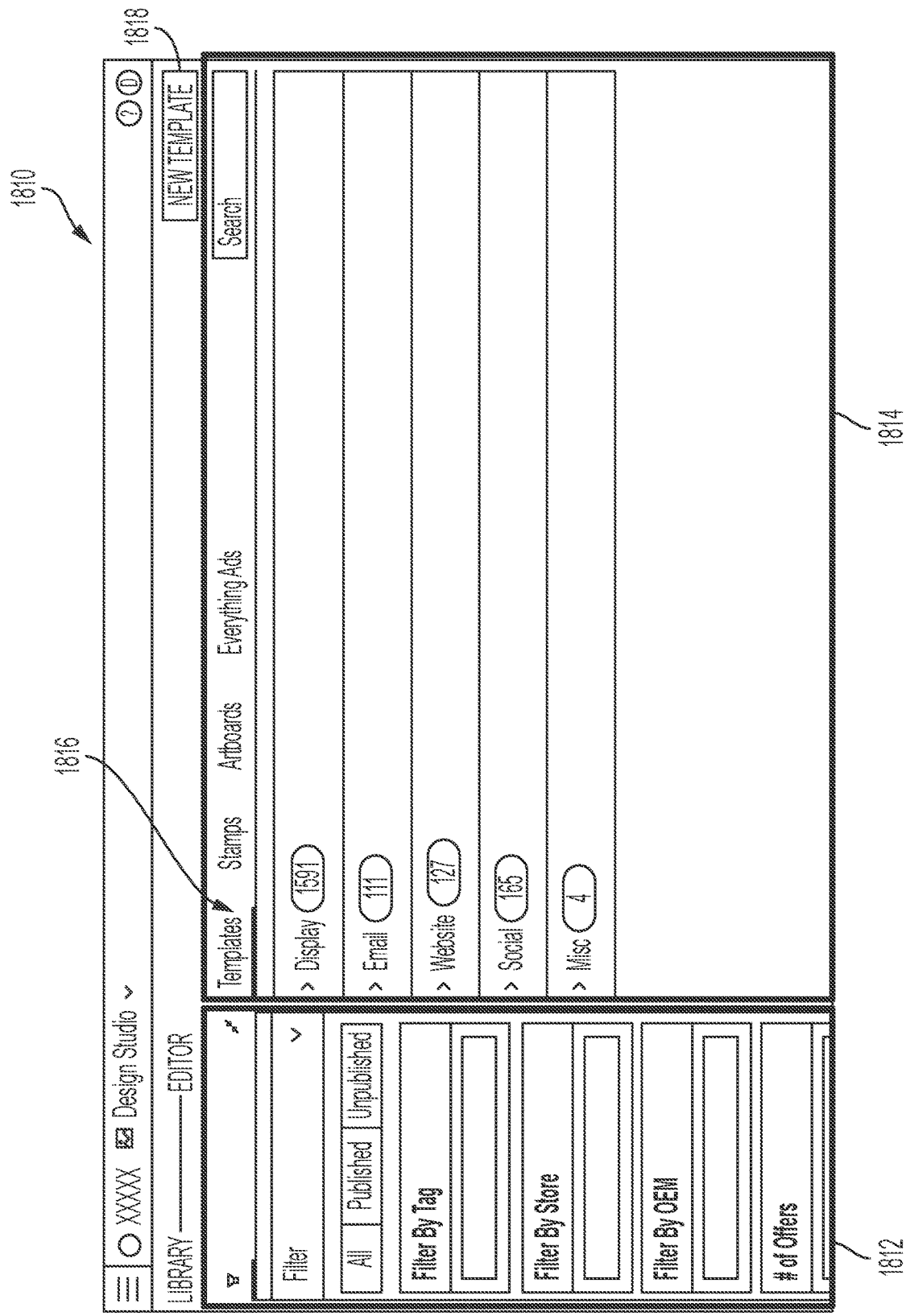
FIG. 18B is a diagram illustrating another user interface associated with an asset module in one embodiment.

FIG. 18B is a diagram illustrating another user interface associated with an asset module in one embodiment. In one embodiment, in response to a selection of an "Design Studio" tab in dashboard 1413 (see FIG. 15B), a selected user interface 1810 can be outputted in display region 1414 (see FIG. 15A). The "Design Studio" tab being selected for outputting selected user interface 1810 can be controlled by asset module 1450 in FIG. 14. Users can use selected user interface 1810 to manage pre-built and templated marketing formats, such as ads and content shells for ads, stamps, dartboards, everything ads (e.g., linked contents) in post click landing.

In the example shown in FIG. 18B, selected user interface 1810 can include a region 1814 that can be assigned for displaying items based on a user selection. For example, if a user selects a "Template" tab 1816 within region 1814, a list of types of templates can be populated (e.g., by asset module 1450) in region 1814. Further, selected user interface 1810 can include a filtering region 1812 that includes input fields for users to filter the templates or other item being displayed in region 1814. The items that can be displayed in region 1814 can be stored in database 1414. In response to a user selecting a particular item from region 1814, asset module 1450 can retrieve the selected item from database 1414.

Figure 18C:
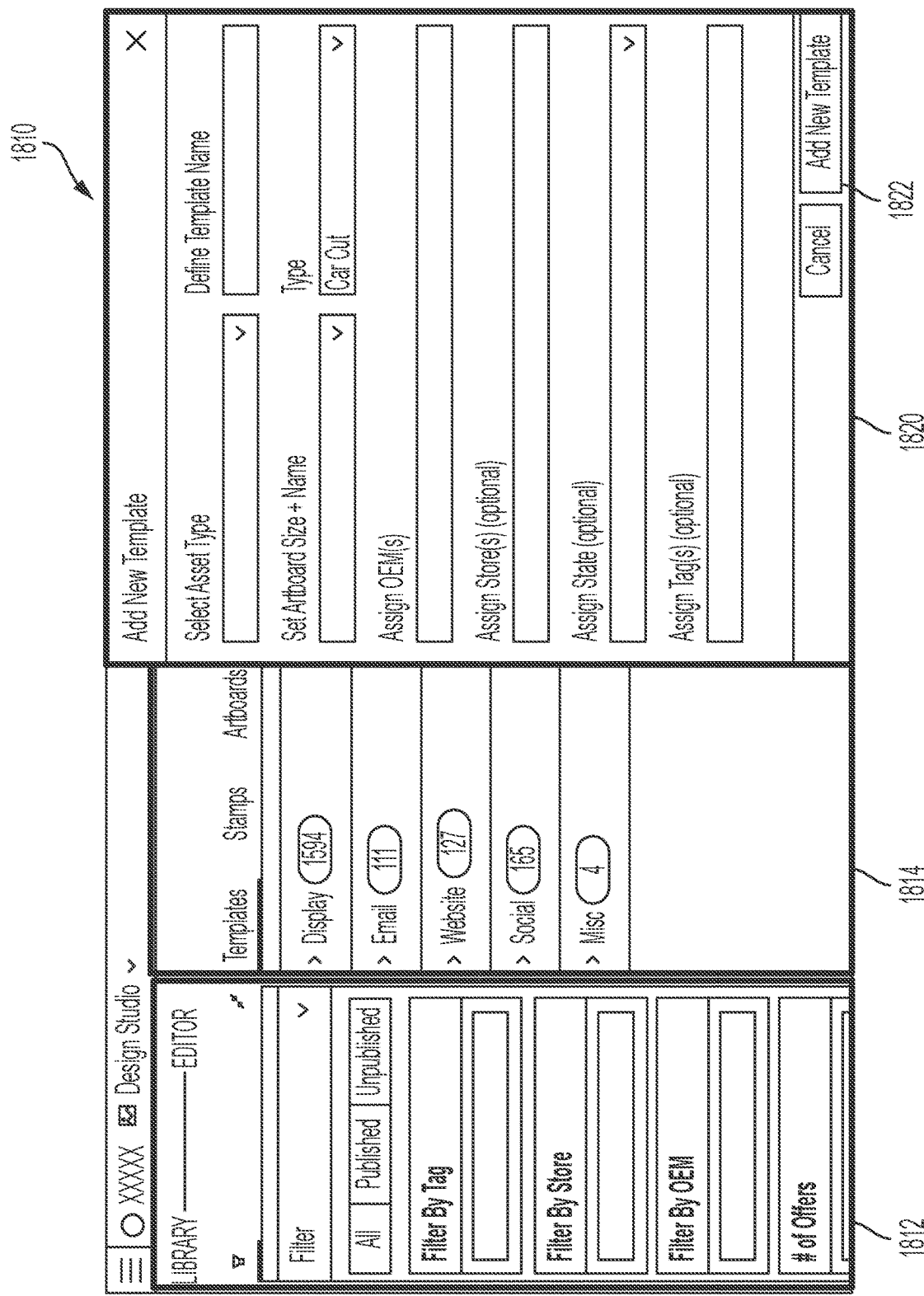
FIG. 18C is a diagram illustrating another user interface associated with an asset module in one embodiment.

Selected user interface 1810 can include a new template button 1818. In response to a user selecting button 1818, a window 1820 can be outputted by asset module 1450, and the window 1820 can overlap region 1814, as shown in FIG. 18C. Window 1820 can include input fields for users to enter various information or creating a new template. For example, user can enter information such as asset type, template name, artboard size (e.g., size of ad), store, tags, location (city, state, etc.). When the user completes entering information in window 1820, the user can select button 1822 to add a new template. In response to adding a new template via button 1822, asset module 1450 can store the new template in database 1414.

Figure 18D:
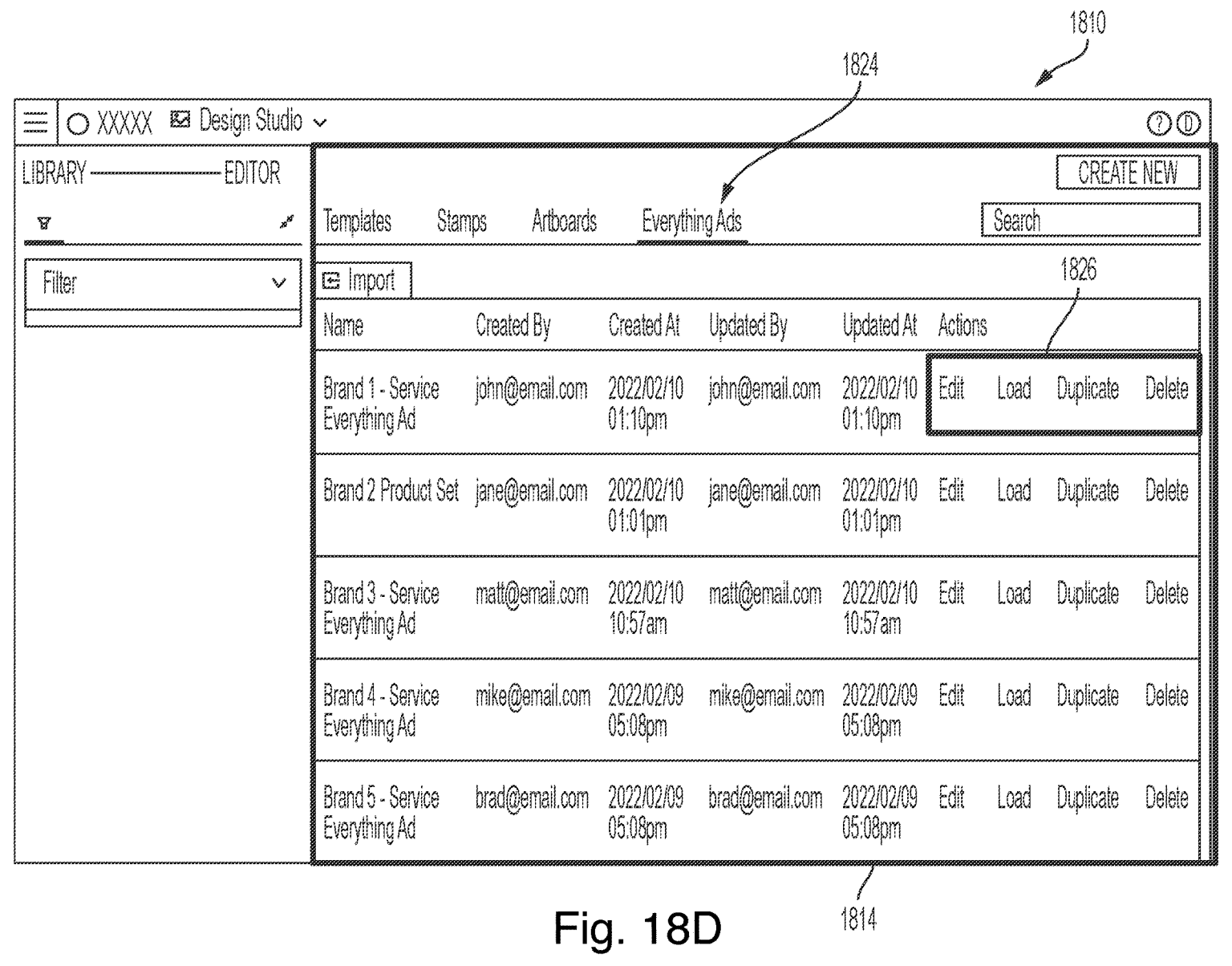

If a user selects an "Everything Ad" tab 1824 within region 1814, shown in FIG. 18D, a list of linked contents can be populated (e.g., by asset module 1450) in region 1814. Each linked content displayed in region 1814 can be associated with a set of action buttons 1826. The buttons 1826 can include "Edit", "Load", Duplicate", and "Delete". Selection of "Edit" can cause asset module 1450 to request linked content module 1430 to execute program code that outputs selected user interface 1700 for editing the linked content associated with the selected "Edit" button. Selection of "Load" can allow users to load a linked content that may not be stored in database 1414, and the linked content can be loaded from local memory or from a host in the Internet. Selection of "Duplicate" can cause asset module 1450 to request linked content module 1430 to make a copy of the linked content associated with the selected "Duplicate" button, and store the copy in database 1414. Selection of "Delete" can cause asset module 1450 to request library module 1420 to remove the linked content associated with the selected "Delete" button from database 1414 and any other lists or spreadsheets.

Figure 19A:
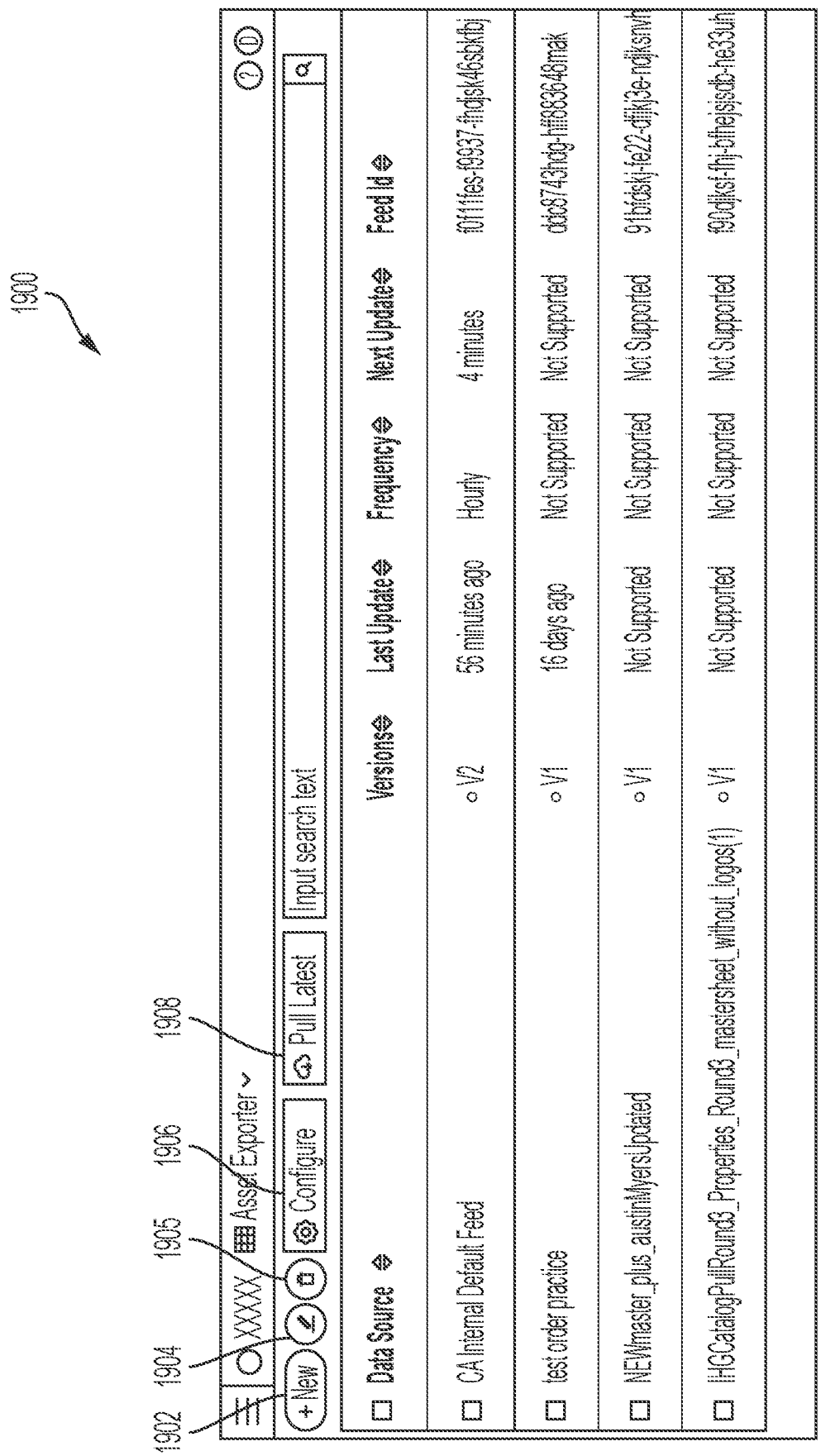
FIG. 19A is a diagram illustrating a user interface associated with an asset module in one embodiment.

FIG. 19A is a diagram illustrating a user interface associated with an asset exporter in one embodiment. In one embodiment, in response to a selection of an "Asset Exporter" tab in dashboard 1413 (see FIG. 15B), a selected user interface 1900 can be outputted in display region 1414 (see FIG. 15A). The "Asset Exporter" tab being selected for outputting selected user interface 1900 can be controlled by asset module 1450 in FIG. 14. Users can use selected user interface 1900 to set rules and/or input variables and conditions to instruct asset module 1450 to autonomously retrieve data from various data storage locations based on a spreadsheet. The spreadsheet can be, for example, a CSV file inputted by a user (e.g., via user input 1402), stored in a local memory device (e.g., memory device of client device 1301 in FIG. 13), or stored in an external location (e.g., file hosting sites or cloud computing resources). The spreadsheet can indicate storage locations of assets such as logos, images, media (e.g., video and audio files), existing campaigns, promotions, ads, or the like, can be stored in one or more locations including local computer storage (e.g., the computing device running application 1400) and external storage (e.g., external storage sites such as FTP sites, Dropbox®, file, image and media hosting sites, or the like). Users can use selected user interface 1900 to set rules, such as retrieve assets indicated by a specific column of the spreadsheet on a daily basis, or in response to specific conditions such as if a specific content stored in database 1414 is updated.

In the example shown in FIG. 19A, selected user interface 1900 can include various information for users to manage asset retrieval by asset module 1450. For example, selected user interface 1900 can include columns indicating data source (e.g., the spreadsheets that includes assets), versions (e.g., versions of the spreadsheets), last update (e.g., last time the spreadsheet was updated), frequency (e.g., frequency in which asset module 1450 retrieve assets from the spreadsheet), next update (e.g., next scheduled update of the spreadsheet), feed id (e.g., ID that identifies the spreadsheet, and the ID is interpretable by application 1400). In one embodiment, the feed id can be autonomously generated by application 1400 in response to a user uploading a new spreadsheet or inputting a storage location of a new spreadsheet to application 1400.

In the example shown in FIG. 19A, selected user interface 1900 can include a plurality of inputs (e.g. buttons) that can be selected by users to manage the spreadsheets. For example, selected user interface 1900 can include a button 1902 for users to upload new spreadsheets or add a storage location of a new spreadsheet. Selected user interface 1900 can further include a button 1904 for editing existing spreadsheets. Selected user interface 1900 can further include a button 1905 for deleting existing spreadsheets. Selected user interface 1900 can further include a button 1906 to configure various settings of selected user interface 1900. Selected user interface 1900 can include a button 1908 for user to pull latest versions of the spreadsheets regardless of any scheduled asset retrieval indicated by the frequency column in selected user interface 1900. Hence, selection of button 1908 can override any scheduled asset retrieval by asset module 1450.

Figure 19B:
FIG. 19B is a diagram illustrating another user interface associated with the asset module in one embodiment.

In response to a user selection of a spreadsheet in selected user interface 1900 in FIG. 19A, a new user interface 1910 can be outputted by asset module 1450 in display region 1414 (see FIG. 15A). User interface 1910 can be used by users to manage and configure various items relating to the selected spreadsheet. For example, user interface 1910 can include columns indicating process and templates that may be using a specific asset, asset or image link (e.g., the link where the asset is being stored and/or hosted), custom label created by users of application 1400, link of the URL generated by URL generation module 1408 that includes the asset, row identifiers that indicate a location of the asset in the spreadsheet, and/or other information shown in FIG. 19B. In one embodiment, user can select a button 1912 ("Feed Selection" button) to return back to selected user interface 1900 shown in FIG. 19A to select another spreadsheet.

In one embodiment, user can select a button 1914 ("Advance Options" button) to configure relatively more advanced options of the spreadsheets. The more advanced options can include setting or marking status of assets for generating a specific type of content, such as a video ad. The status that can be marked can include, for example, marked as export, image input/output, video input, end input, frame start, frame end, frame rate, video output, process data, and/or other status. The status being marked can allow asset module 1450 to autonomously arrange and combine assets in a specific order such that a generated video ad can output videos according to the arrangement and specific order. For example, a user can select an asset in user interface 1910 that can be a video, and set times for frame start, frame end to assign a starting time and an ending time of the video in a timespan of a video ad.

In one embodiment, user interface 1910 can be used for configuring rules based tool. Users can add smart rules on process and template based on the spreadsheet. Columns from the spreadsheet can be customizable for multiple purposes and use cases around creating media assets for marketing and advertising purposes online. For example, column mapping can be performed for autonomously formatting uploaded spreadsheets to align with channels on third party or social media platforms, such as TikTok®, Pinterest®, Snapchat®, Facebook®, and/or other ad channels. Further, to create video ads, the user can match the columns in the spreadsheet to columns recommended by application 1400. For example, a specific column of a spreadsheet can include descriptions of image assets, and asset module 1450 can assign a specific column in database 1414 that points to a description window in ad templates. Users can match the specific column in the spreadsheet to the specific column in the database 1414 such that asset module 1450 can autonomously pull the descriptions from the specific column in the spreadsheet into the description window.

In one embodiment, a user can create a template that includes logos, images, and text, and dynamic text, and upload a data feed or spreadsheet. Columns of the spreadsheets can be renamed without a need to reupload the spreadsheet. The template can be combined with assets, such as logos, text, promotional images and videos, to generate a file that can be used as a piece of content to be published on third party 1406. In one embodiment, asset module 1450 can generate the file for a video ad by overlaying assets (e.g., from spreadsheets) such as logos, images, and text elements on top of a background, where the background can be an image or a video. These overlays cannot transition in or out of the video ad, but can remain visible for the given duration (e.g., duration can be set via the advanced options described above), and the duration can be updated to provide animation features. In response to generating the file, users can, for example, add a video to the end of the file, add the file in the middle of a video, generate catalogs or ads, and/or the like, so that users can see where info from the feed is being placed on the canvas in real time. In one embodiment, users can set the rules for multiple assets in a spreadsheets and instruct asset module 1450 to run a process to generate files for content by retrieving and batching multiple assets in the spreadsheet based on the rules set by the users. Upon running the process, users can preview the file having retrieved and batched assets before loading to an ad library (e.g., associated with selected user interface 1600 of FIG. 16A).

Figure 19C:
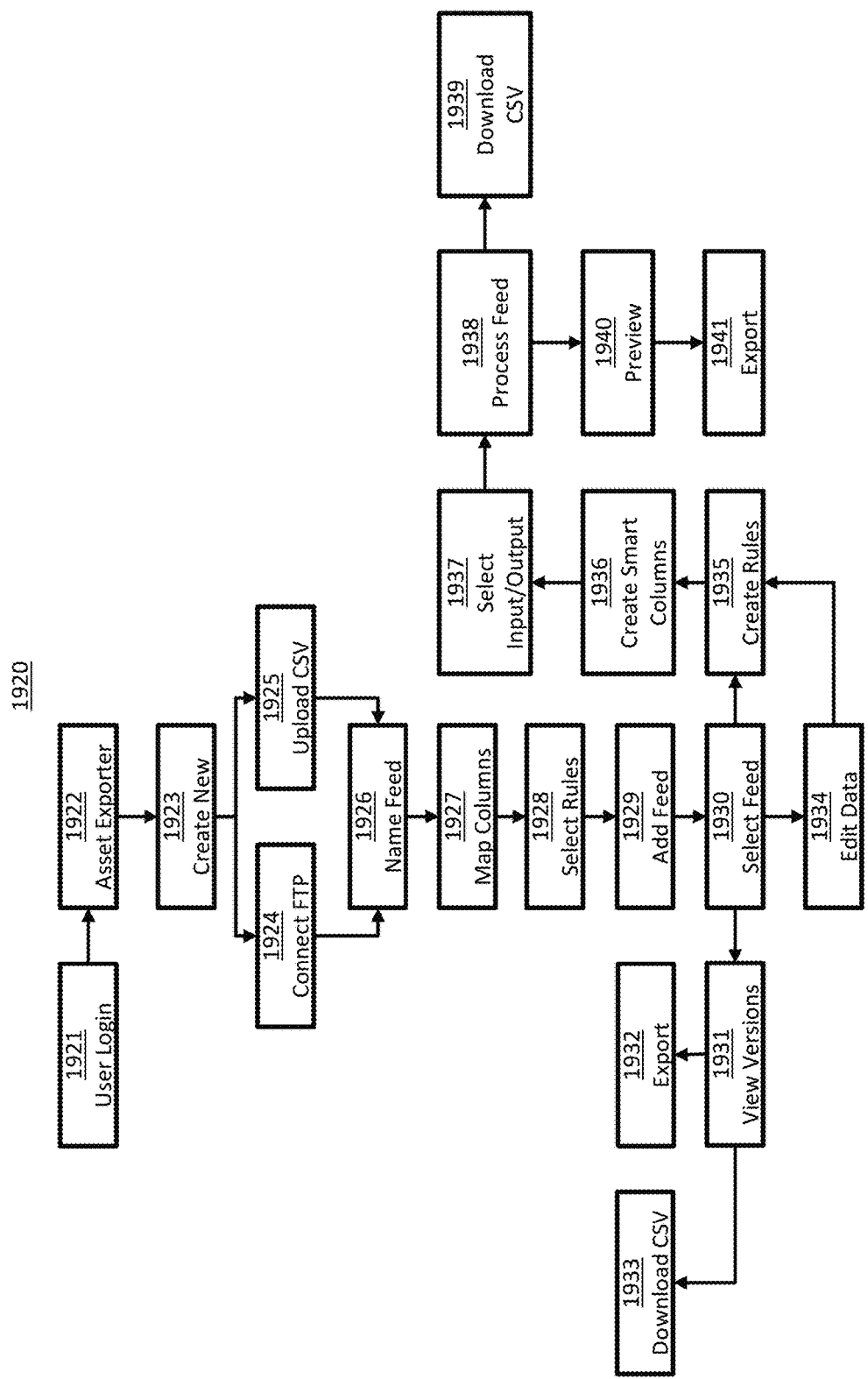
FIG. 19C is a flowchart showing an example process relating to an asset module in one embodiment.

FIG. 19C is a flowchart showing an example process relating to the content composer of FIG. 17A in one embodiment. A process 1920 can be performed by a processor executing one or more program modules among application 1400. Process 1920 can begin at block 1921, where a user can login to application 1400. Upon logging in at block 1921, at block 1922, the user can elect to view an asset exporter interface, which can be the selected user interface 1900 shown in FIG. 19A. Process 1920 can proceed to block 1923, where a user can select to create or upload a new feed or spreadsheet. To create the new spreadsheet, the user can connect to a FTP site at block 1924 or upload a CSV file at block 1925. Process 1920 can proceed to block 1926 where the user can name the new spreadsheet.

Process 1920 can proceed to block 1927, where the user can map columns of the spreadsheet to columns recommended or assigned by application 1400. Process 1920 can proceed to block 1928, where the user can select rules import. For example, the user can select rules for importing specific columns of the spreadsheet at a specific date, time, frequency, or the like. Process 1920 can proceed to block 1929, where the user can add the spreadsheet to the asset exporter, effectively storing the spreadsheet and its selected rules to database 1414. Process 1920 can proceed to block 1930, where the user can select a feed or spreadsheet from asset exporter for version viewing or configuring. If the user wishes to view versions of spreadsheets, process 1920 can proceed to block 1931. If the user wishes to configure spreadsheets, process 1920 can proceed to block 1934 and block 1935.

At block 1931, the user can review one or more versions of the selected spreadsheet. The user can select to download a CSV of the selected spreadsheet at block 1933, or select to perform a series of actions to export to an ad library at block 1932. At block 1932, prior to exporting the spreadsheet to the ad library, the user can review the assets in the spreadsheet, the rules set for the spreadsheet, and make edits if necessary.

At block 1934, the user can edit data associated with the selected spreadsheet. For example, the user can rename or change ID of specific assets. At block 1935, the user can create and/or modify rules for matching the assets with templates, such as setting rules for starting and ending display times of image and/or video assets, or the like. From block 1935, process 1920 can proceed to block 1936, where the user can create smart columns. Creating smart columns can be, for example, setting specific regions of a template (e.g., a description box) or specific sets of data (e.g., rows and/or columns) of database 1414 as destinations for assets that are autonomously retrieved by asset module 1450 from the spreadsheet. From block 1936, process 1920 can proceed to block 1937, where the user can select input and output assets, such as selecting or deselecting assets to be combined with templates. From block 1937, process 1920 can proceed to block 1938, where the user can select to process the feed. Process of the feed can include a batch retrieval of assets in a spreadsheet or feed or batch combination of assets with templates in accordance with rules set for the spreadsheet. In one embodiment, the user can select one or more specific rows and/or columns of the spreadsheet for processing. The user can also select an output destination, such as ad library (e.g., export to ad library in block 1941), output or download CSV (e.g., block 1939), send or upload to FTP, or the like. The user can also preview the processed assets before blocks 1939, 1941.

Figure 20A:
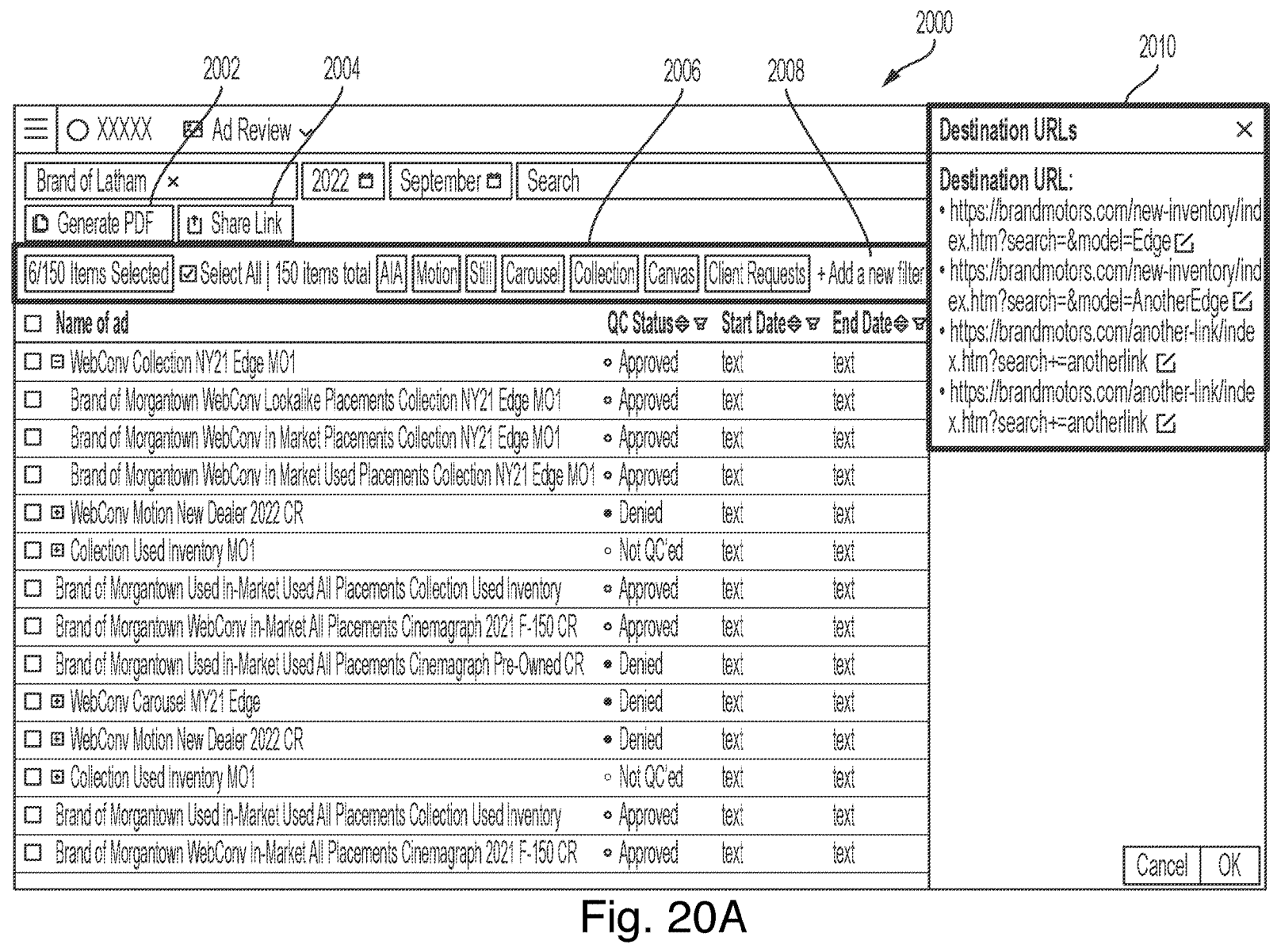

FIG. 20A is a diagram illustrating a user interface associated with a review module in one embodiment. In one embodiment, in response to a selection of an "Campaign Management" tab in dashboard 1413 (see FIG. 15B), a selected user interface 2000 can be outputted in display region 1414 (see FIG. 15A). The "Campaign Management" tab being selected for outputting selected user interface 2000 can be controlled by review module 1460 in FIG. 14. Users can use selected user interface 2000 to manage contents that are stored in database 1414, which can be referred to as active contents. Active contents can include contents such as ads or campaigns that are already generated (e.g., files that already have assets combined with templates), and the active contents can be approved, disapproved, or pending approval.

In one embodiment, selected user interface 2000 can correspond to an "Ad Review" function of application 1400. The "Ad Review" function can be implemented as a result of a processor executing review module 1460. In one embodiment, the "Ad Review" function can be a team managed process of quality control on ad assets generated in batch through application 1400. In one embodiment, when a user selects a specific client or brand, review module 1460 of application 1400 can generate a preview and tiles of every active content or active ad associated with the client. For example, if the client is a pharmaceutical company, review module 1460 can output every active ad generated by different users that has an account under the pharmaceutical company. The user can user selected user interface 2000 to perform quality control on the ads, toggle approval status options, elicit and collect feedback from a team of users associated with the client, generate a portable document format (PDF) of the ads based on ad approval status (or other factors, such as date, user admin status, brand, template, channel, etc.), and generate, share, send a client-facing link of these ads. Users approvals or disapprovals can be factors for the future use case of ads generated and reviewed, such as their placement into ad channels. User may send a link to collaborators that contains every unique ad in an easy to view format, so that teams can see exactly what their Ads will look like in prospective ad channel placement with minimal technical knowledge and minimal clicks. Users can have different permissions such as view only (e.g., FIG. 20A) or be permitted to perform quality control with approval permissions (e.g., FIG. 20B).

Selected user interface 2000 in FIG. 20A can be a view only mode of the "Ad Review" function. Selected user interface 2000 can output a list of contents and provide various types of status of the list of contents, such as a quality control status indicating whether the content is approved, not approved, or quality control is not yet performed, or the like. Selected user interface 2000 can include a button 2002 for generating a PDF of ads based on approval status. Selected user interface 2000 can further include a button 2004 for sharing a link of an ad to other users of application 1400. Selected user interface 2000 can further include a menu 2006 that includes various selectable functions, such as sorting and filtering the ads listed in selected user interface 2000. Users can select a button 2008 in menu 2006 to add a new filter criteria. Selected user interface 2000 can further include a portion 2010 that includes one or more destination URLs. Users can preview the destination URLs in the portion 2010 to ensure that the address is correct and that the website of the URLs still exists.

In one embodiment, a selected user interface 2020 in FIG. 20B can be a quality control mode of the "Ad Review" function. Selected user interface 2020 can output a list of contents and allow users who have permission to perform quality control to change a quality control status of the contents. For example, selected user interface 2020 can include buttons 2022 that can to toggled by users to change quality control status of the contents. Selected user interface 2020 can further include a portion 2024 that list individual destination URLs for each content (e.g., instead of a collective view shown in FIG. 20A) and users with quality control permission can select the URLs in portion 2024 for editing (e.g., changing the URL). If a piece of content has only one URL, then one URL will be shown for the content as indicated by URL 2026. If a piece of content has multiple URLs, then text indicating more than one URL, such as the text "Multiple" with a number (e.g., indicating how many URLs) following the text can be shown for the content as indicated by text 2028.

Figure 21A:
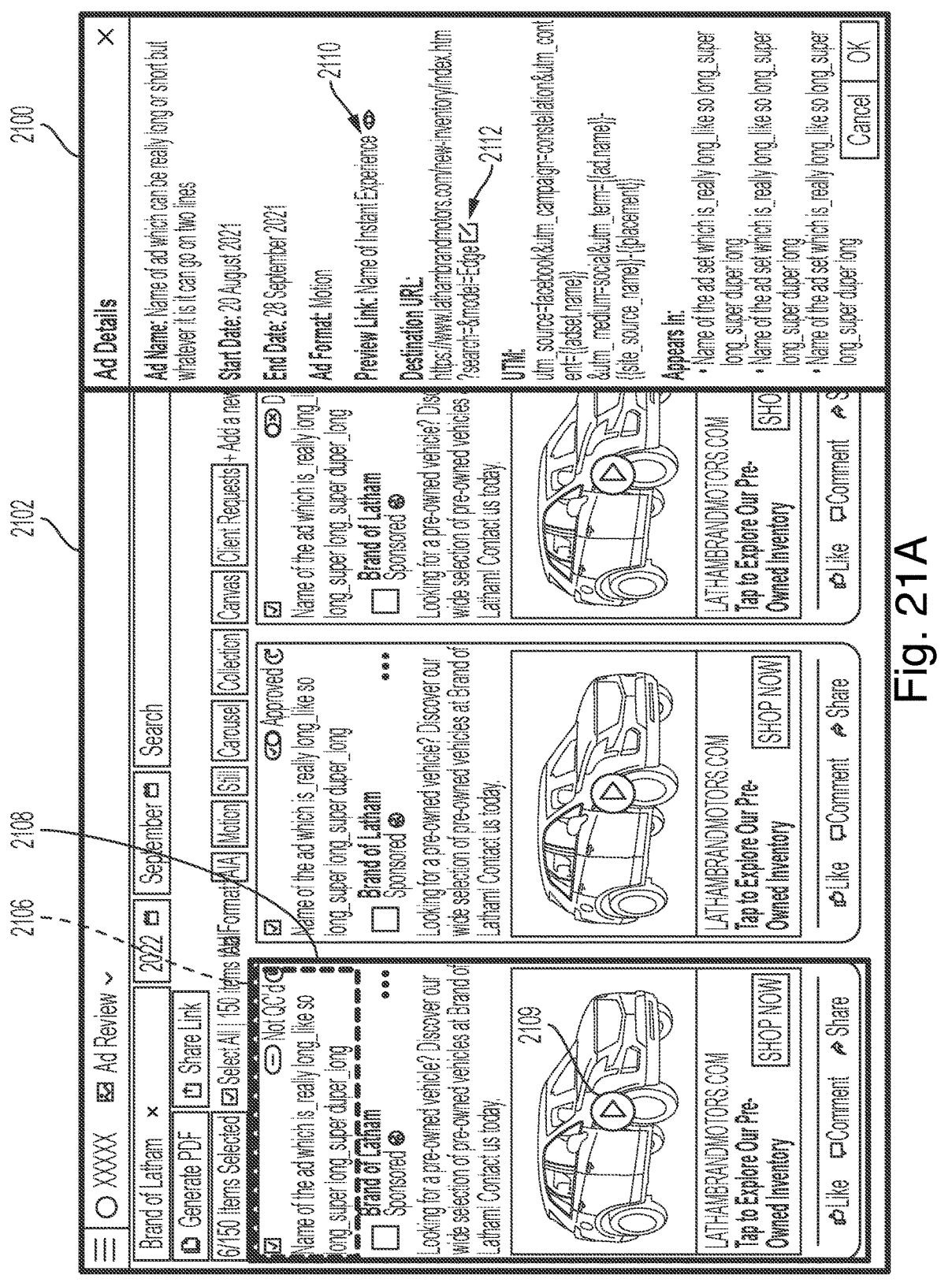
Figure 21B:
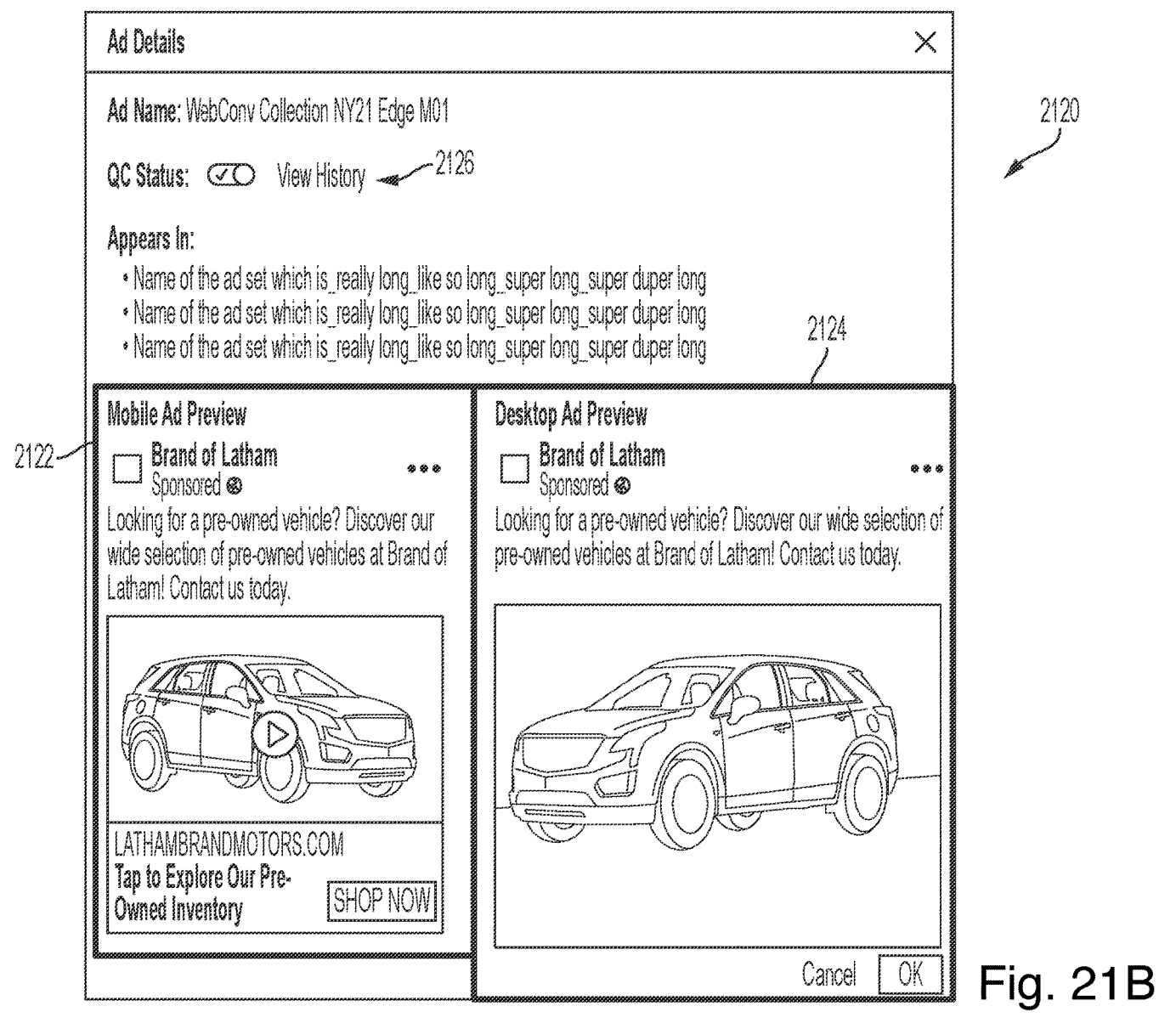
Figure 21C:
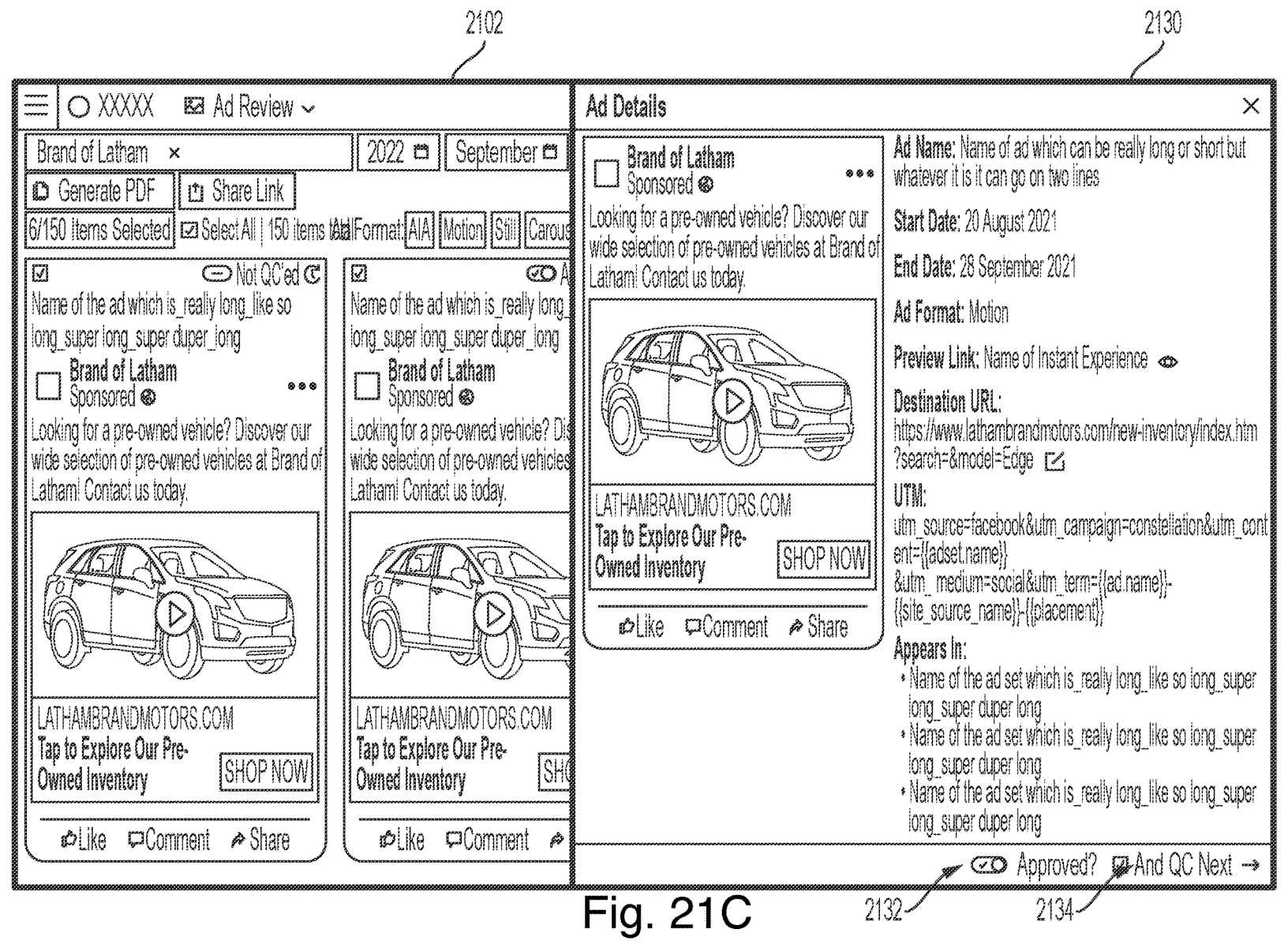
Figure 21D:
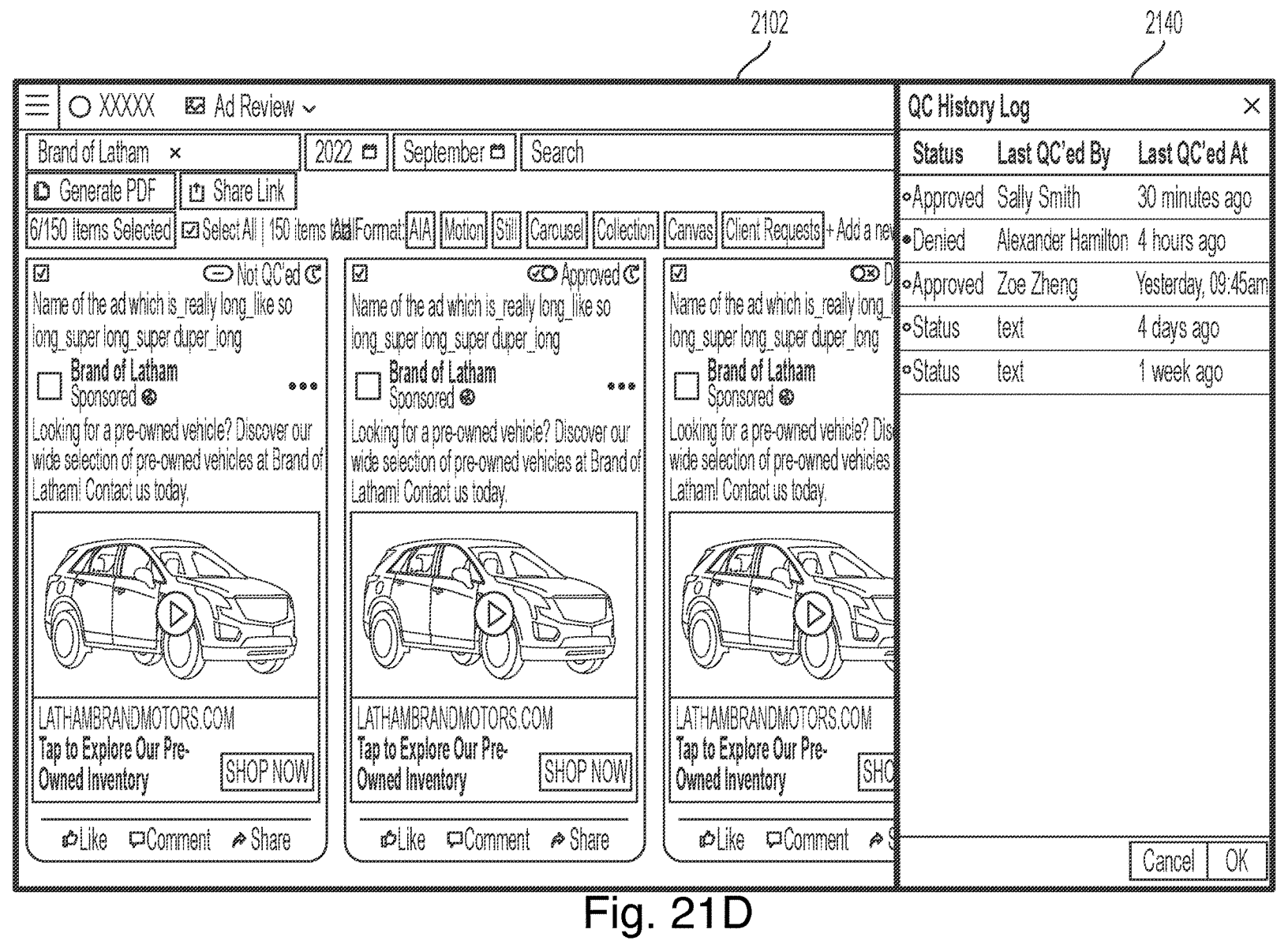
Figures 21E, 21F:
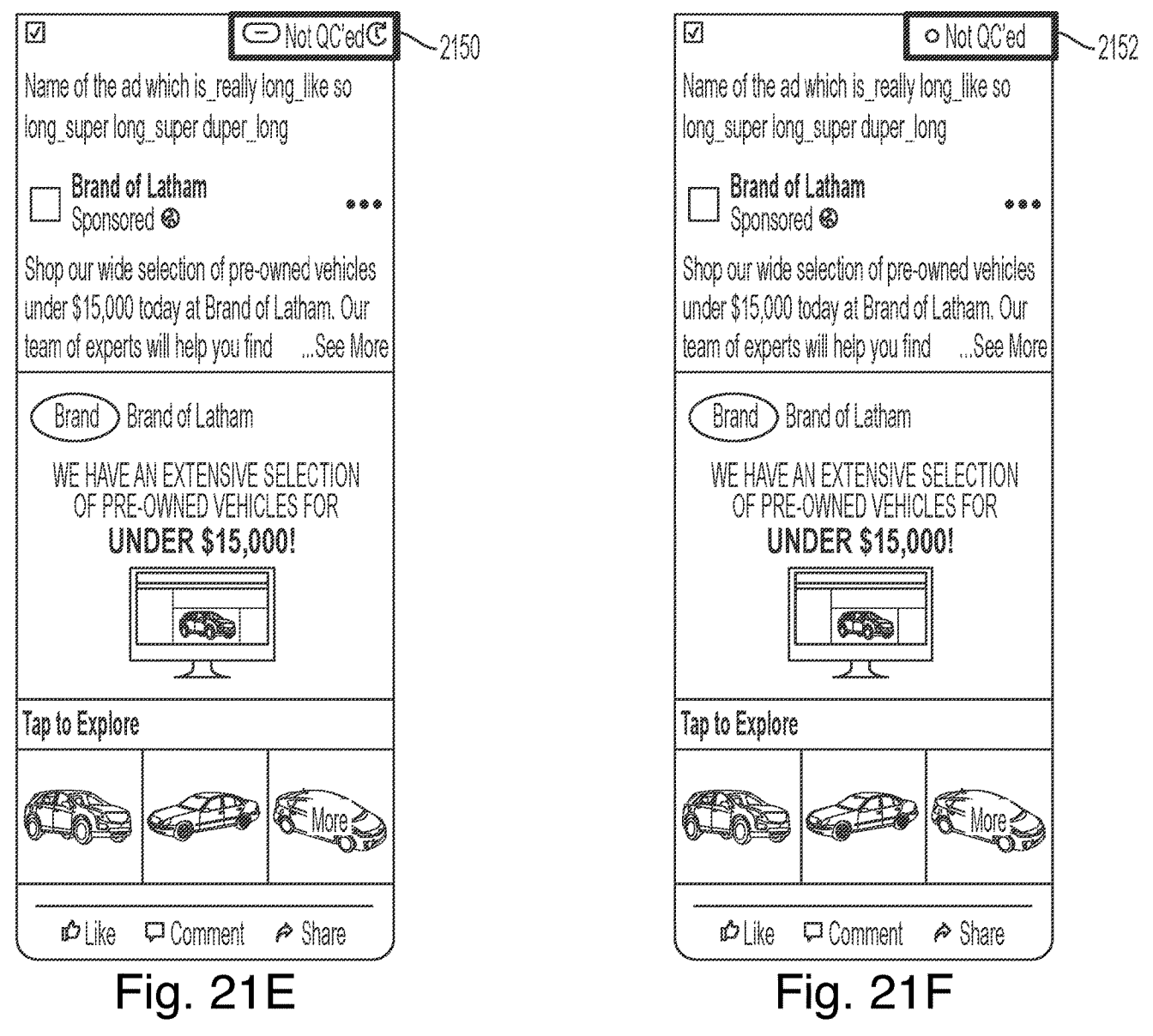
Figure 21G:
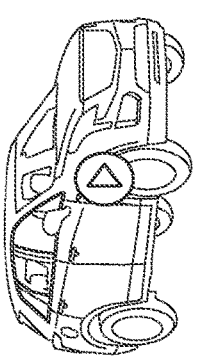
FIG. 21G is a diagram illustrating another mobile user interface associated with implementation of a review module in one embodiment.

FIG. 21A is a diagram illustrating a user interface associated with a detail view of contents in one embodiment. A user interface 2100 can overlay another user interface 2102 that displays contents in a tile view. In some embodiments, user interface 2100 can overlay user interface 2000 or 2020 shown in FIGS. 20A and 20B, respectively. In one embodiment, user interface 2102 can be a tile view mode of the "Ad Review" function, and can be outputted in display region 1414 (see FIG. 15A). Each tile in user interface 2102 can include a portion 2106 and a portion 2108. Portion 2106 can include a URL of the content and other indicators or inputs such as buttons for toggling approval status. Portion 2108 can be a preview portion for previewing the content. Users can select a play button 2109 to run the video ad for preview.

Portion 2106 can be a portion that is visible to users of application 1400 but not visible when the content is published on third party 1406.

In response to selecting a content listed in selected user interfaces 2000, 2020 and/or 2102, user interface 2100 showing details of the selected content can be outputted in display region 1414 (see FIG. 15A). User interface 2100 can be controlled by review module 1460 in FIG. 14. User interface 2100 can be used for campaign planning, media buying, technical delivery, ad channel, internal approval status, UTM modules, session history, ad performance goals, previous campaign history, previews of a live campaign, planned dates for the campaign to go live, performance metrics and the like. User interface 2100 can include details such as ad name, start and end dates of the ad being published to third party 1406, ad format (e.g., still or motion), preview link that includes a button 2110 to preview, destination URL 2112, UTM, and a list of other ads what can include the selected content. If the selected content is part of a linked content, the button 2110 can allow users to preview the linked content including viewing extensions that are linked to the content as shown in FIG. 17B.

If a user selects to preview content, a user interface 2120 in FIG. 21B can be displayed in region 1414. User interface 2120 can include one or more sections showing previews of different versions of the same content. For example, a portion 2122 can simulate the content being shown in Facebook®, and a portion 2124 can simulate the content being shown in a desktop browser. User interface 2120 can include simulations of the content in one or more third party websites, such that users can preview the content across different platforms without a need to login to different websites.

In one embodiment, users can select a button 2126 in user interface 2120 to invoke a quality control history window 2130, shown in FIG. 21C. Quality control history window 2130 can include a preview of content and details of the content. Quality control history window 2130 can further include a button 2132 for a user (with permission) to toggle whether the content is approved or not. Quality control history window 2130 can further include a button for a user to proceed to review a next piece of content.

In one embodiment, quality control history window 2130 can allow users to track session history specific to team approval statuses during the "Ad Review" process leading up to publishing of contents on various social media and marketing channels. Quality control history window 2130 allows permitted users to approve both the ad's assets (e.g., the images and videos) assets and the and ad details which contains layers of details used to describe the ad assets, their targeting and publishing parameters, their scheduled uses and URL paths. These views provide broad scoping information necessary for quality control in the advertising business.

In one embodiment, button 2126 in user interface 2120 of FIG. 21B can lead to a history window 2140 shown in FIG. 21D. History window 2140 can include a log that indicates a history of whether the content is approved or denied, the date and time that where the approval status was updated, and the user who updated the approval status.

In one embodiment, if application 1400 is being implemented as a mobile application of a mobile phone, application 1400 can output user interfaces that are suitable in size and resolution for mobile applications. FIG. 21E shows an example user interface on a mobile phone for a user who is permitted to perform quality control and toggle approval status. The user interface shown in FIG. 21E includes input fields 2150 that allows a permitted user to perform quality control functions and modify approval status. FIG. 21F shows an example user interface on a mobile phone for a user who has permission to view only. The user interface shown in FIG. 21F includes a portion 2150 that allows a user to view whether the content is approved or not, but does not include the input fields 2150.

In one embodiment, review module 1460 can output a user interface 2160 that shows a client view. Client view can be an output of contents that belong to the same client. Users can review multiple contents promoting multiple products that belong the same client or brand. Users can select and share packaged ad campaigns with multiple file formats, included ad information, campaign approval status, media campaign information, previews and technical delivery details, UTM, with a single hyperlink. For example, users can share ads by selecting a menu in user interface 2160 and a window 2162 can be displayed, where the window 2162 can include a hyperlink that can be shared with other users. In one embodiment, window 2162 can overlap with a portion of user interface 2160.

Figure 21H:
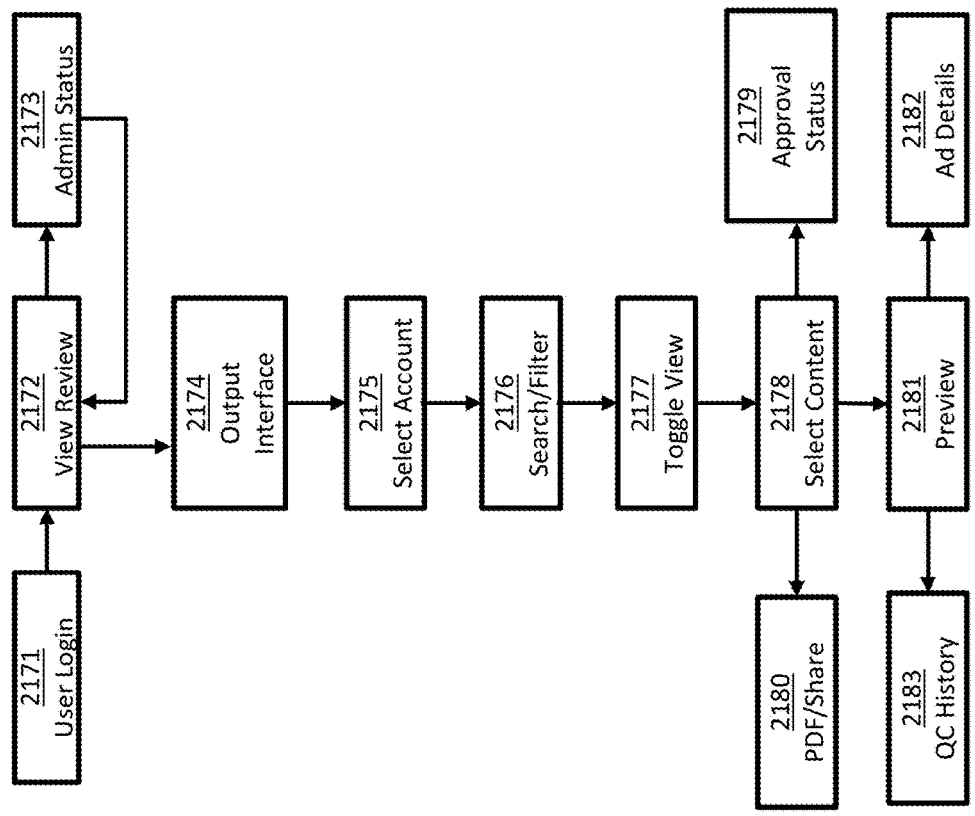
FIG. 21H is a flowchart showing an example process implemented by a review module in one embodiment.

FIG. 21H is a flowchart showing an example process implemented by a review module in one embodiment. A process 2170 can be performed by a processor executing one or more program modules among application 1400. Process 2170 can begin at block 2171, where a user can login to application 1400. Upon logging in at block 2171, at block 2172, the user can elect to view an ad review interface (e.g., user interface 2000 or user interface 2020 in FIG. 20A, 20B, respectively). The ad review interface being viewed by the user can be based on an admin status of the logged in user. Process 2170 can proceed from block 2172 to block 2173 and block 2174. At block 2173, application 1400 can determine an admin status of the logged in user. If the logged in user does not have permission to perform quality control and/or approve contents, application 1400 can output user interface 2000 at block 2174. If the logged in user does not have permission to perform quality control and/or approve contents, application 1400 can output user interface 2020 at block 2174.

Process 2170 can proceed from block 2174 to block 2175, where the user can select an account such as a client or a brand. Process 2170 can proceed from block 2175 to block 2176, where the user can search and filter contents in the displayed user interface. Process 2170 can proceed from block 2176 to block 2177, users can toggle different views on the user interface, such as viewing the filtered contents as a table, in a list, in tile view, or other views. Process 2170 can proceed from block 2177 to block 2178, users can select specific contents being displayed. In response to selecting a content at block 2178, and if the logged in user has permission to perform quality control and approve contents, process 2170 can proceed to one or more of blocks 2179, 2180, and 2181. In response to selecting a content at block 2178, and if the logged in user does not have permission to perform quality control and approve contents, process 2170 can proceed to one or more of blocks 2180 and 2181. At block 2179, the user can perform quality control actions and toggle approval status of the selected content. At block 2180, the user can generate a PDF of the selected content or share the selected content with another user. At block 2181, the user can preview the selected content. Process 2170 can proceed from block 2181 to blocks 2182 and 2183. At block 2182, the user can view various ad details of the selected content. At block 2183, the user can view a quality control history of the selected content.

Figure 22A:
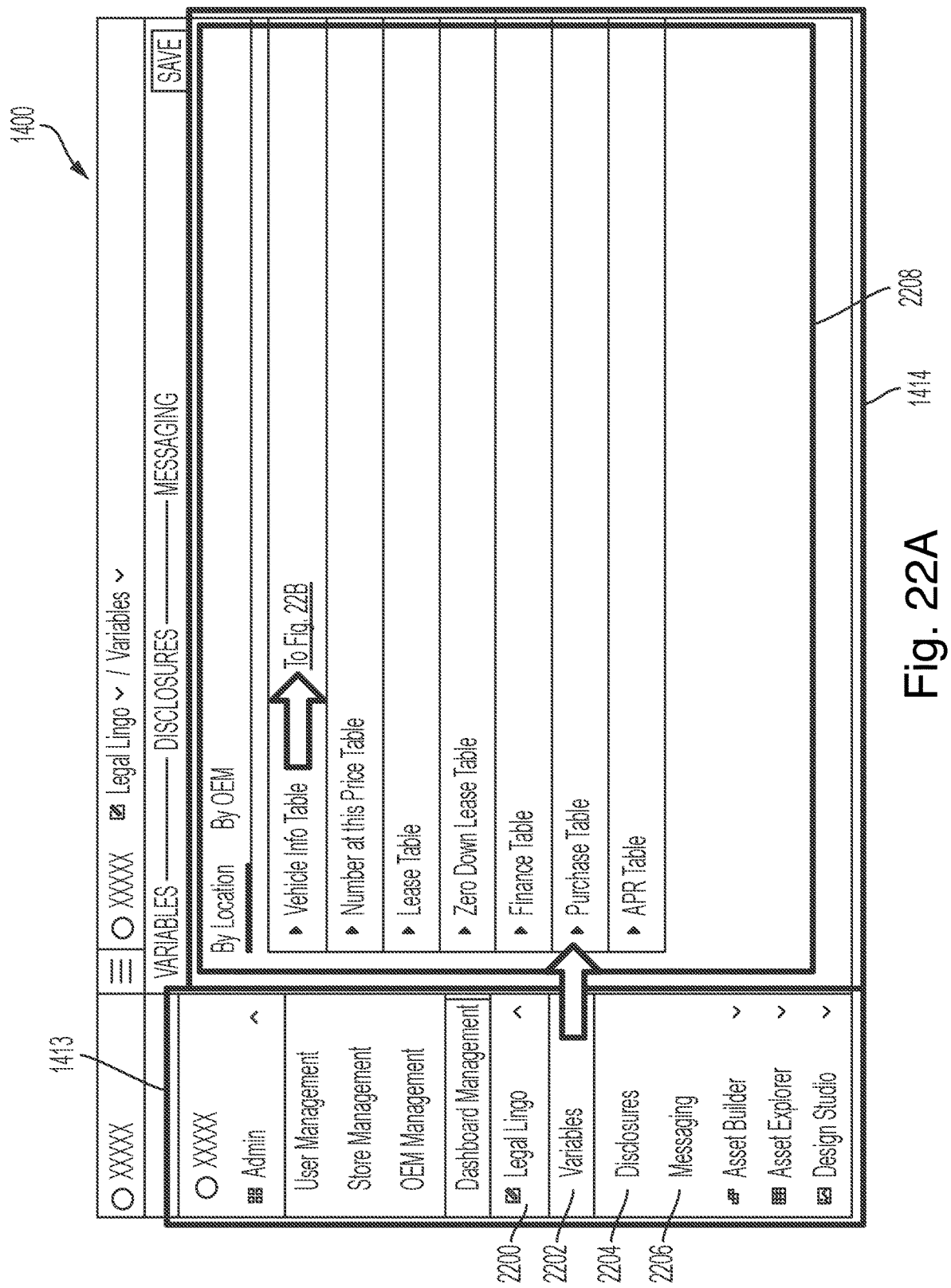
FIG. 22A is a diagram illustrating a user interface associated with implementation of a compliance module in one embodiment.

FIG. 22A is a diagram illustrating a user interface associated with an asset exporter in one embodiment. In one embodiment, in response to a selection of an "Legal Lingo" tab in dashboard 1413 (see FIG. 15B), a selected user interface 2200 can be outputted in display region 1414 (see FIG. 15A). The "Legal Lingo" tab being selected for outputting selected user interface 1900 can be controlled by compliance module 1440 in FIG. 14. In an aspect, legal disclaimers can vary by the geographical locations (e.g., states, countries), industry, audience, governing factors, channel, product regulation, and/or other factors. The compliance module 1440 can autonomously insert legal disclaimers and/or disclosures into contents being generated by application 1400. Such legal disclaimers can be related to various industries such as pharmaceutical, automotive, food, retail, or the like.

Selection of the "Legal Lingo" tab in dashboard 1413 can expand dashboard 1413 to display a plurality of tabs 2202, 2204, 2206. Tab 2202 can be a variables tab, where a selection of this variables tab can allow a user to view, edit, create, remove, define variables that can be inserted in legal disclaimers. For example, the variables can include vehicle info, number at this price term tables, lease terms; zero down lease terms; finance terms, purchase terms, APR terms, and/or other variables. Tab 2204 can be a disclosure tab, where a selection of this disclosure tab can allow a user to view, edit, create, remove, legal disclosures that are in compliance with various geographical locations or regions (e.g., states, countries), industry, audience, governing factors, channel, product regulation. Tab 2206 can be a messaging tab, where a selection of this messaging tab can allow a user to manage their ad legal messaging, deals, offers, financing options, APR, and/or the like, that can be applied to contents and assets developed using the automation tool.

Selection of one of the tabs 2202, 2204, 2206 can cause the application to output a new user interface in region 1414. For example, in response to a selection of the variables tab 2202, a new user interface 2208 can be outputted in region 1414. New user interface 2208 can include a menu of selections that can be sorted or arranged by location or by OEM. In one embodiment, the menu of selections in new user interface 2208 can be specific to the entity (e.g., business) corresponding to the user that is viewing and using the content management platform (e.g., the user that is logged in to the application). For example, new user interface 2208 shown in FIG. 22A can correspond to car dealerships. Other industries that can utilize content management platform can include, but not limited to, pharmaceuticals, real estate, travel, finance, banking, technology, and/or other industries.

Figure 22B:
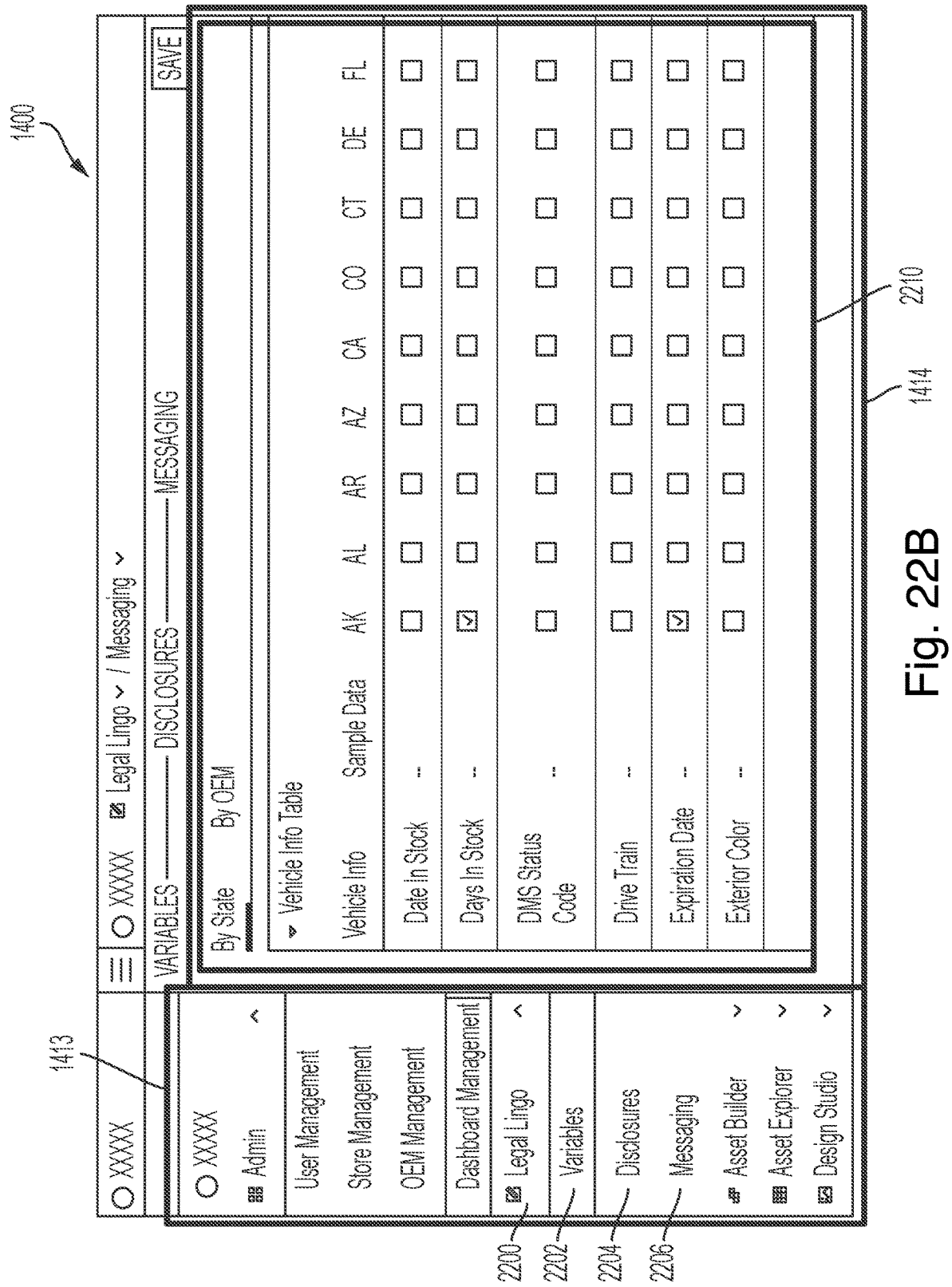
FIG. 22B is a diagram illustrating another user interface associated with implementation of a compliance module in one embodiment.

Each selection in new user interface 2208 can lead to an output of another new user interface in region 1414. For example, a selection of "Vehicle Info table" from new user interface 2208 can cause another new user interface 2210 to be outputted in region 1414, as shown in FIG. 22B. New user interface 2210 can include a vehicle info table including an index column that has a plurality of attributes relating to specific vehicle, offers, promotions, ads, content, and/or other attributes that can be indicated in URLs being generated by the automation tool. The vehicle info table in new user interface 2210 can further include an index row that has a plurality of geographic locations, industries, audience, governing factors, channel, product regulation, and/or other entities that may define respective legal compliance. The vehicle info table in new user interface 2210 can include a plurality of check boxes, where each check box is mapped to one item in the index column and one item in the index row. Users can select one or more check boxes to insert legal disclaimers directed to one of the items in the index column and one of the items in the index row mapped to the selected (e.g., checked) check box. For example, as shown in FIG. 22B, a first check box corresponding to "Days in Stock" and the state Alaska (AK) is checked such that legal disclaimer directed to compliance of a vehicle's number of days in stock in the state of Alaska can be inserted in URLs generated by the application. Similarly, a second check box corresponding to "Expiration Date" and the state Alaska (AK) is checked such that legal disclaimer directed to compliance of a vehicle's expiration date in the state of Alaska.

Figure 22C:
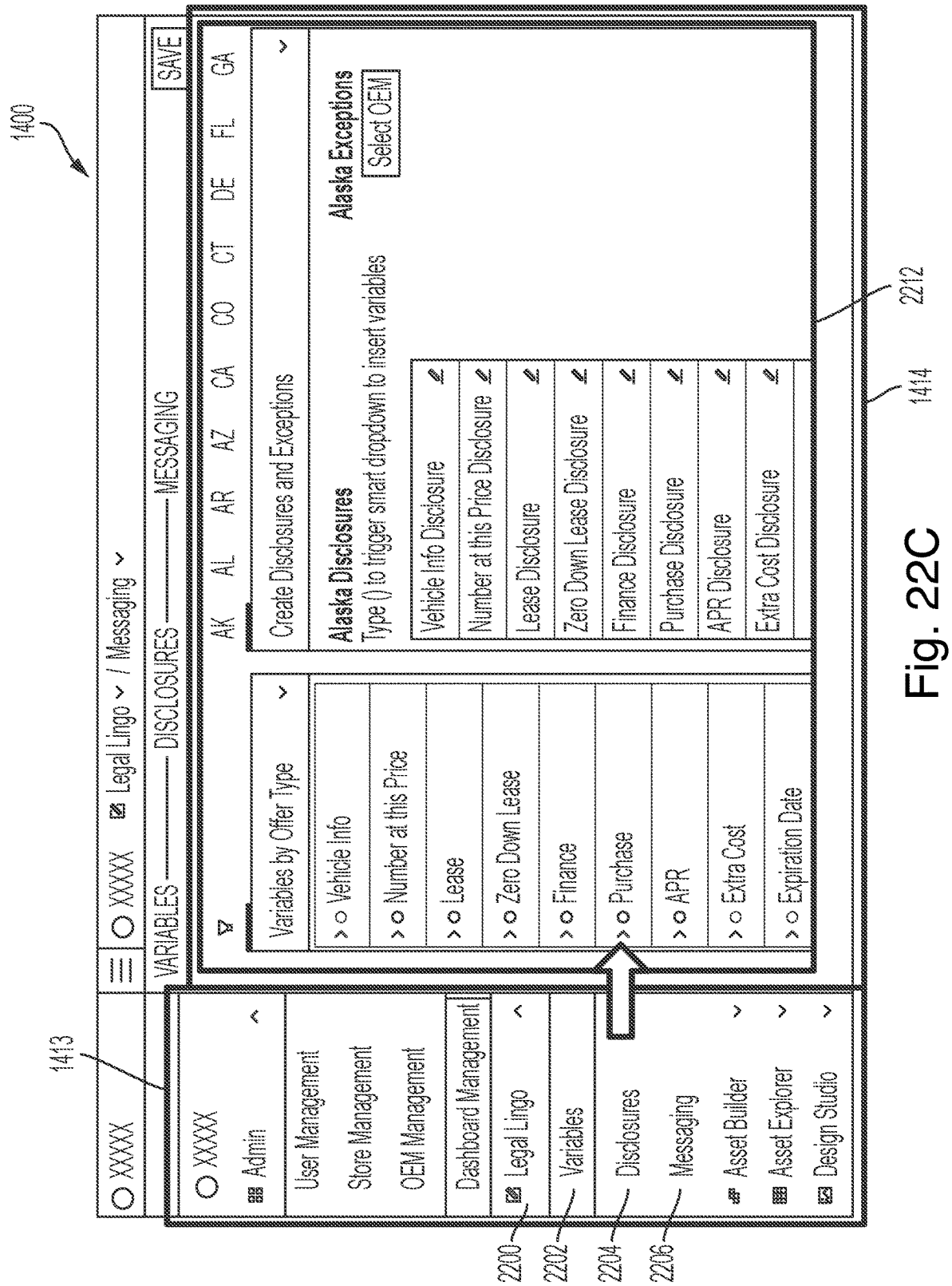
FIG. 22C is a diagram illustrating another user interface associated with implementation of a compliance module in one embodiment.

In response to a selection of the disclosures tab 2204, a new user interface 2212 can be outputted in region 1414, as shown in FIG. 22C. In new user interface 2212, a user can manage and/or arrange legal disclosures per jurisdiction (e.g., per geographical region). For example, as shown in FIG. 22C, new user interface 2212 shows "Alaska Disclosures" and a corresponding menu of items that can be selected by users. Users can selected one of the displayed items to insert legal disclosure to be displayed in the contents of the URLs being generated by the automation tool. For example, if a user selects "APR disclosure", then a legal disclosure per the state of Alaska can be autonomously drafted or generated by the automation tool and can be inserted in a campaign or promotional content, such as an ad, that can be displayed by a corresponding URL generated by the automation tool.

Figure 22D:
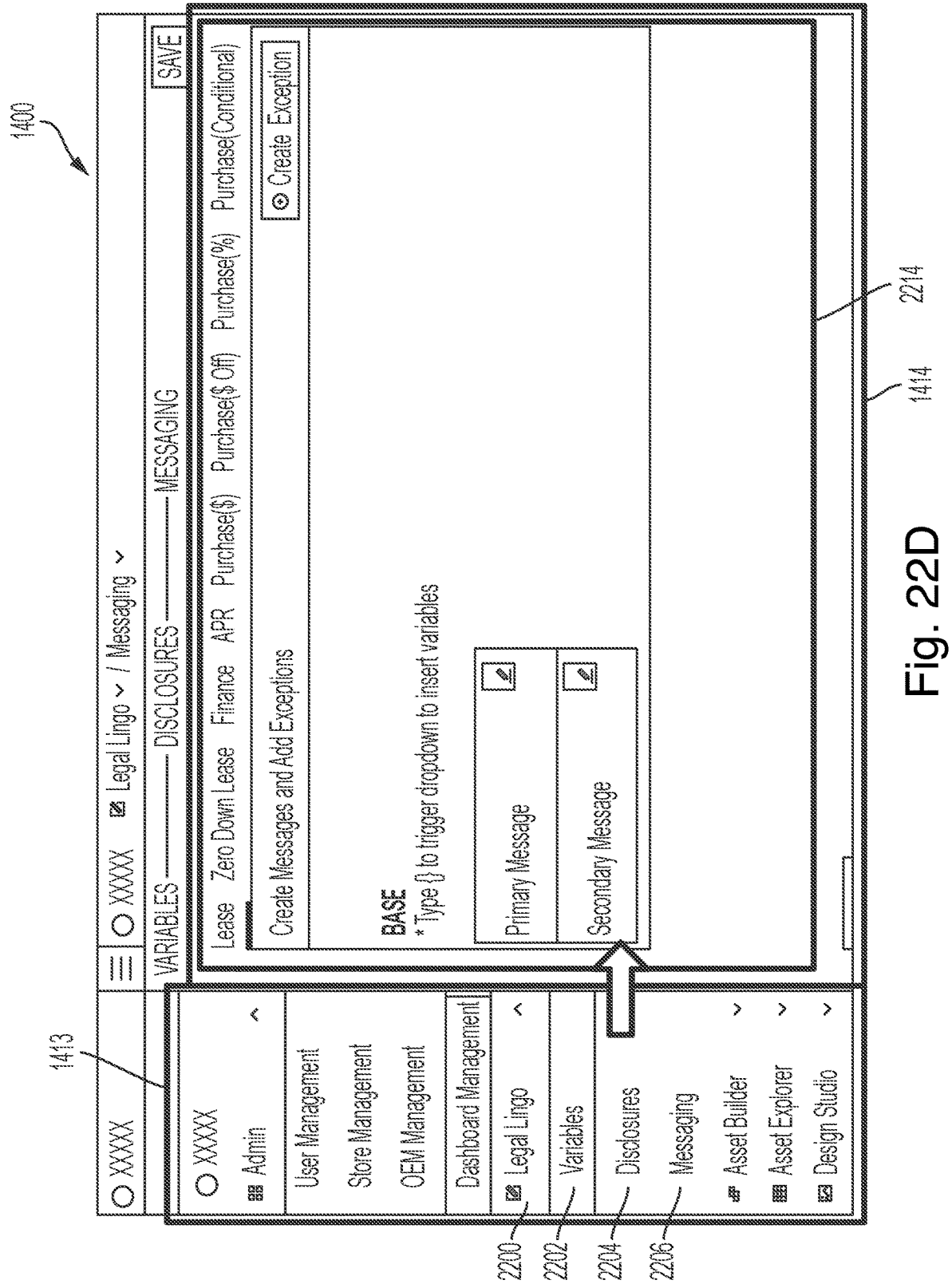
FIG. 22D is a diagram illustrating another user interface associated with implementation of a compliance module in one embodiment.

In response to a selection of the messaging tab 2208, a new user interface 2214 can be outputted in region 1414, as shown in FIG. 22D. In new user interface 2214, a user can duplicate existing legal disclaimers or disclosures. In one embodiment, the templates for contents can include a text container (e.g., text box) specified for legal lingo. The text container can occupy a region in the contents being displayed by the generated URLs. The compliance module can autonomously pull legal lingo text (e.g., legal disclaimers) into the text container.

Figure 22E:
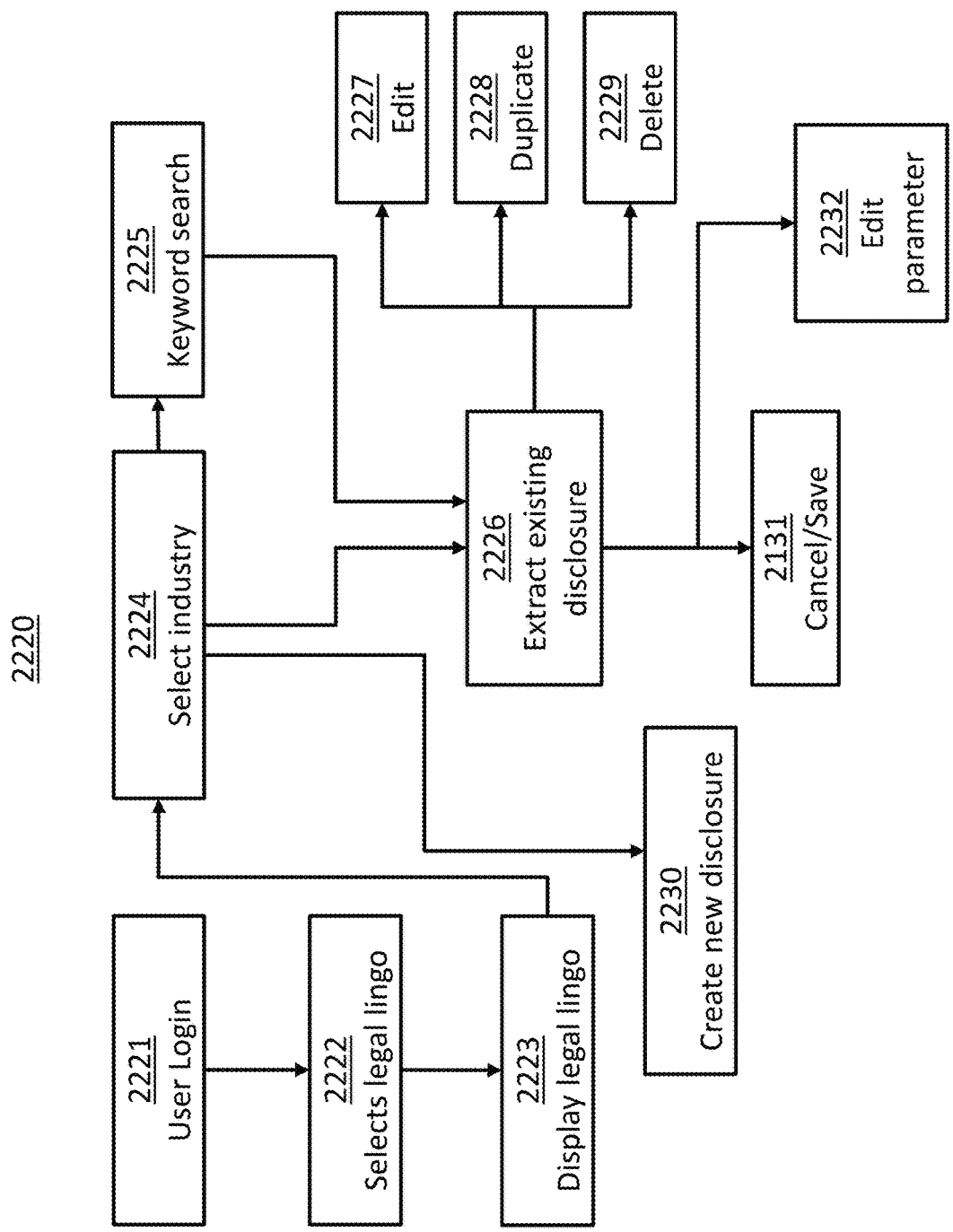
FIG. 22E is a flowchart showing an example process implemented by a compliance module in one embodiment.

FIG. 22E is a flowchart showing an example process implemented by a compliance module in one embodiment. A process 2220 can be performed by a processor executing one or more program modules among application 1400. Process 2220 can begin at block 2221, where a user can login to application 1400. Upon logging in at block 2221, at block 2222, the user can select the "Legal Lingo" tab in dashboard 1413 to view a legal lingo interface (e.g., user interface 2208 in FIG. 22A). Process 2220 can proceed to block 2223, where the legal lingo interface can be displayed. Process 2220 can proceed to block 2224, where the user can select an industry, such as pharmaceutical, automotive, travel, retail, and/or other industries. Process 2220 can proceed to blocks 2225, 2226, and 2230. At block 2225, the user can perform a keyword search to search for specific compliance texts that may already be saved to application 1400. At block 2226, application 1400 can extract disclosure or compliance text being searched at block 2225 or selected by the user at block 2224. At block 2230, the user can create a new disclosure by, for example, uploading premade text that includes legal compliance messages. From block 2226, process 2220 can proceed to blocks 2227, 2228, 2229, 2231, 2232. At blocks 2227, 2228, 2229, the user can edit, duplicate, delete compliance text, respectively. At block 2231, the user can either cancel to return to a previous interface or save to save any new disclosures or changes to disclosures. At block 2232, the user can edit various parameters for inserting disclosures into contents.

In one embodiment, compliance module 1440 can deliver legal compliance messages to advertising audiences per their region and local compliance environment. Compliance module 1440 can be applied to various other applications through custom development, use of APIs and SDKs or other methods. Compliance module 1440 can organize legal text with the goal of establishing risk management, legal governance and compliance in the digital marketing and advertising industry. Compliance module 1440 can use a set of business rules to match legal disclosures and similar messages to audiences of marketing and advertising so that many audiences can be addressed simultaneously with tailored legal messaging. Legal text can be inputted from users such that compliance module 1440 can inserted to the appropriate legal territory. Compliance module 1440 can intake text from users of application 1400, which can include lawyers and legal professionals, who select various regions, nations, states, and cities, among other settings, and said users input legal text—as required by the advertising company's industry (e.g., automotive, pharmaceuticals, liquor, food, insurance, banking, health care, etc.), and saved with a custom name and naming convention. Compliance module 1440 does not need to be specific to a single industry.

In one embodiment, a legal professional who works for a company can specify legal messaging requirements on their products and services, but there can be differences in legal compliance messaging in the United States versus legal compliance messaging in Canada. The legal professional can use the compliance module 1440, available through application 1400, to input all necessary text for advertisements and media which appear in and the legal professional can save as these settings for Canadian legal compliance once the ad assets for the Canadian market are available. Through the automation of application 1400, users of application 1400 can attach the saved Canadian legal compliance messages to the media to be viewed by the Canadian consumer market. The legal professional can use application 1400 to perform the same functions for United States legal compliance messages. Hence, application 1400 can be populated with predefined compliance text that can be autonomously inserted into contents based on a geographical location of the audience viewing the contents. Users can specific geographical locations in which the contents will be published in order for application 1400 to insert the correct compliance text in the contents. Through methods of automation, insertion, computer vision, organization and creative development of ads, compliance module 1440 applies and animates this above-mentioned legal text to advertising assets, media and ads-which could be video, image, banner, still, GIF, motion ads, catalog ads and other various types of display advertising online and offline.

Figure 23A:
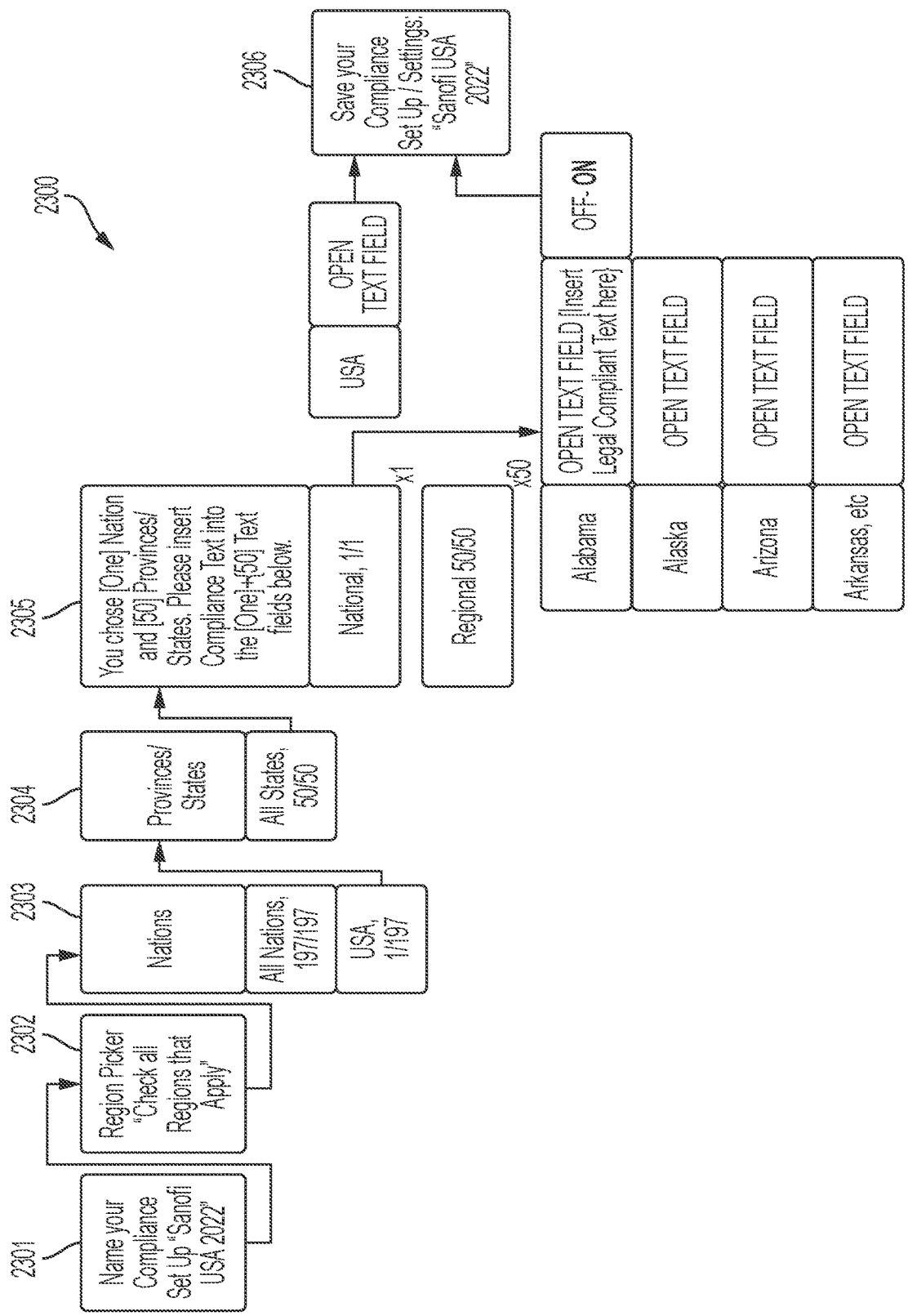
FIG. 23A is a diagram illustrating a process that can be implemented by a compliance module in one embodiment.

FIG. 23A is a diagram illustrating a process that can be implemented by a compliance module in one embodiment. A process 2300 shown in FIG. 23A can be implemented by compliance module 1440 in response to a sequence of user inputs for setting up compliance text to be inserted in contents. For example, process 2300 can start at block 2301, where a user can start with creating a compliance setting and defining an ID or name of the compliance setting. Process 2300 can proceed to block 2301, wherein compliance module 1440 can prompt the user to select regions for the created compliance setting. Process 2300 can proceed to block 2303, where compliance module 1440 can prompt the user to enter a first level of geographical location (e.g., nation). Process 2300 can proceed to block 2304, where compliance module 1440 can prompt the user to enter a second level of geographical location (e.g., state). In one or more embodiments, compliance module 1440 can prompt the user to enter a predefined number of levels of geographical locations. Process 2300 can proceed to block 2305, where compliance module 1440 can prompt the user to enter compliance text. In one or more embodiments, the user can enter different compliance texts for different geographical locations. Process 2300 can proceed to block 2306, where compliance module 1440 can save the compliance setting.

As a result of creating the compliance setting, compliance module 1440 can autonomously insert compliance text based on the created compliance settings. For example, a user can create a compliance setting by entering "Nation A" at block 2303 and "State X" in block 2304, then entered a compliance paragraph of text in block 2305, and select to save the setting at block 2306. When a client device runs application 1400, if application 1400 receives user input indicating to publish a content for audiences residing in "Nation A" and "State X", then compliance module 1440 can autonomously insert the compliance paragraph into the content that is being published.

Figure 23B:
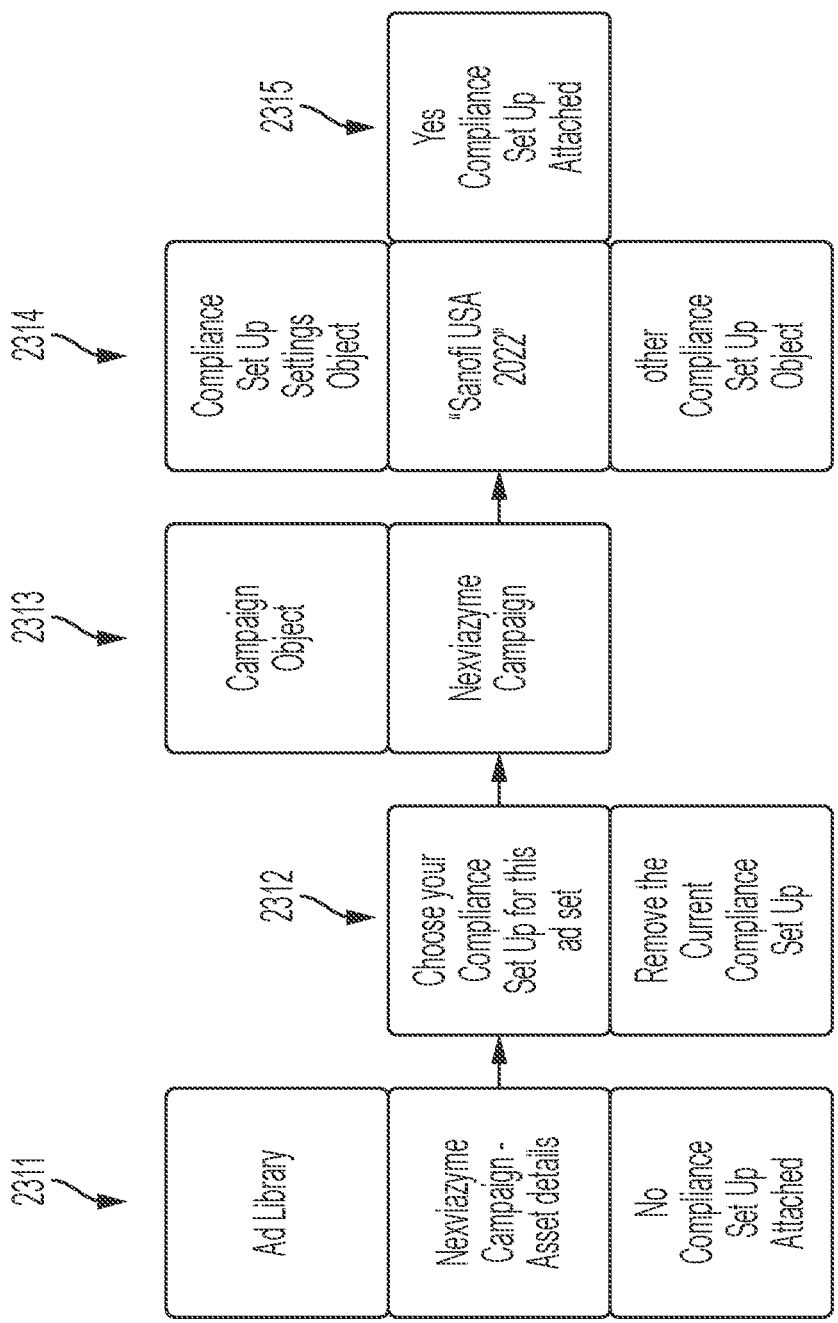
FIG. 23B is a diagram illustrating an example implementation of a compliance module in one embodiment.

FIG. 23B is a diagram illustrating an example implementation of a compliance module in one embodiment. In one embodiment, compliance module 1440 can attach or link compliance settings to contents as shown in FIG. 23B. In the example shown in FIG. 23B, a user can select a particular content or campaign (e.g., Nexviazyme campaign) from an ad library at an initial step 2311. In one embodiment, if there is no compliance setting or setup attached to the selected content, the user can select and attach a compliance setting to the selected content in a step 2312. If there is compliance setting or setup already attached to the selected content, the user can select to modify or delete the attached compliance setting. In step 2313, the user can attach additional campaign objects, such as images, videos, audio files, text, or the like, to the selected content. In step 2314, the user can attach additional compliance objects, such as disclaimers or other compliance text that's not based on geographical locations, to the selected content. In block 2315, the compliance setting is successfully attached to the content.

Figure 23C:
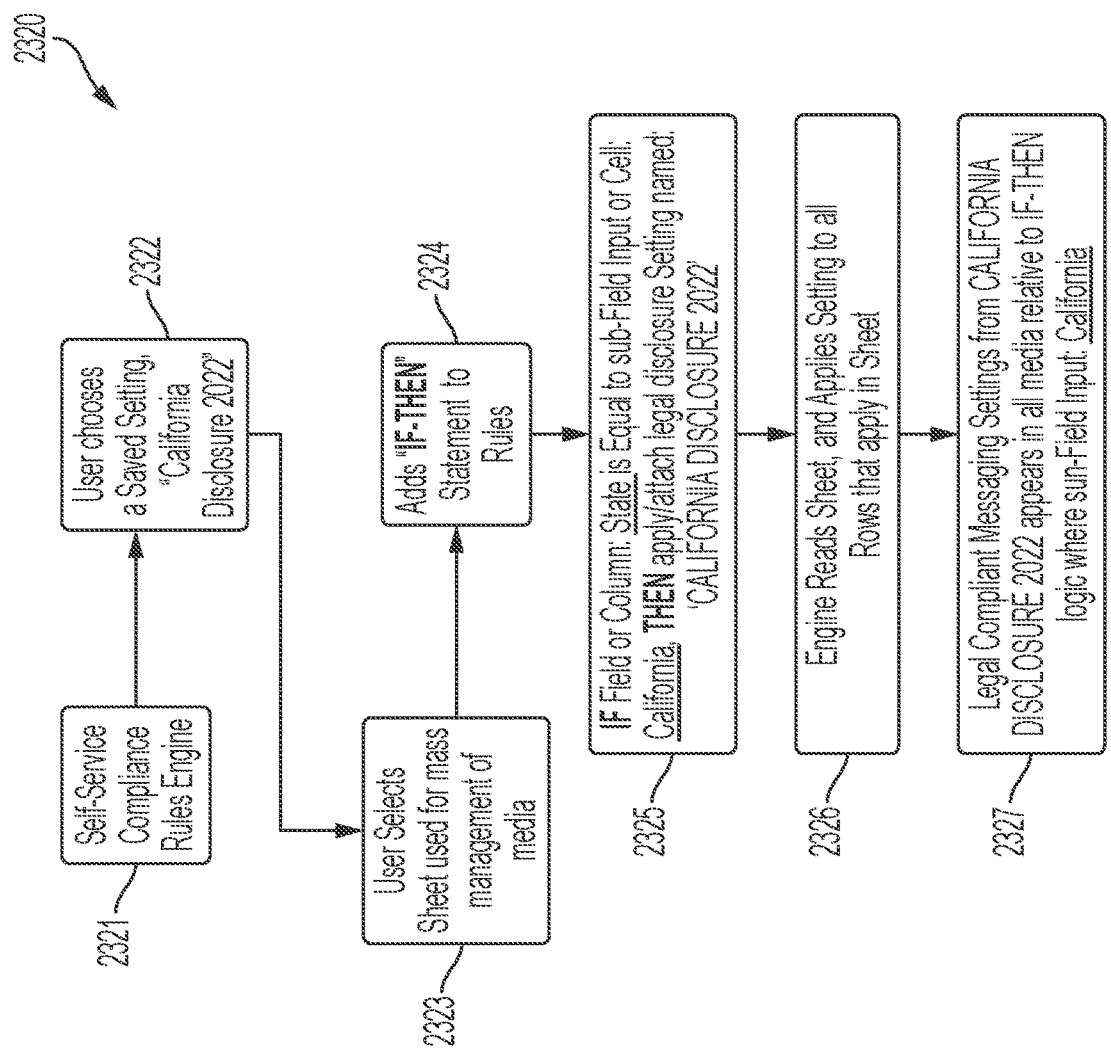
FIG. 23C is a diagram illustrating another process that can be implemented by a compliance module in one embodiment.

FIG. 23C is a diagram illustrating another process that can be implemented by a compliance module in one embodiment. A process 2320 shown in FIG. 23C can be implemented by compliance module 1440 for inserting the same compliance text into multiple content that has common properties, such as in the same nation and/or the same state. Process 2320 can begin at block 2321, where a self-service compliance rules engine can be implemented by compliance module 1440. Process 2320 can proceed from block 2321 to block 2322, where a user can choose a saved compliance setting. Process 2320 can proceed from block 2322 to block 2323, where a user can select a spreadsheet including data of contents stored in database 1404. Process 2320 can proceed from block 2323 to block 2324, where a user can add condition statements, such as if-then statements, for extracting and/or inserting data from and/or to the spreadsheet. Process 2320 can proceed from block 2324 to block 2325, where compliance module 1440 can apply the condition, such as detecting the text in the input "if" field and retrieving compliance text that saved for the text in the input "if" field. Process 2320 can proceed from block 2325 to block 2326, where the compliance engine or the compliance module 1440 can read the spreadsheet and insert the compliance text retrieved at block 2325 to contents in the spreadsheet that satisfy the text in the input "if" field. Process 2320 can proceed from block 2326 to block 2327, where contents inserted with the compliance text will show the compliance text in a predefined text container of the contents.

Figure 23D:
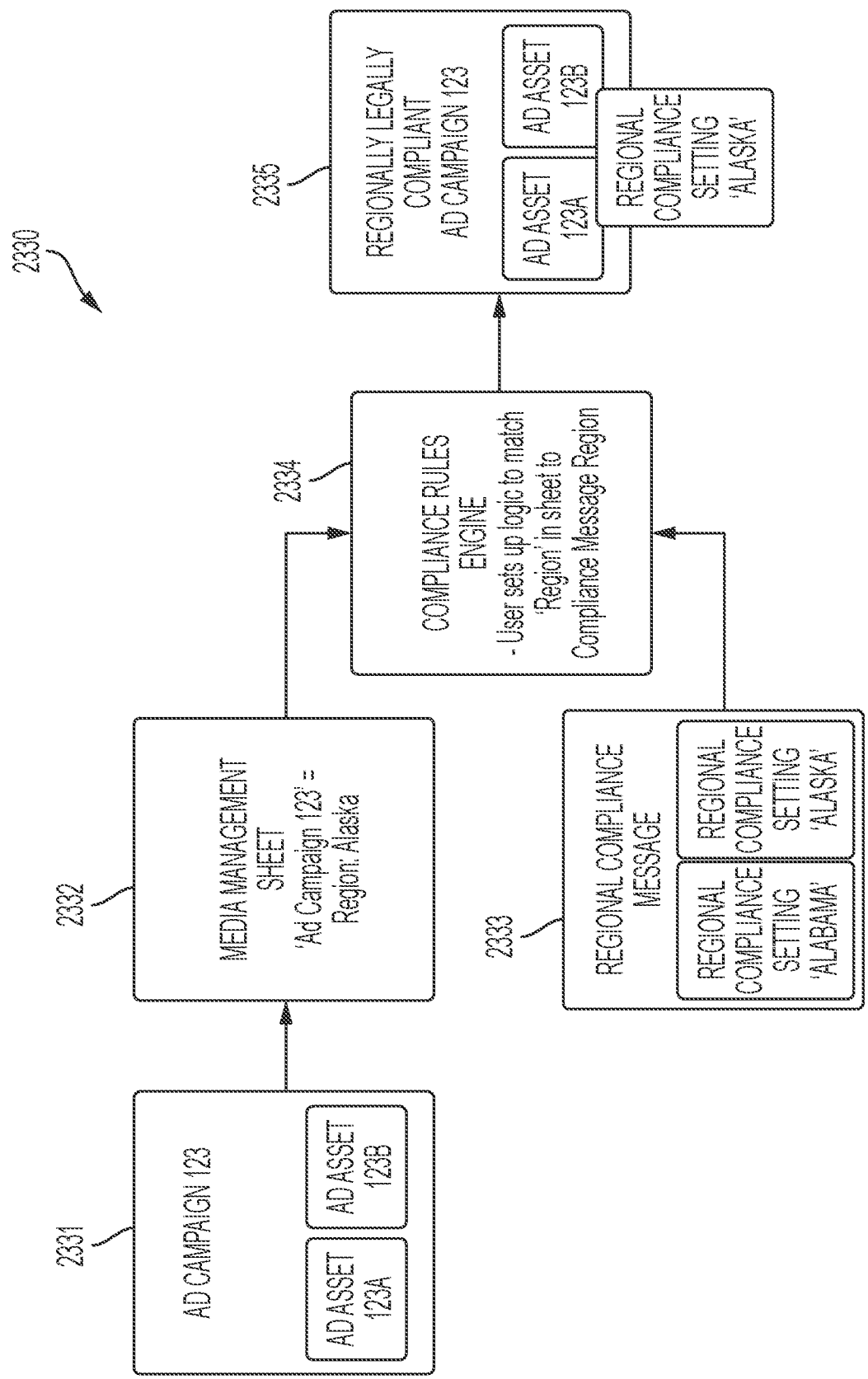
FIG. 23D is a diagram illustrating another process that can be implemented by a compliance module in one embodiment.

FIG. 23D is a diagram illustrating another process that can be implemented by a compliance module in one embodiment. A process 2330 shown in FIG. 23D can be implemented by compliance module 1440 for applying regional legal messages via sheet and rules logic. Process 2330 can begin at block 2331, where a content such as an ad campaign including one or more ad assets can be inputted to compliance module 1440. Process 2330 can proceed from block 2331 to block 2332, where a media management sheet (e.g., a spreadsheet) can be inputted to compliance module 1440. The media management sheet can include contents associated with a specific region or geographical location (e.g., to be published in sites that will be viewed by audience of a particular region). At a block 2333, regional compliance messages for a plurality of regions can be inputted to compliance module 1440. Process 2330 can proceed from blocks 2332 and 2333 to block 2334. At block 2334, compliance module 1440 can apply rules based logic (e.g., if-then statements) to extract compliance messages from block 2333 based on the region of block 2332. Process 2330 can proceed from block 2334 to block 2335 where the regional message is successfully attached to the content of block 2331

Figure 24A:
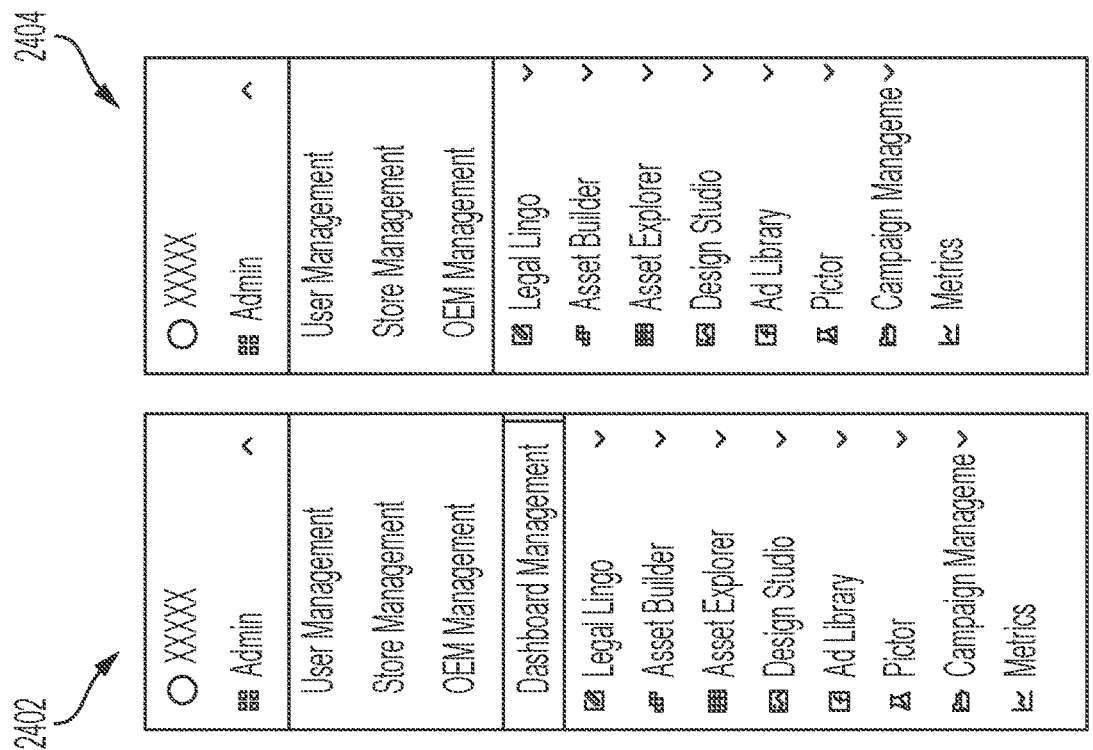
FIG. 24A is a diagram illustrating an example implementation of a dashboard module in one embodiment.

FIG. 24A is a diagram illustrating a user interface associated with implementation of a dashboard module in one embodiment. Dashboard 1413 of FIG. 15B can include different set of tabs depending on user permission. In an example shown in FIG. 24A, a dashboard 2402 can be visible to a user who has administrative permission to perform actions such as quality control, approval status for contents, and dashboard management. A dashboard 2404 can be visible to a user who does not have administrative permission, and unlike dashboard 2402, dashboard 2404 does not have a dashboard management. In response to a user selecting the "Dashboard Management" tab in dashboard 2402, a selected user interface 2410 shown in FIG. 24B can be outputted in display region 1414 (see FIG. 15A). The "Dashboard Management" tab being selected for outputting selected user interface 2410 can be controlled by dashboard module 1470 in FIG. 14. Users can use selected user interface 2410 to add new dashboards, edit existing dashboards, and delete existing dashboards. Different users of application 1400 can view and use different versions of dashboard 1413 based on the configurations set by dashboard module 1470.

Figure 24B:
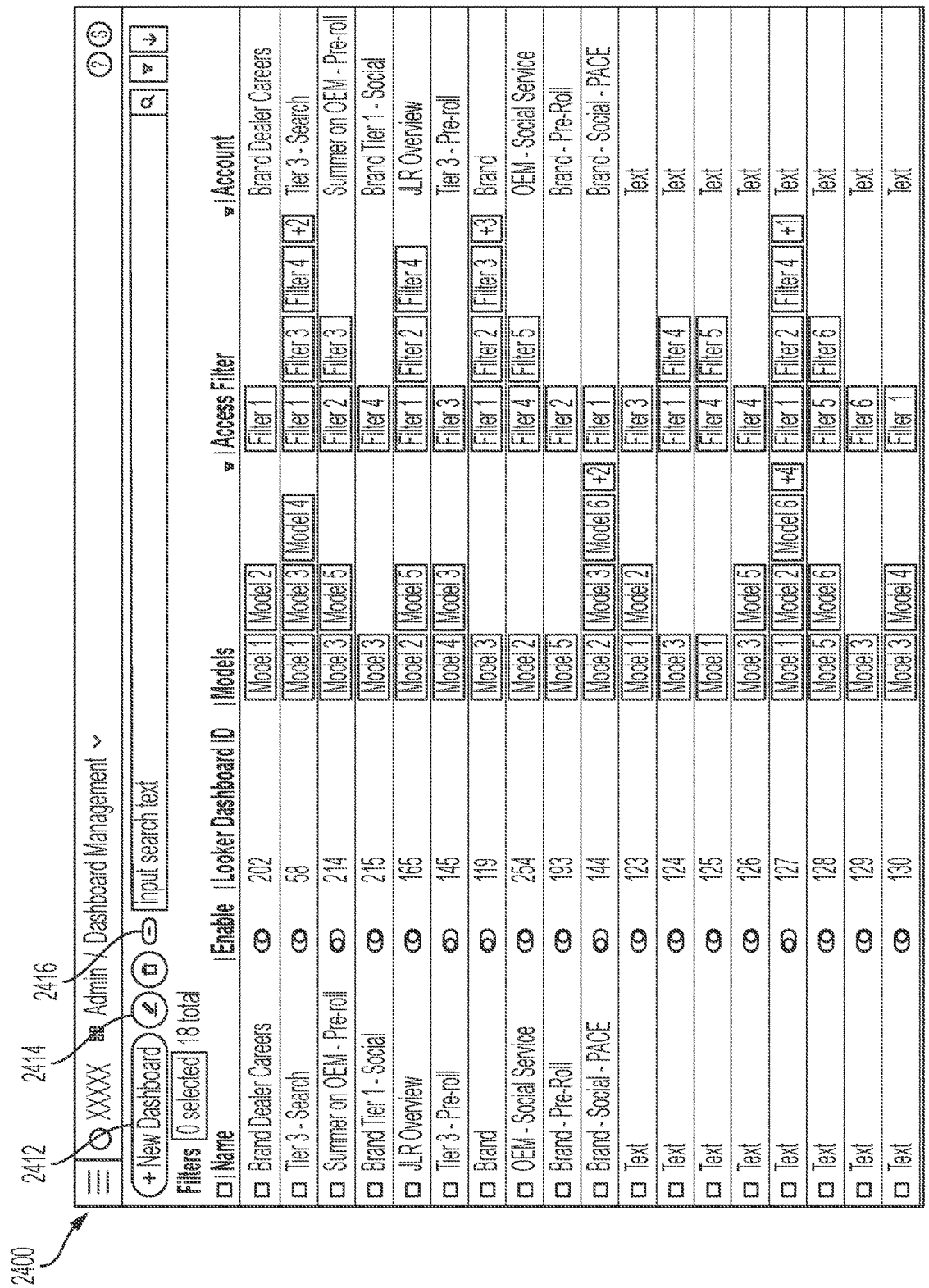
FIG. 24B is a diagram illustrating another example implementation of a dashboard module in one embodiment.

As shown in FIG. 24B, selected user interface 2410 can include a plurality of rows of data. Each row can correspond to a user account of application 1400. Each user account can have a dashboard ID, and the user viewing selected user interface 2410 can toggle whether to enable each dashboard or not. Users can also configure access filters to control whether each user account can access specific functions of application 1400. In one embodiment, selected user interface 2410 can include a button 2412 for adding a new dashboard, a button 2414 for editing an existing dashboard, and a button 2416 for viewing multiple dashboards.

In response to selecting button 2412 for adding a new dashboard, a window 2420 in FIG. 24C can be outputted by dashboard module 1470 and window 2420 may overlap selected user interface 2410. In response to selecting button 2414 for editing an existing dashboard, a window 2425 in FIG. 24D can be outputted by dashboard module 1470 and window 2425 may overlap selected user interface 2410.

Figure 24E:
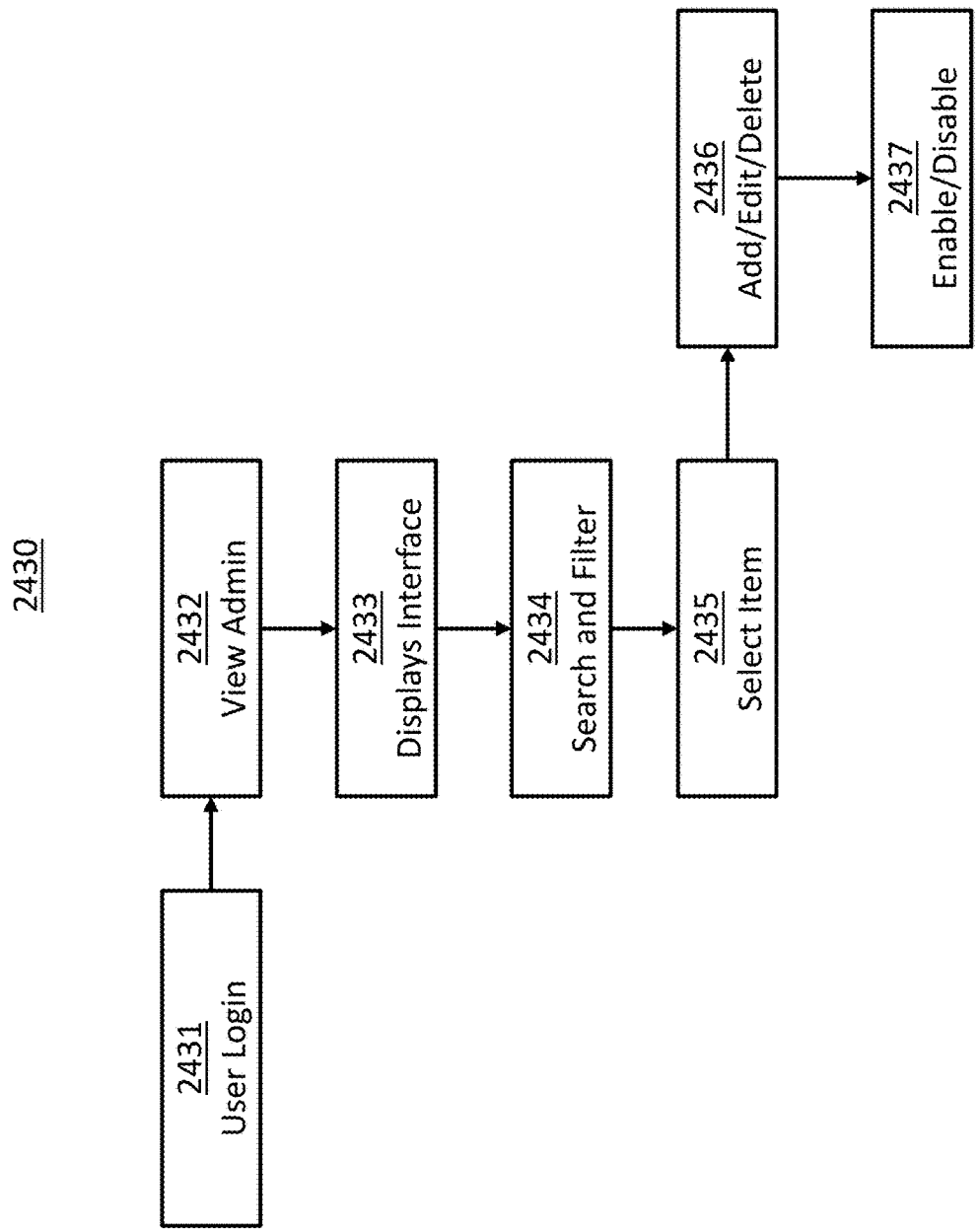
FIG. 24E is a flowchart showing an example process implemented by a dashboard module in one embodiment.

FIG. 24E is a flowchart showing an example process implemented by a dashboard module in one embodiment. A process 2430 can be performed by a processor executing one or more program modules among application 1400. Process 2430 can begin at block 2431, where a user can login to application 1400. Upon logging in at block 2431, at block 2432, the user can select to view an administration user interface, such as selected user interface 2410. Process 2430 can proceed to block 2433, where dashboard module 1470 can display selected user interface 2410. Process 2430 can proceed to block 2434, where the user can search and filter items in selected user interface 2410. Process 2430 can proceed to block 2435, where the user can select an item, such as selecting a row or an account in selected user interface 2410. Process 2430 can proceed to block 2436, where the user can add, edit, or delete dashboards using buttons in selected user interface 2410. Process 2430 can proceed to block 2437, where the user can enable or disable dashboards that are added and/or edited.

Figure 25A:
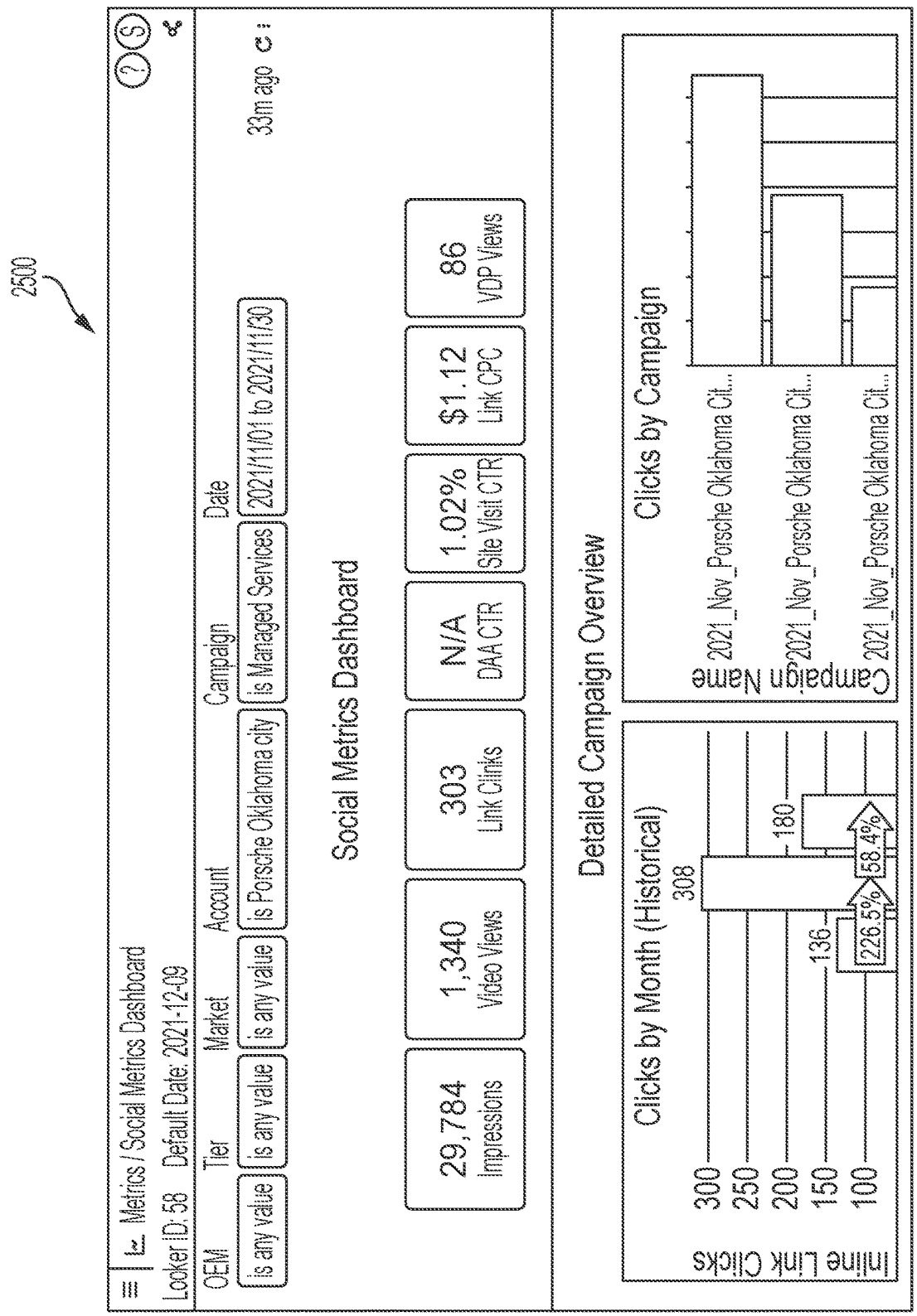
FIG. 25A is a diagram illustrating another user interface associated with metrics of an application in one embodiment.
Figure 25B:
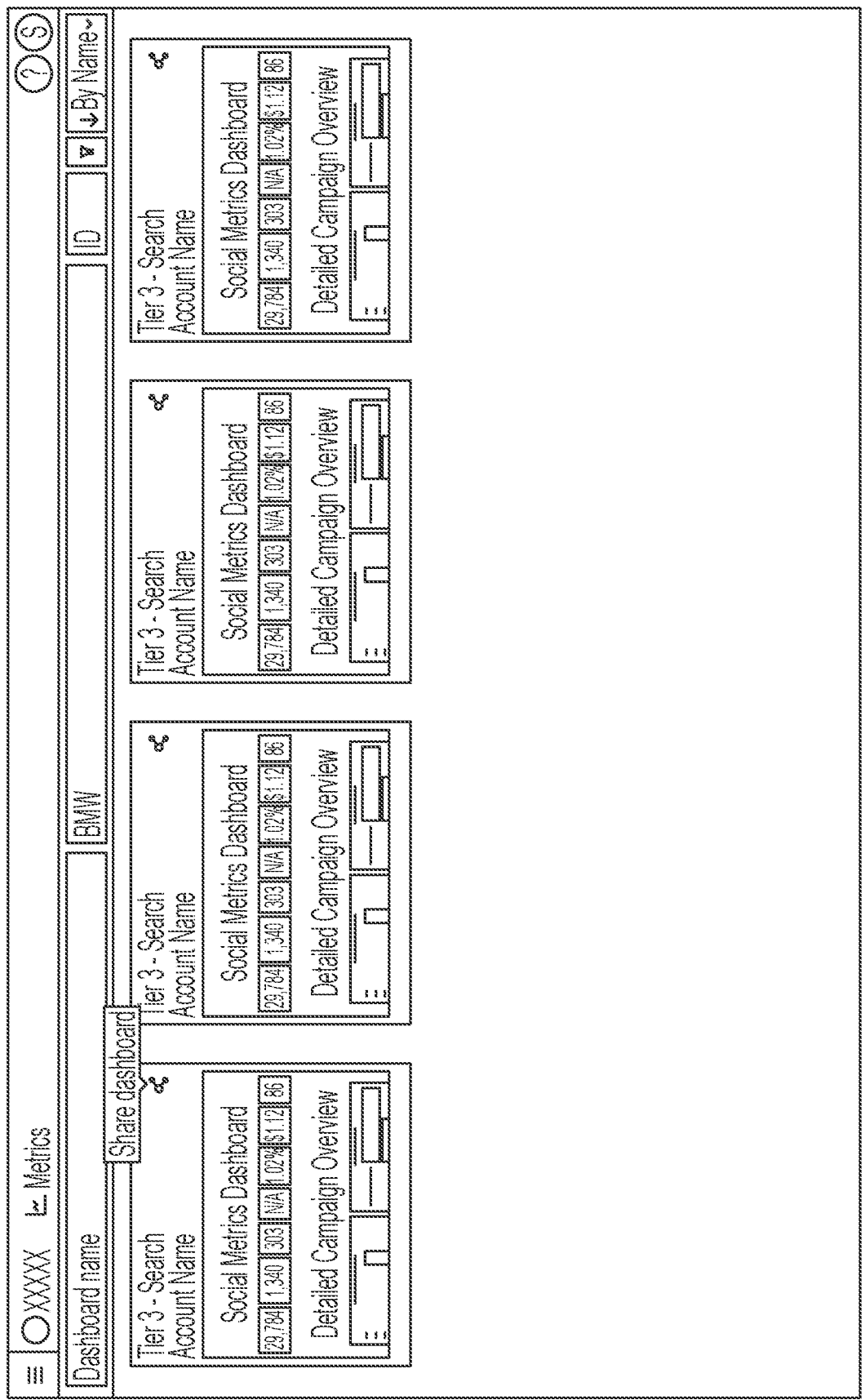
FIG. 25B is a diagram illustrating another user interface associated with metrics of an application in one embodiment.

FIG. 25A is a diagram illustrating another user interface associated with metrics of an application in one embodiment. In response to a user selecting the "Metrics" tab in dashboard 1413 of FIG. 15A, a selected user interface 2500 can be outputted in region 1414 of FIG. 15A. Selected user interface 2500 can be controlled by dashboard module 1470. Users can use selected user interface 2500 to view metrics, such as number of views, number of clicks, impressions, dwell times, etc., of the contents that are published to third party 1406. In one embodiment, the metrics can be obtained via API 1405 and application can render the metrics into visual indicators, such as graphs, that can be outputted on user interface 1410. In one embodiment, a user with administrative permission can view metrics settings for other users and toggle which metrics can be visible to specific users, such as shown in FIG. 25B.

Figure 25C:
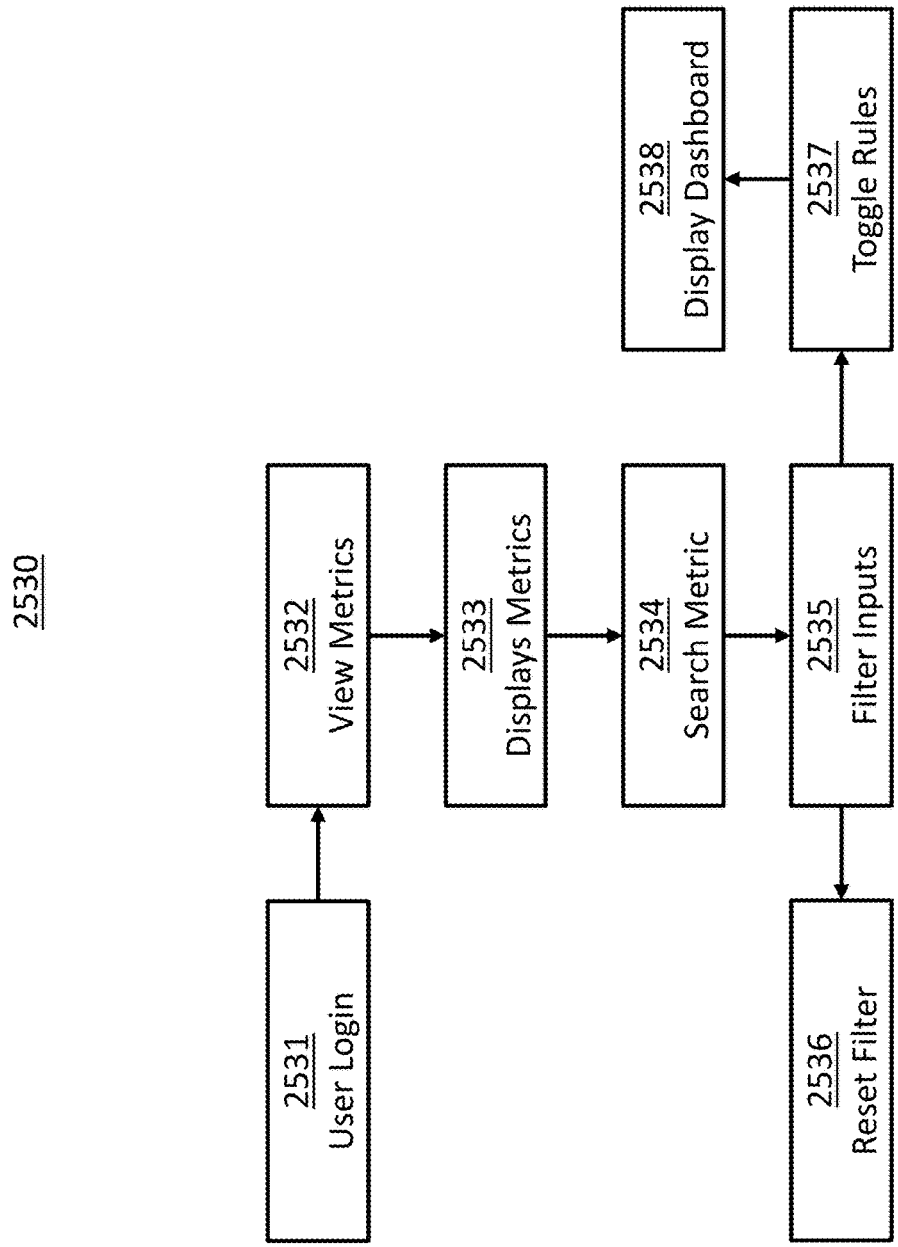
FIG. 25C is a diagram illustrating another user interface associated with metrics of an application in one embodiment.

FIG. 25C is a flowchart showing another example process implemented by an application to manage metrics of the application in one embodiment. A process 2530 can be performed by a processor executing one or more program modules among application 1400. Process 2530 can begin at block 2531, where a user can login to application 1400. Upon logging in at block 2531, at block 2532, the user can select to view an administration user interface, such as selected user interface 2500. Process 2530 can proceed to block 2533, where dashboard module 1470 can display selected user interface 2500. Process 2530 can proceed to block 2534, where the user can search for a specific metric among the metrics being displayed in selected user interface 2500. Process 2530 can proceed to block 2435, where the user can filter inputs, such as filtering contents in order to view the specific metric for the filtered contents. Process 2430 can proceed to block 2536 and block 2537. At block 2536, the user can reset the filters. At block 2537, the user can toggle rules, such as editing which metrics can be viewed by different users. Process 2530 can proceed to block 2538, where dashboard module 1470 can display a metrics dashboard (e.g., selected user interface 2500) based on the operations at blocks 2535, 2537.

FIG. 26 is a flow diagram illustrating a process 2600 being performed by a processor in one embodiment. The process 2600 may include one or more operations, actions, or functions as illustrated by one or more of blocks 2602, 2604, 2606, 2608, 2610, 2612, 2624, 2616 and/or 2618. Although illustrated as discrete blocks, various blocks can be divided into additional blocks, combined into fewer blocks, eliminated, or performed in parallel, and/or performed in different order, depending on the desired implementation.

Process 2600 can be a computer-implemented method for managing simulations of campaign content for a third party. Process 2600 can begin at block 2602. At block 2602, a processor can invoke an application programming interface (API) to obtain data of a third party site.

Process 2600 can proceed from block 2602 to block 2604. At block 2604, the processor can run an application that simulates output of content in the third party site, wherein the simulation is based on the data obtained via the API. In one embodiment, the third party site can be a social media platform. In one embodiment, the processor can run the application in response to a user logging in to the application without a need for the user to log in to the third part site.

Process 2600 can proceed from block 2604 to block 2606. At block 2606, the processor can receive a selection of a function of the application. Process 2600 can proceed from block 2606 to block 2608. At block 2608, the processor can execute a specific program module of the application associated with the selected function. Process 2600 can proceed from block 2608 to block 2610. At block 2610, the processor can output a user interface associated with the specific program module. Process 2600 can proceed from block 2610 to block 2612. At block 2612, the processor can receive, via the user interface, a selection of a content.

Process 2600 can proceed from block 2612 to block 2614. At block 2614, the processor can retrieve a uniform resource locator (URL) link from a database, wherein the URL link points to a page of the third party site that displays the selected content. Process 2600 can proceed from block 2614 to block 2616. At block 2616, the processor can, based on the URL link, simulate the selected content in the user interface. Process 2600 can proceed from block 2616 to block 2618. At block 2618, the processor can receive, via the user interface, a user input to perform one or more actions on the selected content being simulated in the outputted user interface.

In one embodiment, the processor can invoke two or more APIs to obtain data of two or more third party sites. The processor can further run the application to simulate output of content in the two or more third party sites based on the data obtained via the two or more additional APIs.

In one embodiment, the function can be for linking the content to a destination site. The processor can output an interface that includes a canvas for placing a plurality of content components. The processor can receive, via the interface, an arrangement of the plurality of content components in a hierarchy. The processor can generate linked content by combining the plurality of content components according to the arrangement of the plurality of content components. The linked content, when published on the third party site, can maintain navigation of destination sites in the linked content within the third party site. In one embodiment, the processor can simulate the linked content in the interface.

In one embodiment, the function can be for inserting compliance text in the content. The processor can output an interface that prompts the user to enter one or more geographical locations. The processor can receive, via the interface, a selection of geographical locations. The processor can insert compliance text associated with the selected geographical locations into the content.

A computer readable storage medium storing a program of instructions executable by a machine to perform one or more methods described herein also may be provided. In some aspects, the computer readable storage medium may be non-transitory medium.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method for managing simulations of campaign content for a third party, the computer-implemented method comprising:
    invoking, by a processor, at least one application programming interface (API) to obtain data of at least one third party site, wherein the obtained data specifies layouts having dimensions and resolutions tailored for hosting promotional campaigns by the at least one third party site;
    running, by the processor, an application that simulates output of content that include the promotional campaigns in the specified layouts of the at least one third party site;
    receiving, by the processor, a selection of a function of the application;
    executing, by the processor, a specific program module of the application associated with the selected function;
    outputting, by the processor, a user interface associated with the specific program module;
    receiving, by the processor and via the user interface, a selection of a content that includes a specific promotional campaign;
    retrieving, by the processor, at least one uniform resource locator (URL) link from a database, wherein the at least one URL link points to different pages of the at least one third party site that display the selected content;
    based on the at least one URL link, simulating, by the application being run by the processor, the selected content in the user interface, wherein simulating the selected content comprises simulating different appearances of the specific promotional campaign in the specified layouts in the different pages of the at least one third party site; and
    receiving, by the processor and via the user interface, a user input to perform one or more actions to modify the simulated selected content inside the specified layouts in the different pages of the at least one third party site.

2. The computer-implemented method of claim 1, wherein the at least one third party site comprises at least one social media platform.

3. The computer-implemented method of claim 1, wherein:
    invoking the at least one API comprises invoking, by the processor, two or more APIs to obtain data of two or more third party sites; and
    the at least one third party site comprises two or more third party sites.

4. The computer-implemented method of claim 1, further comprising running, by the processor, the application in response to a user logging in to the application without a need for the user to log in to the at least one third party site.

5. The computer-implemented method of claim 1, wherein the function is to link the content to a destination site, and the method further comprising:
    outputting, by the processor, an interface that includes a canvas for placing a plurality of content components;
    receiving, by the processor and via the interface, an arrangement of the plurality of content components in a hierarchy; and
    generating, by the processor, linked content by combining the plurality of content components according to the arrangement of the plurality of content components, wherein the linked content, when published on the third party site, maintains navigation of destination sites publishing the plurality of content components within the third party site.

6. The computer-implemented method of claim 5, further comprising simulating, by the processor, the linked content in the interface.

7. The computer-implemented method of claim 1, wherein the function is to insert compliance text in the content, and the method further comprising:
    outputting, by the processor, an interface that prompts the user to enter one or more geographical locations;
    receiving, by the processor and via the interface, a selection of geographical locations; and
    inserting, by the processor, compliance text associated with the selected geographical locations into the content.

8. A computer program product for managing simulations of campaign content for a third party, the computer program product comprising a non-transitory computer readable storage medium having program instructions embodied therewith, the program instructions executable by a processor of a device to cause the device to:

invoke at least one application programming interface (API) to obtain data of at least one third party site, wherein the obtained data specifies layouts having dimensions and resolutions tailored for hosting promotional campaigns by the at least one third party site;

run an application that simulates output of content that include the promotional campaigns in the specified layouts of the at least one third party site;

receive a selection of a function of the application that includes a specific promotional campaign;

execute a specific program module of the application associated with the selected function;

output a user interface associated with the specific program module;

receive, via the user interface, a selection of a content;

retrieve at least one uniform resource locator (URL) link from a database, wherein the at least one URL link points to different pages of the at least one third party site that display the selected content;

based on the at least one URL link, simulate, by the application being run by the processor, the selected content in the user interface, wherein simulating the selected content comprises simulating different appearances of the specific promotional campaign in the specified layouts in the different pages of the at least one third party site; and receive, via the user interface, a user input to perform one or more actions to modify the simulated selected content inside the specified layouts in the different pages of the at least one third party site.

9. The computer program product of claim 8, wherein the at least one third party site comprises at least one social media platform.

10. The computer program product of claim 8, wherein the program instructions are executable by a processor of a device to cause the device to:

invoke the at least one API by invoking two or more APIs to obtain data of two or more third party sites, wherein the at least one third party site comprises two or more third party sites.

11. The computer program product of claim 8, wherein the program instructions are executable by a processor of a device to cause the device to run the application in response to a user logging in to the application without a need for the user to log in to the at least one third party site.

12. The computer program product of claim 8, wherein the function is to link the content to a destination site, and the program instructions are executable by a processor of a device to cause the device to:

output an interface that includes a canvas for placing a plurality of content components;

receive, via the interface, an arrangement of the plurality of content components in a hierarchy; and generate linked content by combining the plurality of content components according to the arrangement of the plurality of content components, wherein the linked content, when published on the third party site, maintains navigation of destination sites publishing the plurality of content components within the third party site.

13. The computer program product of claim 12, wherein the program instructions are executable by a processor of a device to cause the device to simulate the linked content in the interface.

14. The computer program product of claim 8, wherein the function is to insert compliance text in the content, and the program instructions are executable by a processor of a device to cause the device to:

output an interface that prompts the user to enter one or more geographical locations;

receive, via the interface, a selection of geographical locations; and insert compliance text associated with the selected geographical locations into the content.

15. A user interface system, comprising:

at least one hardware processor coupled with a network interface, the at least one hardware processor configured to at least:

invoke at least one application programming interface (API) to obtain data of at least one third party site, wherein the obtained data specifies layouts having dimensions and resolutions tailored for hosting promotional campaigns by the at least one third party site;

run an application that simulates output of content that include the promotional campaigns in the specified layouts of the at least one third party site;

receive a selection of a function of the application that includes a specific promotional campaign;

execute a specific program module of the application associated with the selected function;

output a user interface associated with the specific program module;

receive, via the user interface, a selection of a content;

retrieve at least one uniform resource locator (URL) link from a database, wherein the at least one URL link points to different pages of the at least one third party site that display the selected content;

based on the at least one URL link, simulate, by the application being run by the processor, the selected content in the user interface, wherein simulating the selected content comprises simulating different appearances of the specific promotional campaign in the specified layouts in the different pages of the at least one third party site; and receive, via the user interface, a user input to perform one or more actions to modify the simulated selected content inside the specified layouts in the different pages of the at least one third party site.

16. The user interface system of claim 15, wherein the at least one hardware processor is configured to:

invoke the at least one API by invoking two or more APIs to obtain data of two or more third party sites, wherein the at least one third party site comprises two or more third party sites.

17. The user interface system of claim 15, wherein the at least one hardware processor is configured to run the application in response to a user logging in to the application without a need for the user to log in to the at least one third party site.

18. The user interface system of claim 15, wherein the function is to link the content to a destination site, and the at least one hardware processor is configured to:

output an interface that includes a canvas for placing a plurality of content components;

receive, via the interface, an arrangement of the plurality of content components in a hierarchy; and generate linked content by combining the plurality of content components according to the arrangement of the plurality of content components, wherein the linked content, when published on the third party site, maintains navigation of destination sites publishing the plurality of content components within the third party site.

19. The user interface system of claim 18, wherein the at least one hardware processor is configured to simulate the linked content in the interface.

20. The user interface system of claim 15, wherein the function is to insert compliance text in the content, and the at least one hardware processor is configured to:
- output an interface that prompts the user to enter one or more geographical locations;
- receive, via the interface, a selection of geographical locations; and
- insert compliance text associated with the selected geographical locations into the content.

* * * * *